(12) United States Patent
Shih et al.

(10) Patent No.: US 7,889,195 B2
(45) Date of Patent: *Feb. 15, 2011

(54) SYSTEMS AND METHODS FOR SCULPTING VIRTUAL OBJECTS IN A HAPTIC VIRTUAL REALITY ENVIRONMENT

(75) Inventors: Loren Shih, Cambridge, MA (US); Walter A. Aviles, San Diego, CA (US); Thomas H. Massie, Windham, NH (US); Walter C. Shannon, III, West Newton, MA (US)

(73) Assignee: Sensable Technologies, Inc., Woburn, MA (US)

( * ) Notice: Subject to any disclaimer, the term of this patent is extended or adjusted under 35 U.S.C. 154(b) by 739 days.

This patent is subject to a terminal disclaimer.

(21) Appl. No.: 11/840,491

(22) Filed: Aug. 17, 2007

(65) Prior Publication Data
US 2008/0088620 A1    Apr. 17, 2008

Related U.S. Application Data

(63) Continuation of application No. 11/487,948, filed on Jul. 17, 2006, now Pat. No. 7,259,761, which is a continuation of application No. 10/844,257, filed on May 12, 2004, now Pat. No. 7,102,635, which is a continuation of application No. 10/375,517, filed on Feb. 26, 2003, now Pat. No. 6,831,640, which is a continuation of application No. 09/347,637, filed on Jul. 6, 1999, now Pat. No. 6,552,722, which is a continuation-in-part of application No. 09/340,875, filed on Jun. 28, 1999, now Pat. No. 6,421,048.

(60) Provisional application No. 60/093,304, filed on Jul. 17, 1998.

(51) Int. Cl.
G06T 15/00    (2006.01)
(52) U.S. Cl. ........................ 345/419; 715/702; 715/757
(58) Field of Classification Search ................. 345/419; 715/702, 757
See application file for complete search history.

(56) References Cited

U.S. PATENT DOCUMENTS 3,846,826 A    11/1974    Mueller (Continued)

FOREIGN PATENT DOCUMENTS

EP    0364947 B1    4/1990

(Continued)

OTHER PUBLICATIONS

"Mastering Windows 3.1 Special Edition", by Robert Cowart, Chapter 11, 1993 Sybex Inc.

(Continued)

*Primary Examiner*—Phu Nguyen
(74) *Attorney, Agent, or Firm*—Goodwin Procter LLP

(57) ABSTRACT

A user of a virtual object or computer model uses a haptic interface device in the real world to manipulate a virtual tool in a virtual environment to interact and modify the virtual object. The user uses the virtual tool in a sculpting mode to modify the shape of the virtual object by adding, removing, or modifying the material of the object. The user feels an interaction force from the virtual tool as it interacts with and modifies the virtual object. The designer can set geometric constraints, such as a constraint point, constraint line, or constraint surface, to limit or guide the movement of the virtual tool.

6 Claims, 35 Drawing Sheets

U.S. PATENT DOCUMENTS

| | | |
|---|---|---|
| 4,868,761 A | 9/1989 | Hayashi |
| 4,868,766 A | 9/1989 | Oosterholt |
| 4,901,253 A | 2/1990 | Iwano et al. |
| 5,027,292 A | 6/1991 | Rossignac et al. |
| 5,265,197 A | 11/1993 | Kondo |
| 5,273,038 A | 12/1993 | Beavin |
| 5,304,884 A | 4/1994 | Kitajima et al. |
| 5,321,622 A | 6/1994 | Snead et al. |
| 5,388,199 A | 2/1995 | Kakazu et al. |
| 5,428,715 A | 6/1995 | Suzuki |
| 5,455,902 A | 10/1995 | Ellson et al. |
| 5,479,593 A | 12/1995 | Brewer et al. |
| 5,481,470 A | 1/1996 | Snead et al. |
| 5,487,012 A | 1/1996 | Topholm et al. |
| 5,497,452 A | 3/1996 | Shimizu et al. |
| 5,515,078 A | 5/1996 | Greschler et al. |
| 5,561,747 A | 10/1996 | Crocker et al. |
| 5,561,748 A | 10/1996 | Niu et al. |
| 5,576,727 A | 11/1996 | Rosenberg et al. |
| 5,623,582 A | 4/1997 | Rosenberg |
| 5,625,576 A | 4/1997 | Massie et al. |
| 5,629,594 A | 5/1997 | Jacobus et al. |
| 5,633,951 A | 5/1997 | Moshfeghi |
| 5,649,076 A | 7/1997 | Nishizaka et al. |
| 5,691,898 A | 11/1997 | Rosenberg et al. |
| 5,701,140 A | 12/1997 | Rosenberg et al. |
| 5,704,791 A | 1/1998 | Gillio |
| 5,721,566 A | 2/1998 | Rosenberg et al. |
| 5,751,289 A | 5/1998 | Myers |
| 5,766,016 A | 6/1998 | Sinclair et al. |
| 5,769,640 A | 6/1998 | Jacobus et al. |
| 5,808,616 A | 9/1998 | Shimizu |
| 5,815,154 A | 9/1998 | Hirschtick et al. |
| 5,844,392 A | 12/1998 | Peurach et al. |
| 5,999,187 A | 12/1999 | Dehmlow et al. |
| 6,046,726 A | 4/2000 | Keyson |
| 6,111,577 A | 8/2000 | Zilles et al. |
| 6,115,046 A | 9/2000 | Chen et al. |
| 6,120,171 A | 9/2000 | Shaikh |
| 6,131,097 A | 10/2000 | Peurach et al. |
| 6,191,796 B1 | 2/2001 | Tarr |
| 6,308,144 B1 | 10/2001 | Bronfeld et al. |
| 6,448,977 B1 | 9/2002 | Braun et al. |
| 6,570,564 B1 | 5/2003 | Sowizral et al. |
| 6,628,280 B2 | 9/2003 | Perry et al. |
| 6,703,550 B2 | 3/2004 | Chu |
| 6,704,694 B1 | 3/2004 | Basdogan et al. |
| 6,773,408 B1 | 8/2004 | Acker et al. |
| 6,792,398 B1 | 9/2004 | Handley et al. |
| 6,803,928 B2 | 10/2004 | Bimber et al. |
| 6,809,738 B2 | 10/2004 | Hubrecht et al. |
| 6,822,635 B2 | 11/2004 | Shahoian et al. |
| 7,050,955 B1 | 5/2006 | Carmel et al. |
| 7,208,671 B2 | 4/2007 | Chu |
| 7,259,761 B2 * | 8/2007 | Shih et al. .................. 345/419 |
| 7,432,910 B2 | 10/2008 | Shahoian |
| 2002/0130820 A1 | 9/2002 | Sullivan |
| 2006/0202953 A1 | 9/2006 | Pryor et al. |

FOREIGN PATENT DOCUMENTS

| | | |
|---|---|---|
| EP | 0518648 B1 | 12/1992 |
| JP | 62-148434 A | 7/1987 |
| JP | 63-149416 A | 6/1988 |
| JP | 63-177497 A | 7/1988 |
| JP | 3-137722 A | 6/1991 |
| JP | 63-09244 A | 11/1994 |

OTHER PUBLICATIONS

Official Action from Japanese Patent Office, Application No. 7-510838 dated Dec. 22, 2009.

Open Inventor 2.1 Performance Tips, released Apr. 1996, p. 4, 6 and 8.

Open Inventor 4.0 Release Notes, released Apr. 2003, p. 5.

Seeger et al. "Controlling Force Feedback Over a Network" published as part of the Proceedings of the Second Phantom Users Group Workshop, Dec. 1997.

* cited by examiner

US 7,889,195 B2

SYSTEMS AND METHODS FOR SCULPTING VIRTUAL OBJECTS IN A HAPTIC VIRTUAL REALITY ENVIRONMENT

CROSS-REFERENCE TO RELATED APPLICATION

This application is a continuation of U.S. patent application Ser. No. 11/487,948, filed Jul. 17, 2006, which is a continuation of U.S. patent application Ser. No. 10/844,257, filed on May 12, 2004, and issued as U.S. Pat. No. 7,102,635, which is a continuation of U.S. patent application Ser. No. 10/375,517, filed Feb. 26, 2003, and issued as U.S. Pat. No. 6,831,640, which is a continuation of U.S. patent application Ser. No. 09/347,637, filed on Jul. 6, 1999, and issued as U.S. Pat. No. 6,552,722, which is a continuation-in-part of U.S. patent application Ser. No. 09/340,875, filed Jun. 28, 1999, and issued as U.S. Pat. No. 6,421,048, and which claims priority to and benefit of U.S. Provisional Patent Application No. 60/093,304, filed Jul. 17, 1998, the entire contents of which are incorporated herein by reference.

FIELD OF INVENTION

The invention relates generally to systems and methods for interacting with virtual objects in a haptic virtual reality environment, and more specifically to systems and methods for modifying virtual objects in a haptic virtual reality environment.

BACKGROUND OF INVENTION

Computers have been long used to design objects in a computerized environment. Examples are CAD (computer-aided design) systems that are used in the design of mechanical parts, such as parts used in an assembly process. For example, a designer may use a CAD system to design parts for an automobile, which are then produced and used in an automobile assembly line. Such CAD systems require significant training and understanding in using the computerized design system. CAD systems are typically difficult to use and lack the freedom and expressiveness of traditional noncomputerized drawing, sketching, and model-making procedures.

One noncomputerized approach involves modeling the object from clay using a traditional sculpting approach based on hand tools and hand sculpting techniques to add, remove, and shape the clay.

This and other approaches suffer from traditional limitations such as the time needed to hand design templates, and the difficulty or inability to recover from mistakes or return to a previous stage of design. Objects created using traditional physical modeling methods cannot be directly incorporated or used in modern digital CAD and computer-aided manufacturing (CAM) processes. In addition, foam and clay approaches cannot be combined readily in the same model.

A more modern approach uses a virtual reality technique to model objects in a computerized virtual environment. Virtual Reality (VR) is an artificial environment constructed by a computer which permits the user to interact with that environment as if the user were actually immersed in the environment. Early VR devices permitted the user to see three-dimensional (3-D) depictions of an artificial environment and to move within that environment. The reality of the VR environment is enhanced by the ability of a user to manipulate virtual objects within the virtual environment using hand motions and gestures. A user may use a virtual tool to manipulate and/or modify a computerized model or virtual object in the virtual environment.

Many existing virtual reality techniques do not provide for a realistic feeling of sculpting by the user. The user cannot feel when virtual tools touch or modify the virtual object. Moreover, in some cases, the virtual tool may pass through the virtual object without any impediment, thereby severely degrading the realism of the experience and the user's ability to finely control the modification.

SUMMARY OF INVENTION

Thus, there is a need for a 3-D computerized modeling system that overcomes the problems of CAD techniques and traditional noncomputerized modeling techniques. One object of the present invention is to provide a computerized 3-D virtual reality modeling system that provides the ease and expressiveness of traditional hand model-making approaches as well as integration into the digital design and manufacturing process offered by CAD/CAM techniques.

Being able to feel the virtual object allows the user to resolve visual ambiguities, such as a shape that may appear either concave or convex as perceived by an observer. The user may rely on haptic feedback when modifying the object such as scratching a slight groove in the object, which the user then deepens or expands while receiving feedback through the tool on the shape and current depth of the groove. Feedback also allows the designer to monitor and modulate the cutting rate or amount of change induced by the virtual tool. Haptic feedback also helps the user navigate around and on the surface of the object; that is, using the feel of the object to know where the virtual tool is on the object.

One embodiment of the invention provides a method for a virtual tool including multiple points to interact with a virtual object in a computerized modeling virtual environment. In a 3-D sculpt mode, a user uses a virtual tool to interact with and modify a 3-D virtual object to produce a model.

The invention relates to a method for creating or modifying a virtual object in a haptic virtual environment, including the steps of determining a virtual tool having discrete points for use by the user in the haptic virtual environment; selecting a modification mode for the virtual tool; sensing a location of a user in real space; determining locations of the points of the virtual tool relative to a position of the virtual object; calculating an interaction force between the virtual tool and the virtual object based on the locations of the points and the position of the virtual object; producing a new or modified virtual object by modifying the virtual object based on the modification mode, the locations of the points of the virtual tool, and the location of the virtual object; and outputting the modified virtual object.

In another embodiment of the invention, the method includes determining a virtual surface for the virtual object, and determining a position and orientation of the virtual tool by determining the location of the points of the virtual tool relative to the virtual surface. In a further embodiment the method includes determining the virtual surface to be a virtual isosurface. In one embodiment, the virtual object is a volumetric representation.

In one embodiment the method includes selecting a material removal, a material addition, or a material modification mode. In another embodiment, the method includes determining one or more virtual constraints for the movement of the virtual tool. In another embodiment, the method includes exporting the created or modified virtual object to other formats, including other file types and physical media.

In one embodiment, the method includes modifying a volumetric (voxel-based) object, converting the object to an exported surface, such as a polygonal surface, and exporting the exported surface to a storage media, such as a disk. In another embodiment, the method includes exporting the exported surface to a 3-D printer or stereo-lithographic machine. In a further embodiment, the exported surface is a geometry consisting of one or more non-uniform rational b-splines.

In one embodiment, the method includes importing an imported surface, such as a polygonal or other surface representation, converting it to a volumetric object, and modifying the volumetric object.

In one embodiment the method includes importing a surface, converting it to a volumetric object, modifying the object, converting the object to an exported surface, and exporting the exported surface.

The importing and/or exporting of a surface may be done in a haptic virtual environment, or a virtual environment without haptics.

The invention also relates to a system for modifying a virtual object by a user in a haptic virtual environment. The system includes a virtual tool, a haptic interface device, and a modeling application. The virtual tool includes a plurality of discrete points for use by the user in the haptic virtual environment, wherein the user selects a modification mode for the virtual tool. The haptic interface device senses a location of the user in real space. The modeling application determines locations of the points of the tool relative to a location of the virtual object; calculates an interaction force between the virtual tool and the virtual object based on the locations of the points and the location of the virtual object; produces a modified virtual object by modifying the virtual object based on the modification mode; the locations of the points, and the location of the virtual object; and outputs the new or modified virtual object.

In one embodiment, the virtual object includes a virtual surface and the modeling application determines the position and orientation of the virtual tool by determining the locations of the points relative to the virtual surface. In another embodiment, the virtual surface is a virtual isosurface. In a further embodiment, the virtual object is a volumetric representation.

In another embodiment, the modification mode is a material removal, material addition, or a material modification mode. In a further embodiment, the user of the system determines one or more virtual constraints for the movement of the virtual tool. In an additional embodiment, the modeling application exports the created or modified virtual object to other formats, including other file types and physical media.

In one embodiment, the modeling application modifies a volumetric (voxel-based) object, converts the object to an exported surface, such as a polygonal surface, and exports the exported surface to a storage media, such as a disk. In another embodiment, the modeling application exports the exported surface to a 3-D printer or stereo-lithographic machine. In a further embodiment, the exported surface is a geometry consisting of one or more non-uniform rational b-splines.

In one embodiment, the modeling application imports an imported surface, such as a polygonal or other surface representation, converts it to a volumetric object, and modifies the volumetric object.

In one embodiment the modeling application imports a surface, converts it to a volumetric object, modifies the object, converts the object to an exported surface, and exports the exported surface.

The importing and/or exporting of a surface may be done in a haptic virtual environment, or a virtual environment without haptics.

In another embodiment, the invention relates to a method for interfacing with a virtual object in a haptic virtual environment, including generating a virtual object including a virtual surface in the haptic virtual environment; setting a constraint geometry in the haptic virtual environment; determining a virtual tool for use by the user in the haptic virtual environment; sensing a location of a user in real space; determining a haptic interface location in response to the position of the user in real space; determining a position of the virtual tool in the haptic virtual environment in comparison to the haptic-interface location, the virtual surface and the geometric constraints; constraining an action of the virtual tool based on (i) the constraint geometry, (ii) the virtual surface, (iii) the position of the virtual tool, and (iv) the haptic interface location.

In another embodiment, the method includes setting a constraint point, a constraint curve, and a constraint surface. In a further embodiment, the method includes moving the position of the origin of the virtual tool to coincide with the haptic interface location. In one embodiment, the method includes creating or modifying the virtual object based on the position of the virtual tool. In another embodiment, the method includes calculating an interaction force among the constraint geometry, the virtual object, and the virtual tool in response to determining the position of the virtual tool.

In one embodiment, the method includes selecting a modification mode for the virtual tool and modifying the virtual object in response to the modification mode and the position of the virtual tool.

In another embodiment, the method includes constraining the translation of the virtual tool. In a further embodiment, the method includes constraining the rotation of the virtual tool.

The invention also relates to a system for interfacing with a virtual object in a haptic virtual environment, the system including the virtual object having a virtual surface; a virtual tool for use by the user in the haptic virtual environment; a constraint geometry limiting the movement of the virtual tool; a haptic interface device, which senses a location of the user in real space; and a modeling application. The modeling application determines a haptic interface location in the haptic virtual environment in response to the location of the user in real space; determines a position of the virtual tool in comparison to the haptic interface location, the location of the virtual surface and the constraint geometries; constraining an action of the virtual tool based on (i) the constraint geometry, (ii) the virtual surface, (iii) the position of the virtual tool, and (iv) the haptic interface location.

In one embodiment, the constraint geometry is one or more of a constraint point, a constraint curve, and a constraint surface. In another embodiment, the modeling application determines the position of the virtual tool by moving the position of the virtual tool towards the haptic interface location. In a further embodiment, the modeling application modifies the virtual object based on the position of the virtual tool. In another embodiment, the modeling application calculates an interaction force among the constraint geometry, the virtual object, and the virtual tool in response to determining the position of the virtual tool.

In one embodiment, the system includes a modification mode, and the modeling application modifies the virtual object in response to the modification mode and the position of the virtual tool. In another embodiment, the action of the virtual tool includes a translation of the virtual tool. In a further embodiment, the action of the virtual tool includes a rotation of the virtual tool.

BRIEF DESCRIPTIONS OF THE DRAWINGS

The invention is pointed out with particularity in the appended claims. The above and further advantages of this invention may be better understood by referring to the following description taken in conjunction with the accompanying drawings, in which:

FIG. 1 depicts a functional block diagram of a system for one embodiment of the invention, including a haptic interface device, modeling application, and graphics display;

FIG. 2A provides a pictorial view of a virtual environment including a virtual object and a virtual tool, for one embodiment of the invention;

FIG. 2B provides a pictorial view of a virtual tool contacting the virtual surface of a virtual object in connection with a haptic interface location within the virtual object, for the embodiment of the invention shown in FIG. 2A;

Figures 14A, 14B, 14C:
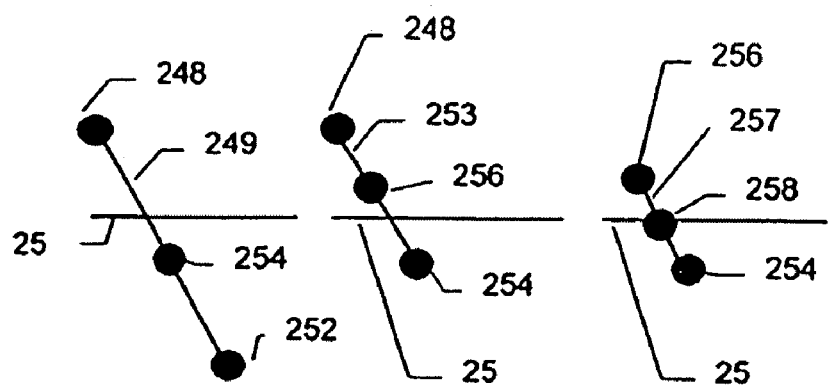
Figure 15:
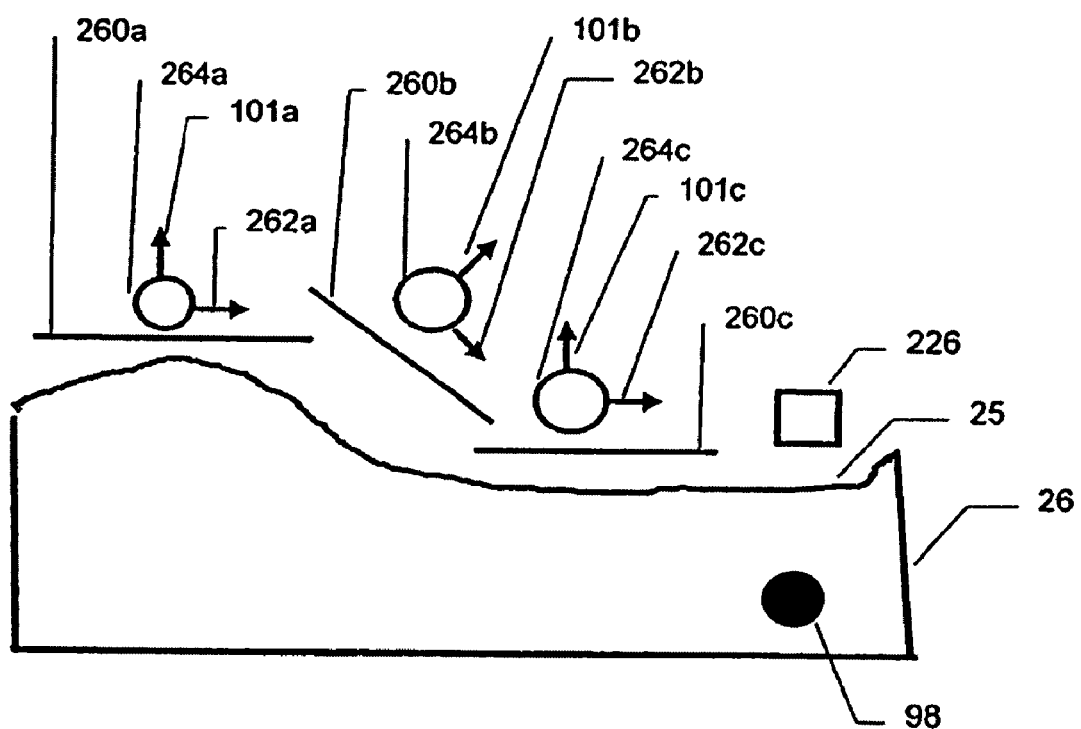
Figure 16A:
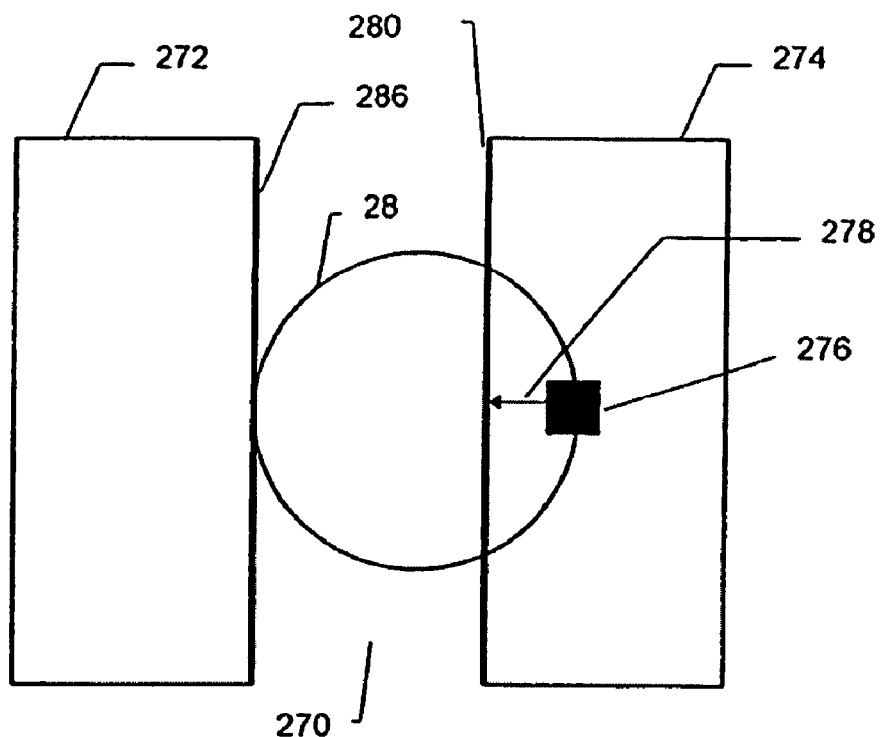
Figure 16B:
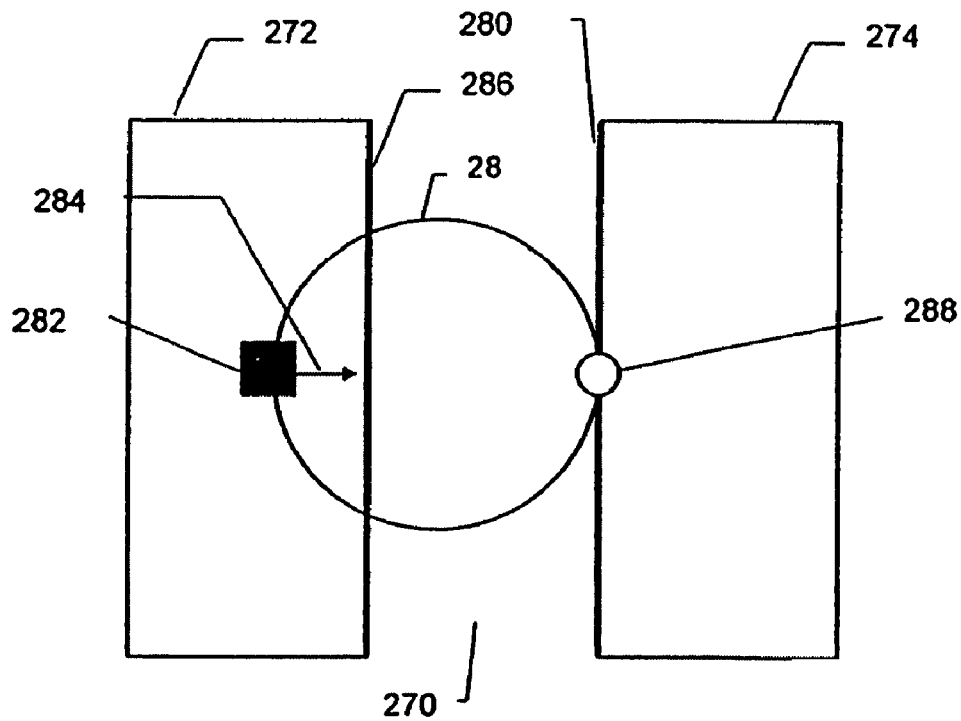

FIGS. 14A, 14B, and 14C illustrates pictorial views of a virtual surface and the endpoints of a segment that intersects the a virtual surface of a virtual object for one embodiment of the invention;

FIG. 15 illustrates a pictorial view of previous surface contact points, tangency planes, and resulting surface contact point for one embodiment of the invention;

FIGS. 16A and 16B show a pictorial view of a spherical virtual tool in a channel formed between two virtual objects and;

FIGS. 17A-17E show pictorial views of a virtual tool encountering a surface and moving along the surface constrained by a constraint plane.

Figure 18:
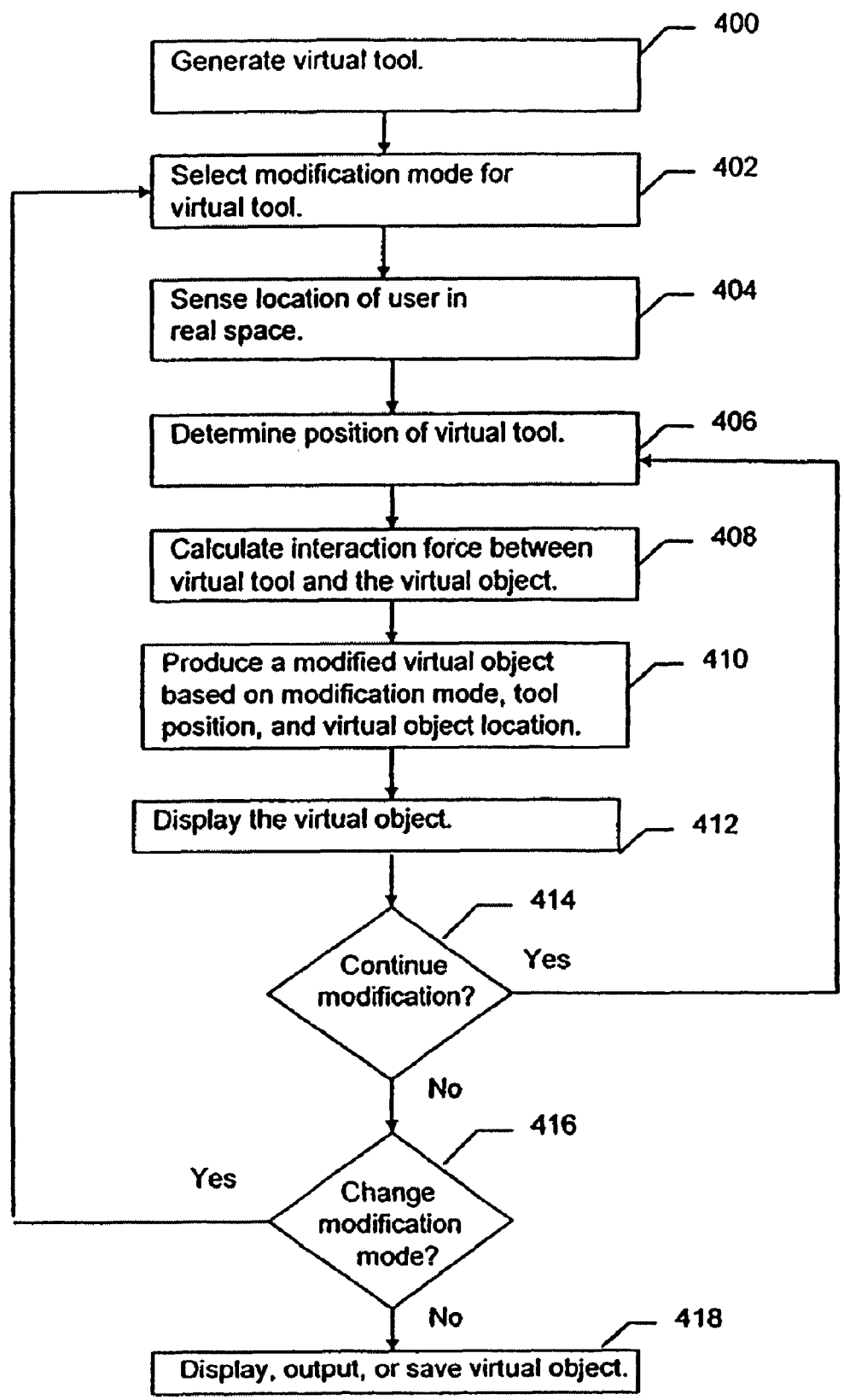
Figure 19A:
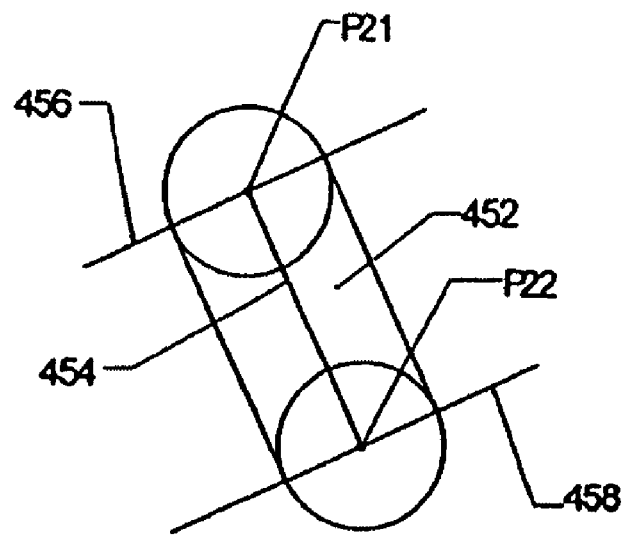
Figure 19B:
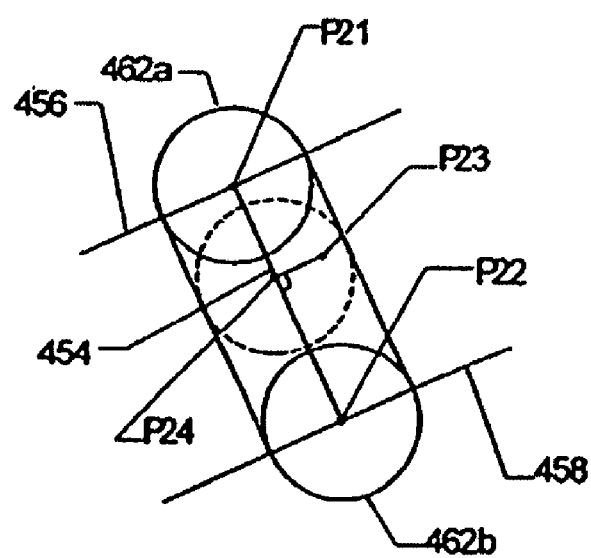
Figure 20:
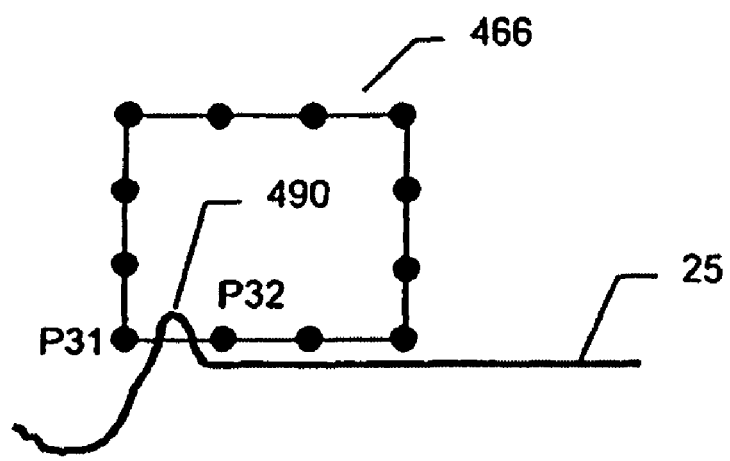
Figure 21:
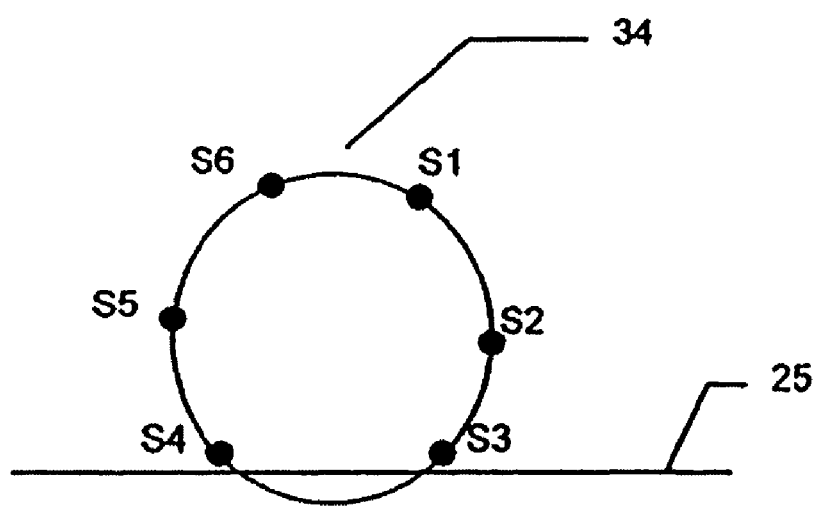
Figure 22:
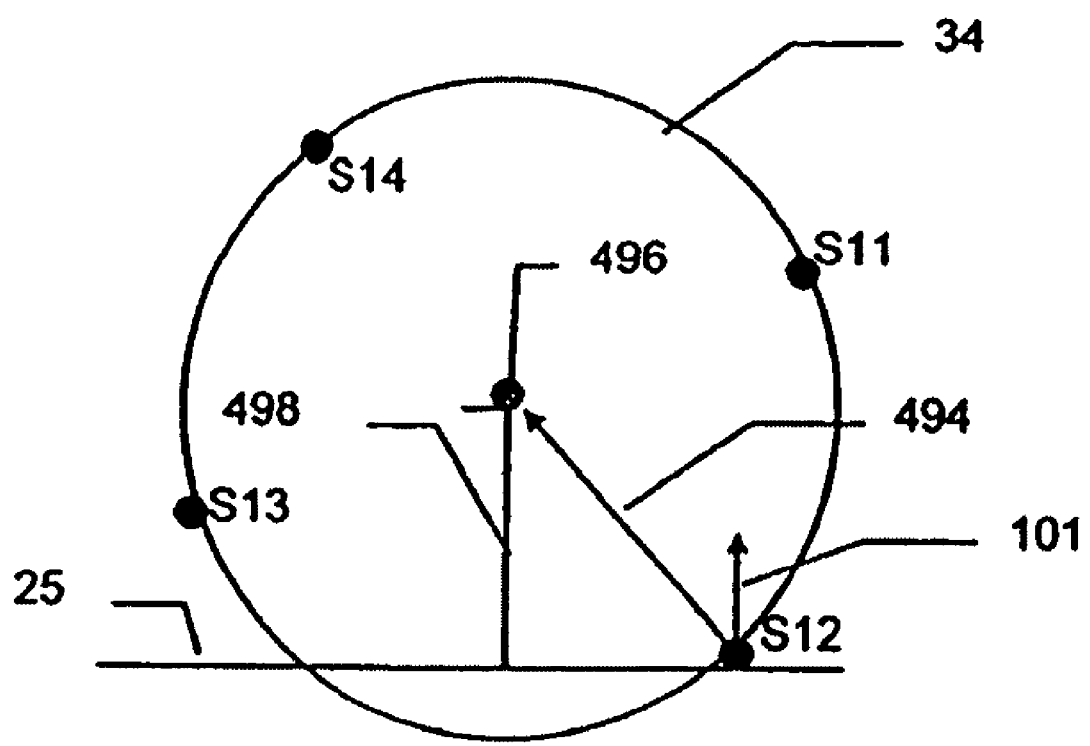
Figure 24:
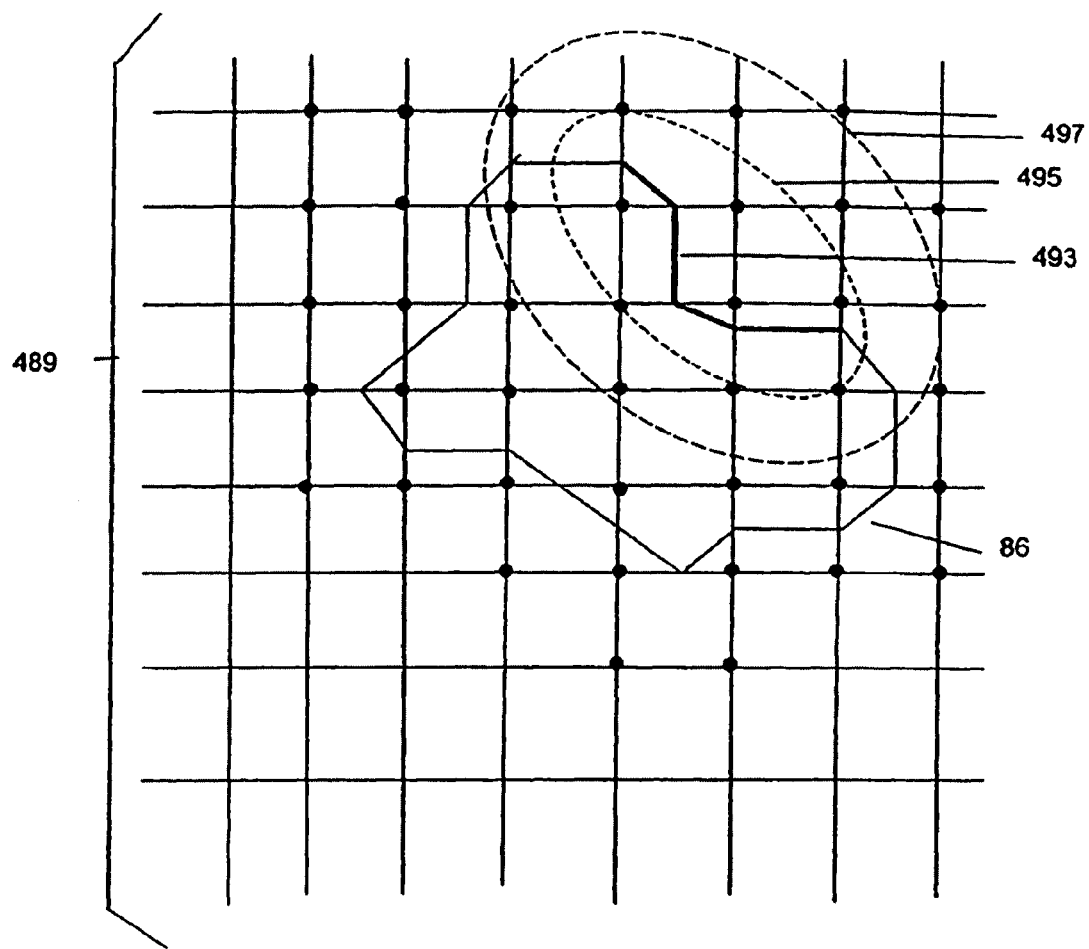
Figure 25:
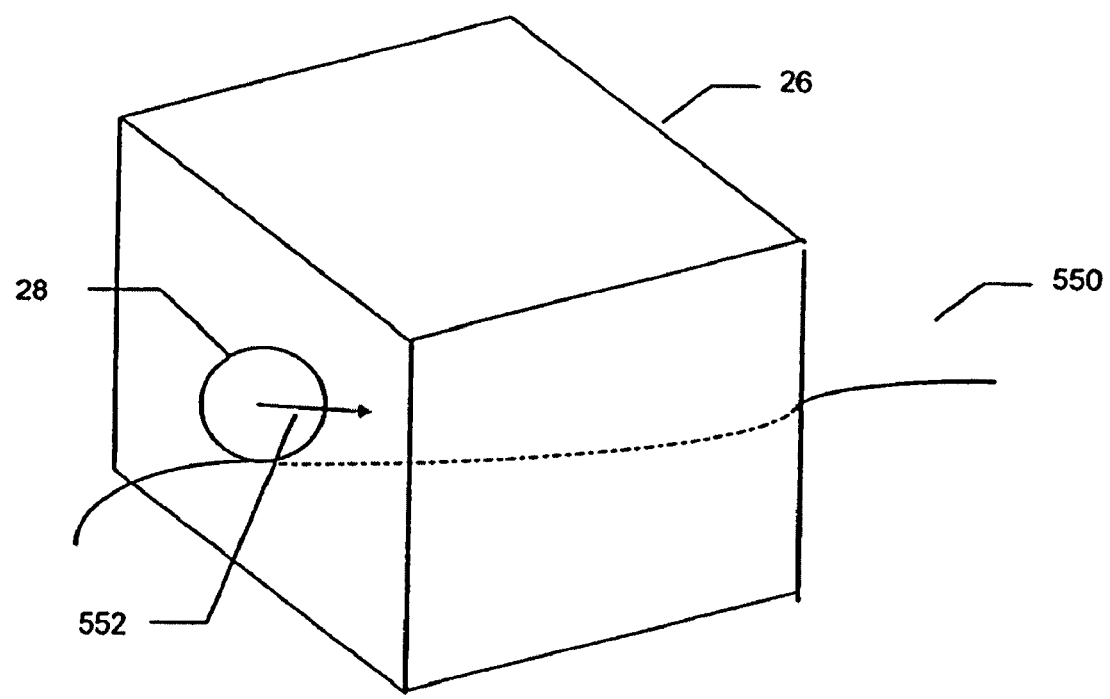
Figure 26:
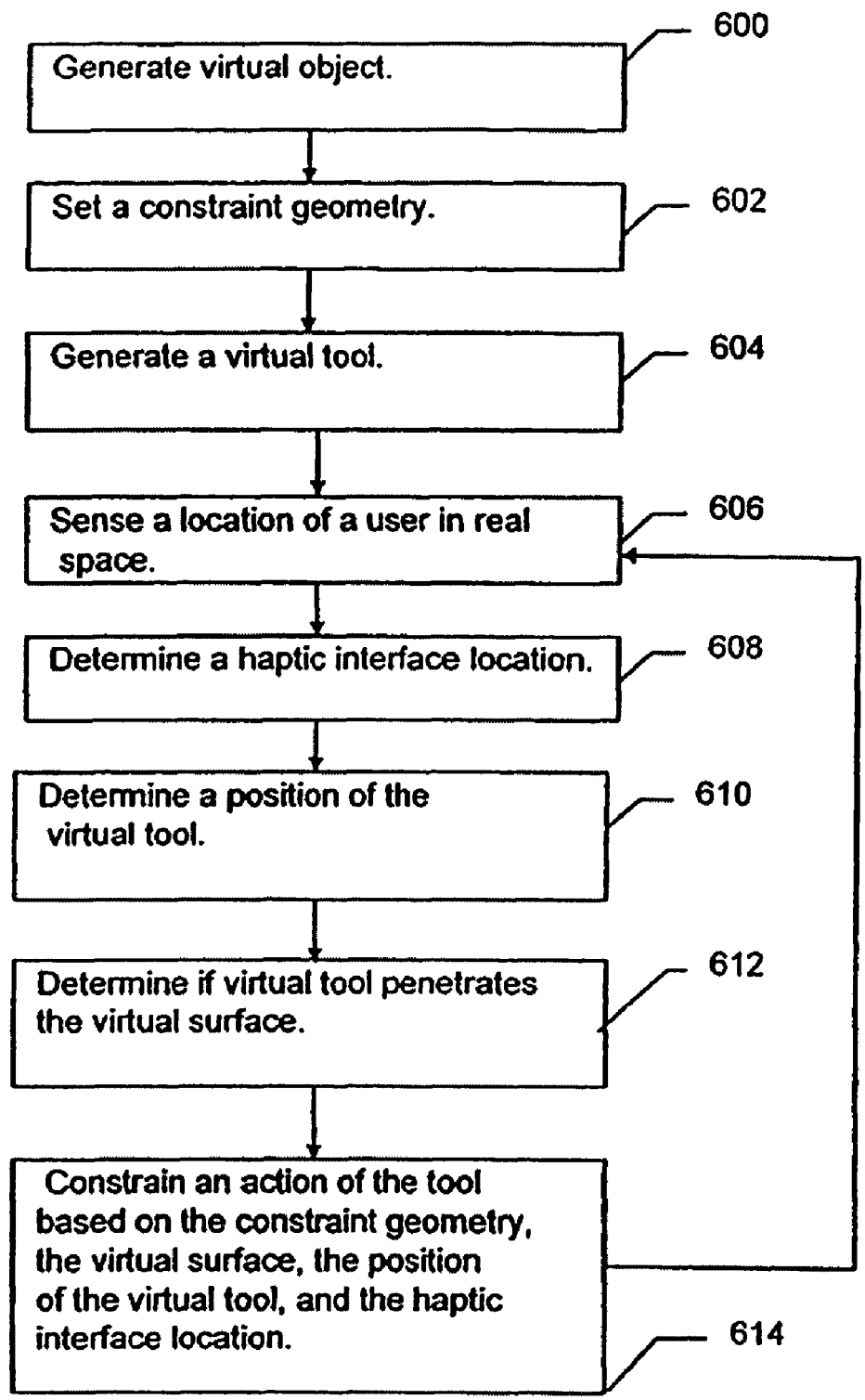
Figure 27:
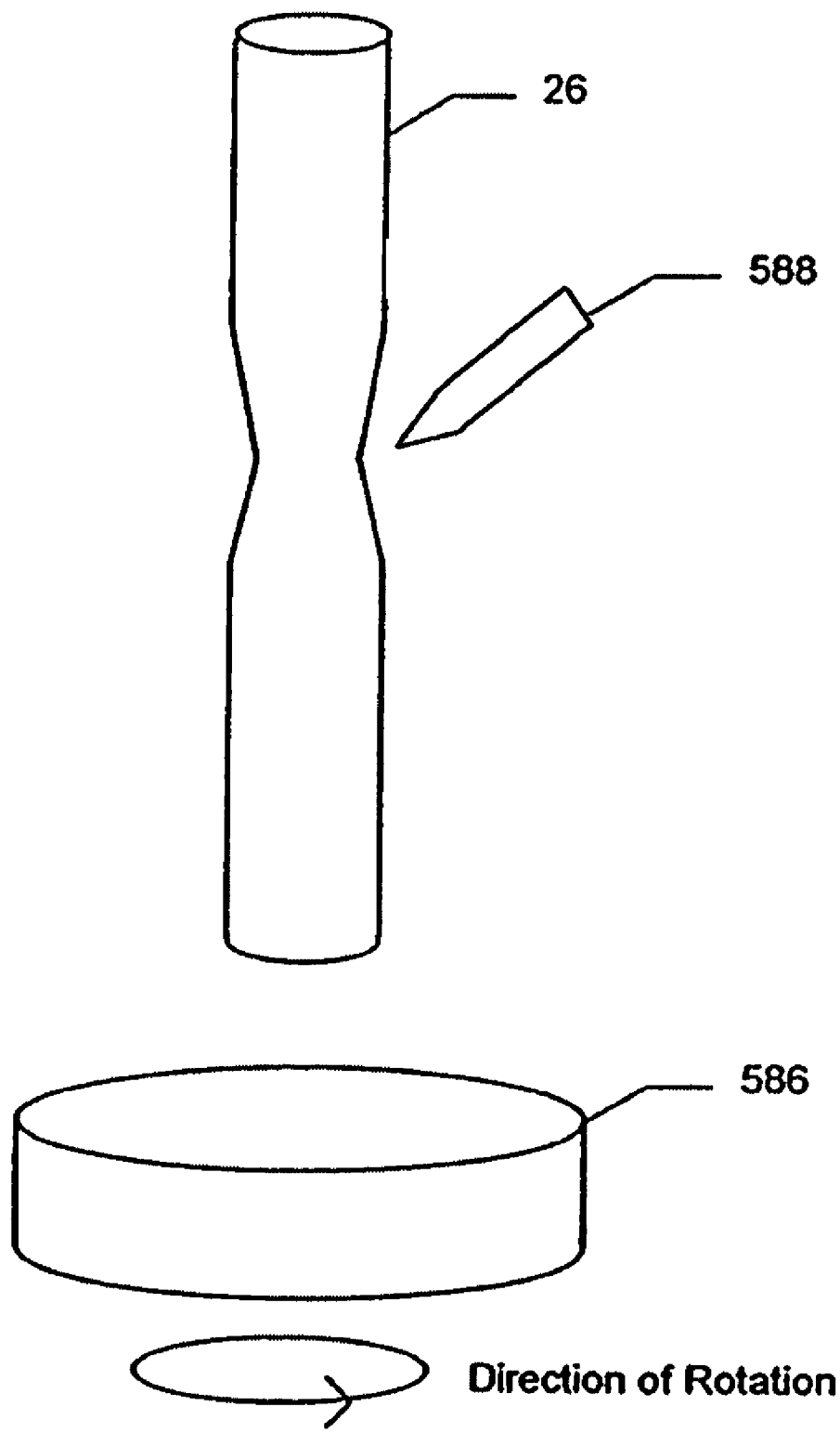

FIG. 18 illustrates a flowchart of the modification process occurring between a virtual tool and virtual object, for one embodiment of the invention;

FIG. 19A provides a pictorial view of a swept area based on a removal line between two points, for one embodiment of the invention;

FIG. 19B provides a pictorial view of endpoints, a desired point, a projected point, endpoint planes, and a projected plane, for the embodiment of the invention illustrated in FIG. 19A;

FIG. 20 provides a pictorial view of a cube near a virtual surface of a virtual object with a protruding feature of the virtual surface penetrating between two points of the cube;

FIG. 21 provides a pictorial view of a sphere penetrating a virtual surface between two points of the sphere;

FIG. 22 provides a pictorial view of a sphere represented by multiple points penetrating a virtual surface, as well as illustrating a calculated distance between the origin of the sphere and the virtual surface;

FIG. 23A-23D illustrates pictorial views of a virtual tool with outrigger constructs including arms and outriggers connected to the handle of the virtual tool;

FIG. 24 illustrates a pictorial view of a painted area of the surface of a virtual object and a corresponding selection volume;

FIG. 25 illustrates a pictorial view of a virtual tool moving through a virtual object, constrained by the geometric constraint of a curved line;

FIG. 26 illustrates a flowchart of the process of setting a geometric constraint and using the geometric constraint to constrain the movement of a virtual tool; and FIG. 27 illustrates a pictorial view of a virtual lathing tool and a virtual object rotating in virtual space under the control of a control wheel.

DETAILED DESCRIPTION OF THE INVENTION

The description includes headings and subheadings that aid in organizing the text, but are not meant to be limiting in any way. Topics discussed under a heading or subheading may also be described elsewhere throughout the specification.

Figure 1:
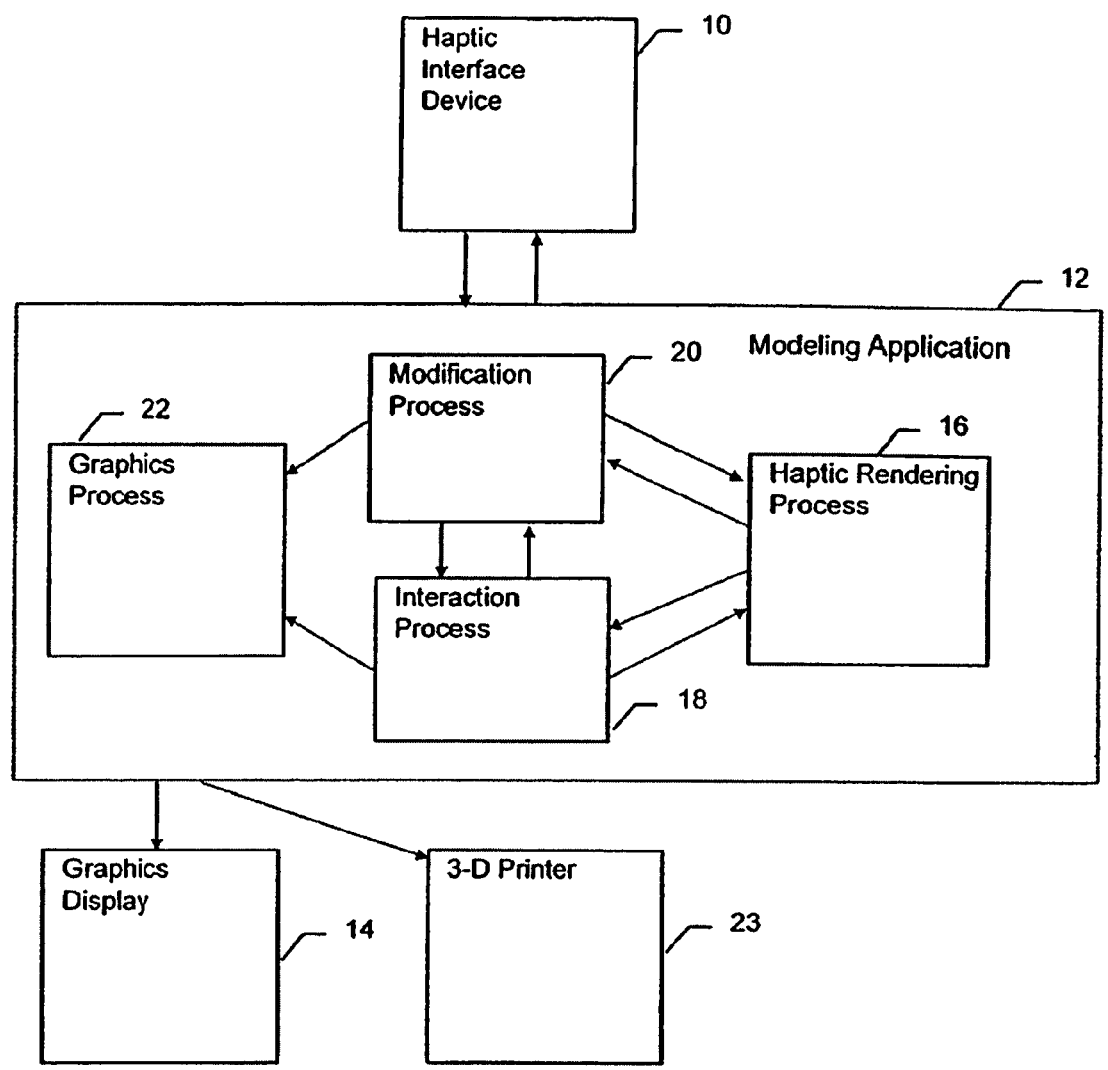

FIG. 1 shows a system for one embodiment of the invention, including a haptic interface device 10, modeling application 12, and graphics display 14 in electrical communication with each other. The modeling application 12 includes a haptic rendering process 16, a virtual tool and object interaction process 18, a virtual object modification process 20, a graphics process 22, and a 3-D printer 23 all in electrical communication with each other.

Generally, a user of the system uses the haptic interface device 10 to interact with the virtual object 26 (see FIG. 2) receiving force feedback produced by the haptic rendering process 16 and viewing graphics rendered by the graphics process 22 on a graphic display 14.

The user may also output the virtual object 26, or a surface representation of it, to a 3-D printer 23 to produce an actual 3-D physical model of the virtual object 26. In one embodiment, the 3-D printer is a stereolithography machine.

Software Process

In one embodiment, a "process", as referred to in FIG. 1, is a software process executing on a hardware microprocessor. All the processes may execute on one microprocessor, or in other embodiments, one or more processes may execute on different microprocessors, which are linked by buses, cables, local networks, wide area networks, or global computer networks, such as the Internet.

The modeling application 12 is viewed in FIG. 1 as a software application executing on one computer system. In another embodiment, the modeling application 12 executes on one or more computer systems connected by a communications device, such as a bus, cable, or network connection. In an alternate embodiment, the modeling application is a hardware device, such as an ASIC (application specific integrated circuit), and one or more processes of the application are implemented on one or more ASIC devices. In a further embodiment, the modeling application 12 is implemented as one or more objects, which may execute on one or more computer systems. In one embodiment, the modeling application 12 runs on a dual 300 MHz Intel® Pentium® 2 computer running Microsoft® Windows NT™ 4.0 using an Open GL accelerated graphics card.

The modeling application 12 is not required to include a haptic rendering process 16, an interaction process 18, a modification process 20, and a graphics process 22. In one embodiment, the functions of the modeling application 12 are implemented by a different number of processes. In one embodiment, the modeling application 12 includes the haptic rendering process 16 and the graphics process 22.

In one embodiment, the invention is implemented using an object-oriented approach. The haptic rendering process 16 and other processes are implemented as software objects. In another embodiment, the virtual object 26 and the virtual tool 28 are implemented as software objects and perform one or more of the functions of the haptic rendering process 16. In one embodiment, the virtual tool 28 is a software object that performs such functions as determining if contact has occurred with a virtual object 26 and determining the surface direction vector 101, as will be discussed later.

In one embodiment, the virtual object 26 and the virtual tool 28 are implemented as software objects in the C++ programming language. In other embodiments, the virtual object 26 and virtual tool 28 are implemented using an object-oriented programming language other than C++.

In one embodiment, the modeling application is a computer program stored on a computer readable storage media, such as a CD disc, diskette, tape, or other media. In another embodiment, the modeling application is a computer program distributed over a computer-readable propagated signal, such as a program distributed over the Internet.

Haptic Interface Device

In one embodiment, the system includes a haptic interface system, as shown in FIG. 1, including the haptic interface device 10 and the haptic rendering process 16 which generates a virtual object of the virtual environment to be "touched" and determines the results of the interaction (discussed in more detail below). The haptic interface device 10 is a tactile or force-feedback device which provides the touch sensations of interacting with virtual objects 26 to a user of the system. Some haptic interface devices 10 consist of an electro-mechanical linkage which can exert a controllable force on a user's hand. See, for example, U.S. Pat. No. 5,625,576 issued to Thomas H. Massie and J. Kenneth Salisbury, Jr., the disclosure of which is herein incorporated by reference in its entirety. As used herein, "haptic rendering" refers to the creation of a virtual environment with which a user can interact through the sense of touch. The term "haptic rendering process" 16 refers to the computer program which generates the haptic aspects of the virtual environment and determines the forces to be applied to a user through a haptic interface. The haptic rendering process 16 generates haptic representations of virtual objects in the virtual environment.

Overview of Device, Virtual Object and User Interaction

Figure 2A:
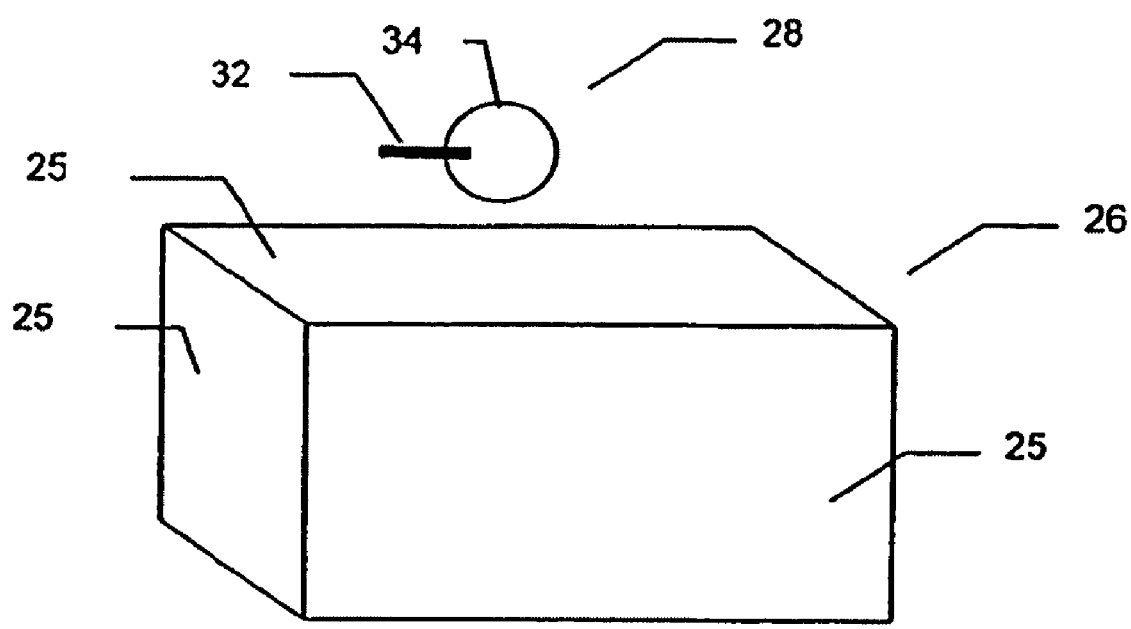

FIG. 2A shows a haptic virtual environment including a virtual object 26 and a virtual tool 28. The virtual object 26 of the embodiment shown in FIG. 1 is depicted as a 3-D (three dimensional) block of material typically "floating" in the virtual space of the virtual environment. The virtual object 26 has a virtual surface 25 that represents the "skin" of the virtual object 26. The virtual tool 28 is represented in FIG. 2A as a sphere 34 with a rod or "handle" 32 connected to it.

In one embodiment, the user uses a haptic interface device 10 in real space to grasp or manipulate the handle 32 of the virtual tool 28 in virtual space. In one embodiment, the location of this handle with respect to the virtual tool 28 can be changed interactively by the user. As used herein, a "haptic virtual environment" refers to a computer-generated virtual environment that can be explored by a user through the sense of touch. In one embodiment, the haptic virtual environment contains a virtual object 26 that is model of a real world object that a user is creating in the virtual environment. In another embodiment, the haptic virtual environment incorporates two or more virtual objects 26 that are linked to each other, such as in a hierarchical arrangement. It should be understood that the interaction and/or modification methods described herein may be readily extended to apply to two or more virtual objects 26 linked or associated in a haptic virtual environment.

Figure 2B:
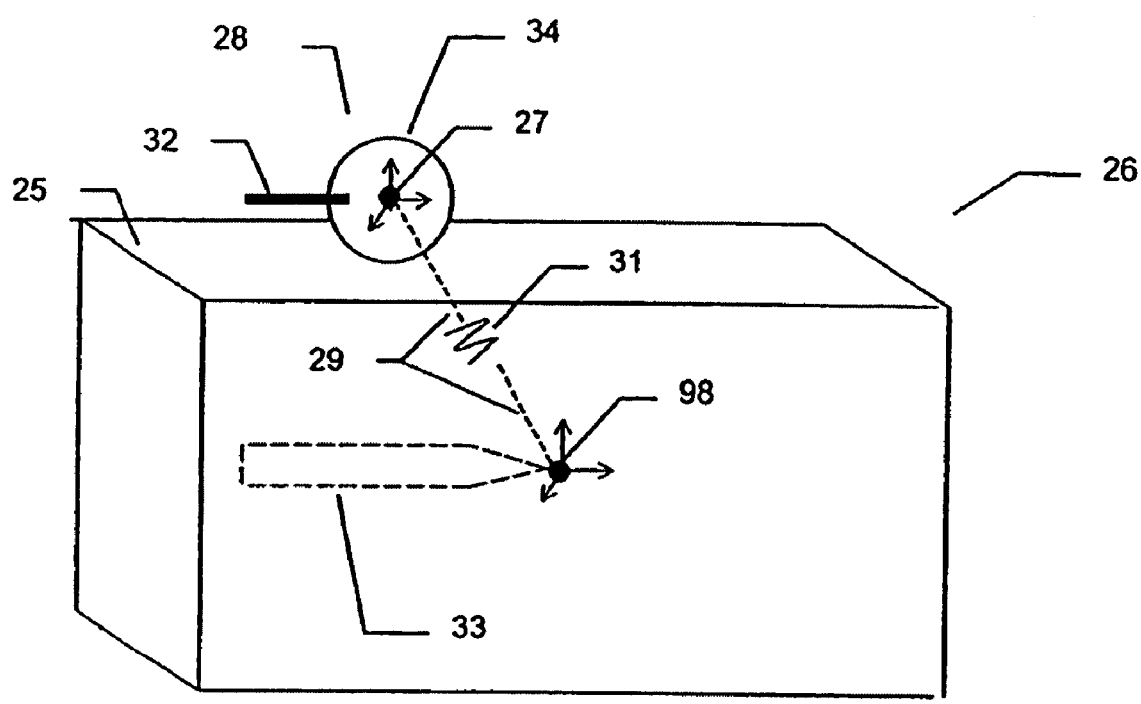

FIG. 2B illustrates a virtual tool 28 contacting the virtual surface 25 of a virtual object 26. The user guides the virtual tool 28 using the haptic interface device 10, represented, in this embodiment, by a stylus 33 in FIG. 2B. The position and orientation of the tip of the stylus 33 indicate the haptic interface location 98. Note that, although the user may be manipulating a literal stylus in some embodiments, the haptic interface location 98 could be controlled by a user interacting with any number of differently shaped elements such as a thimble, a yoke, or a ball. The tip of the virtual stylus 33 is indicated by the haptic interface location 98. In one embodiment, the haptic rendering process 16 tracks the haptic interface location 98, but does not otherwise track the shape or location of the entire haptic interface device 10.

The haptic rendering process 16 attempts to move the virtual tool 28 so that the origin 27 of the virtual tool 28 matches the haptic interface location 98. However, unless the haptic rendering process 16 is using the virtual tool 28 to remove material from the virtual object 26, then the haptic rendering process 16 typically does not allow the virtual tool 28 to penetrate the virtual object 26. Thus, as shown in FIG. 2B, the user has attempted to move the virtual tool 28 into the virtual object 26, which is indicated by the haptic interface location 98 within the virtual object 26. The haptic rendering process 16 calculates a resistance to the movement of the virtual tool 28 into the virtual object 26. This calculation is based on a connection 29 between the tool origin 27 and the haptic interface location 98, as will be discussed in more detail later. In one embodiment, the connection 29 includes a virtual spring 31. In one embodiment, the connection 29 includes a virtual dash-pot. Thus, if the user attempts to move the virtual tool 28 further into the virtual object 26, the haptic rendering process 16 calculates an increasing resistance force that is fed back to the user through the haptic interface device 10 based on the virtual spring 31.

In one embodiment, the user is allowed to move the virtual tool 28 through the virtual object 26 without resistance while removing material. In this case, the user selects a transparent or translucent mode, and the virtual tool 28 appears translucent. The haptic rendering process 16 allows the user to move the virtual tool 28 through the virtual object 26 without constraint or resistance.

Description of Virtual Tool and Modification Options

As already described, the user interacts with the virtual object 26 in the virtual environment through a virtual tool 28. The user may select any shape for the tool 28. The shape of the tool 28, along with other characteristics, such as interaction mode, determine the interaction with the virtual object 26. In one embodiment, the tool 28 may be represented as a series of discrete points in virtual space which outline a three-dimensional shape of the tool 28. The virtual tool 28 is modeled as a set of discrete points for the purposes of haptic interaction and collision detection with the virtual object 26. In another embodiment, the points of the virtual tool 28 are created by an algebraic equation or any other continuous or piecewise mathematical method suitable for determining a 3-D shape in a virtual environment. In another embodiment, the tool 28 can be represented directly by continuous or piecewise mathematical equations, rather than by discrete points. The virtual tool 28 may take on any of a number of shapes that may be useful for a user when using a virtual tool 28 to create a virtual object 26 in the virtual environment. Typical shapes may include a sphere or cylinder. In another embodiment, the user selects one or more interaction modes for the virtual tool 28, such as a sandpaper mode, which causes the tool 28 to remove material gradually from the virtual object 26, much like using real sandpaper to smooth the shape of a block of wood in the real world.

Creating and Manipulating the Virtual Object

Figure 3:
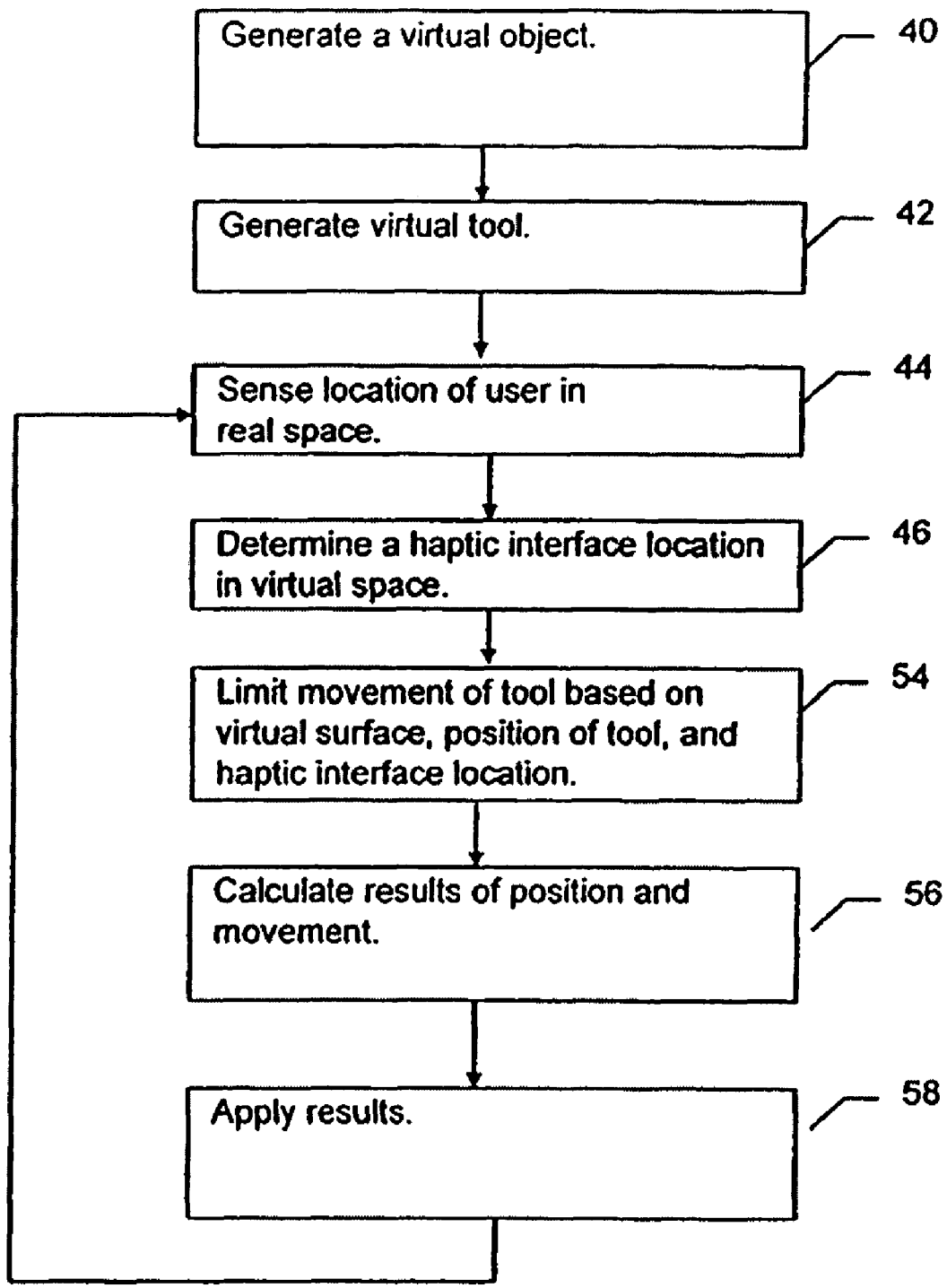
FIG. 3 illustrates a high-level flowchart of the haptic rendering process between a virtual tool and virtual object, for one embodiment of the invention.

FIG. 3 illustrates a flowchart of the haptic rendering process between a virtual tool 28 and virtual object 26. First, a virtual object 26 is generated (step 40). Typically, this occurs when the user requests that an initial virtual object 26 be created, for example, by directing that the virtual object 26 assume a 3-D cube or "block" shape. In one embodiment, the initial virtual object can be defined as a shape generated from a saved file, scanner, or 3D digitizer. In one embodiment, the user selects an interaction mode that selects the characteristic of the virtual object 26. The shape and material, and surface properties of the virtual object 26 can be specified, for example, the hardness or softness of the object 26. For example, if the user selects a sculpting mode, then the virtual object 26 assumes characteristics generally representative of a block of clay. If the user selects a 3-D sketch mode, then the virtual object 26 is overlaid with a stack of planes or slices, and the user sketches a template on the surface of one of the planes. However, the virtual object 26 is not required to assume a cube or block shape and may assume any 3-D shape that the user finds useful when starting to design a model from the virtual object 26. In one embodiment, the object properties permit only manipulation or movement of the virtual object 26 without any sculpting or other modification thereof. The modification mode is not limited to what is described here, but, in other embodiments, is based on other modes of interaction or modification that a user finds useful. For example, other modes may include smoothing the surface of the virtual object 26, shifting material, or mirroring all or parts of the object 26.

In one embodiment, the virtual object 26 is created by the modification process 20 under the directions of the user, and then the graphics process 22 displays a corresponding representation of the virtual object 26 to the user.

If the user selects a 3-D sketch mode, then the virtual object 26 is overlaid with a stack of planes or slices, and the user sketches a template on the surface of one of the planes.

Generating the Virtual Tool

In the next step, a virtual tool 28 is generated (step 42). In one embodiment, the user selects a shape and characteristics for the virtual tool 28, which the haptic rendering process 16 generates in the virtual environment. The graphic process 22 then displays a corresponding version of the virtual tool 28 to the user on a graphics display 14. For example, the virtual tool 28 can assume different shapes and interaction or modification characteristics. The tool 28 can assume any 3-D shape, such as a sphere 34 or a cube, or a substantially 2-D shape, such as a spatula or knife. In general, modes include a material removal, material addition, or other material modification mode such as smoothing. In one embodiment, removal modes include Boolean removal, sand paper removal, and removal using the concept of a function which falls off gradually. Additional modes include Boolean addition, Boolean pull, and pull using a fall-off function. An additional form of interaction and modification includes a sketch mode for sketching a template on the surface of a virtual object 26. Used here, Boolean refers to adding or subtracting two geometries to arrive at a third geometry.

Sensing User Location

In the next step, sensors determine the location of a user in real space (step 44). In one embodiment, the sensors are any type of sensors useful in determining the location of a user, such as the location of a hand in real space. Such sensors could be based on measurements of location based on mechanical, electrical, magnetic, optical, or other sensing devices. In one embodiment, the haptic interface device 10 senses the location of the user in real space. For example, the user physically manipulates the haptic interface device 10, such as a handgrip or stylus, in real space and the location of this device is determined in real space. In one embodiment, one such haptic interface device 10 is the PHANToM® device from SensAble Technologies, Inc., Cambridge, Mass. Generally, the PHANToM® device can sense six degrees of freedom −x, y, z, pitch, roll, yaw, while providing for force feedback in three degrees of freedom −x, y, z. One embodiment of this invention includes a haptic interface that can provide more than three degrees of force feedback.

As used herein, "real world space" is defined as the real world environment. The haptic rendering process 16 utilizes the information obtained by the sensors to determine the haptic interface location 98 in the virtual environment. As used herein, "haptic virtual environment" refers to the region in the computer generated virtual environment with which the user can interact through the sense of touch. The location of the haptic interface describes the location of the user in the haptic virtual environment.

Correlating User Location and Virtual Tool Position

In one embodiment, the haptic rendering process 16 then translates the location of the haptic interface device 10 in real space into a corresponding location in the haptic virtual environment, which is the haptic interface location 98 (step 46). Then the haptic rendering process 16 uses a method to limit the movement of the tool 28 based on the virtual surface 25, the position of the tool 28, and the haptic interface location 98 (step 54). The objective of the method is to move the tool 28 as close as possible to the haptic interface location 98, without crossing the virtual surface 25 and using a path for the tool 28 that yields progressively better locations for the tool 28, which typically means locations closer to the haptic interface location 98. This method is discussed in detail later.

Typically, the haptic rendering process 16 analyzes the interaction and calculates results based on the potential position of the virtual tool 28 relative to the virtual object 26 (step 56). Then the results are applied to the virtual tool 28 and/or the user (step 58).

Calculation of Force

For example, if the movement of the virtual tool 28 is constrained such that the virtual tool origin 27 is not coincident with the haptic interface, the haptic rendering process 16 may calculate an interaction force to be applied to the haptic interface device 10, so that the user feels a resistance to trying to move the virtual tool 28 into the virtual object 26. In this case, the results are a feedback force applied to the user via the haptic interface device 10 and corresponding constraints or limits on the movement of the virtual tool 28 (step 56). The force feedback provides the user important non-visual information about the shape of the virtual object, whether the interaction mode is object modification or simply evaluating the shape of the object.

Interaction and Modification

In one embodiment, if the user is using the virtual tool 28 in an interaction mode, such as sandpaper, then the modification process 20 calculates changes in the virtual object 26, such as material being removed, which in turn changes the graphical representation of the virtual object 26. The results, in this case, are a modification to the virtual object 26 (step 58). Interaction modes need not result in modification of the virtual surface. For example, in another case, the user may be trying to use the virtual tool 28 to evaluate the shape of the virtual object 26 without trying to modify the object 26. In this case, the results are limits on the movement of the virtual tool 28 without any penetration or modification of the virtual object 26. Another example is if the user presses the virtual tool 28 into a virtual object 26 in an erase or removal mode, but does not press with enough force, then the virtual tool 28 remains at the surface or may skirt along the surface of the virtual object 26 without removing any material. The results, in this case, are constraints on the movement of the virtual tool 28 (step 58). The calculation and application of results (steps 56 and 58) are not confined to what is described here but involve other effects depending on many factors, such as the shape of the virtual tool 28, the characteristics of the virtual tool 28, the characteristics of the virtual object 26, the nature of the movement of the virtual tool 28 relative to the virtual object 26, and other factors. Another factor may be a construction constraint that aids in the construction of a virtual object 26. In one embodiment, the constraint can be a line, an arbitrary curve, or a surface that constrains the movement of the virtual tool 28.

Ongoing Interaction Between User and System

Finally, after the results have been applied (step 58), the user engages in additional movement of the haptic interface device 10, in which case a new location must be sensed (step 44) and steps 46-58 are repeated. Alternatively, the user changes the nature of the virtual object 26 and/or the interaction mode. The user may also change the shape or characteristics of the virtual tool 28 (not shown in FIG. 3). These changes by the user in turn would affect the calculations, constraints, and results determined by steps 46, 54, 56, and 58.

Virtual Object and Tool Interaction

Haptic Rendering Process

Figure 4:
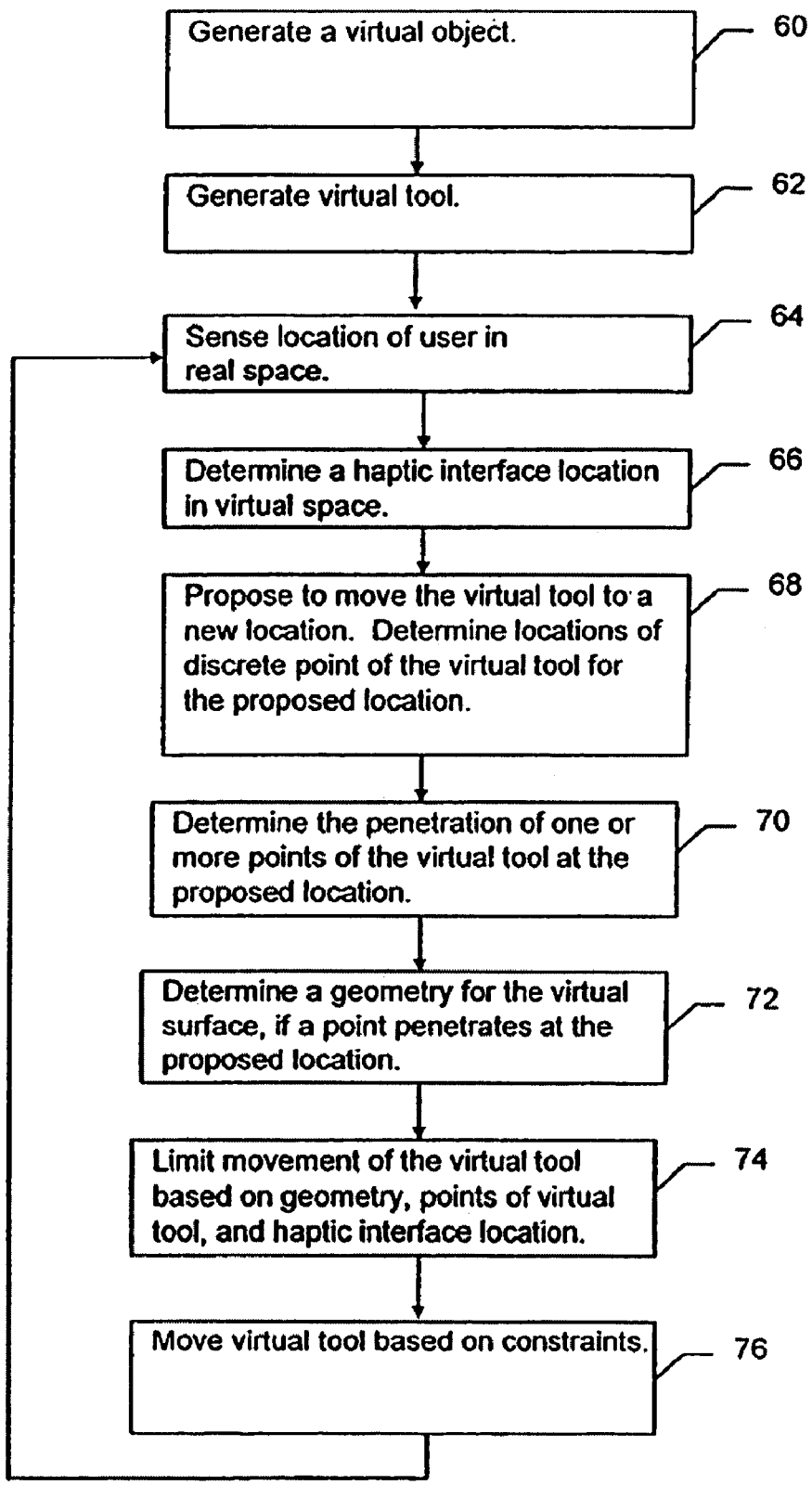
FIG. 4 is a high-level flowchart of the haptic rendering process between a virtual tool and a virtual object for another embodiment of the invention.

FIG. 4 is a flowchart of the haptic rendering process 16 for the interaction between a virtual object 26 and a virtual tool 28 for one embodiment of the invention. In the first steps, the haptic rendering process 16 generates a virtual object 26 (step 60). The haptic rendering process 16 determines or generates a virtual tool 28 represented using a plurality of discrete points for use by the user (step 62). Sensors sense the location of the user in space (step 64) in a manner similar to that described for FIG. 3 above. The haptic rendering process 16 then determines a haptic interface location 98 (see FIG. 5A) for the haptic interface (step 66) in the haptic virtual environment corresponding to the location of the haptic interface device 10, which the user is manipulating in real space. The haptic rendering process 16 determines potential locations for the points of the virtual tool 28 in the haptic virtual environment in comparison to the haptic interface location 98 and the virtual surface of the virtual object 26 (step 68).

The haptic rendering process 16 determines the amount of penetration into the virtual object 26 for all the points of the virtual tool 28 if it were to be moved to the potential location (step 70). The haptic rendering process 16 may determine that there would be no penetration, that only one point of the virtual tool 28 would penetrate the virtual object 26, or that several points of the virtual tool 28 would penetrate the virtual object 26.

If at least one of the points of the virtual tool 28 has penetrated the virtual object 26, then the haptic rendering process 16 determines a geometry for the virtual surface at the area of penetration of the virtual tool 28 (step 72). For example, the haptic rendering process 16 determines if the virtual object 26 has an edge, trough, valley, vertex, or hole in the vicinity of the virtual tool 28, to be discussed in more detail later with respect to FIGS. 7A-7C. This determination is then used in the next step (step 74), which determines limits or constraints for the movement of the virtual tool 28 based on the geometry of the virtual object 26 (as determined in step 72), the locations of the points of the virtual tool 28 that would have penetrated the virtual object 26 (as determined in steps 68 and 70), and the haptic interface location 98 (as determined in step 66). The haptic rendering process 16 then uses the previously determined constraints to constrain or limit the movement of the virtual tool 28 (step 76). For example, if the virtual tool 28 has encountered an edge or trough on the surface of the virtual object 26, then the virtual tool 28 may be constrained to slide along the edge or trough (see FIG. 5E) until the user makes a definitive movement, such as moving away from the virtual object 26. In one embodiment, the movement of the virtual tool 28 is limited without the user feeling any force feedback. In another embodiment, the movement of the tool 28 is limited and the user feels an interactive force feedback corresponding to the limits on movement of the tool 28.

Relationship of Virtual Tool Location to Haptic Interface Location

Figure 5A:
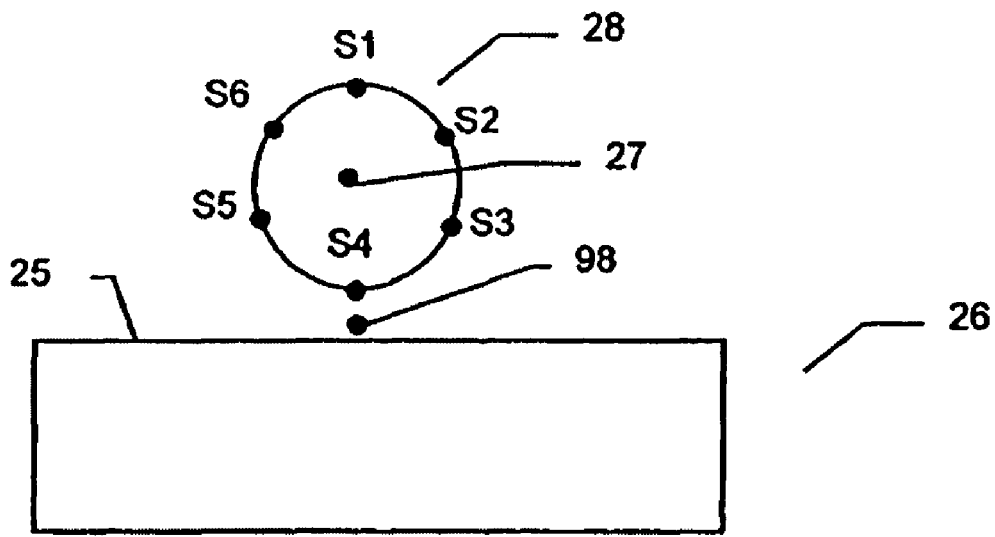
FIG. 5A illustrates a pictorial view of a virtual tool approaching the virtual surface of a virtual object.

FIG. 5A illustrates a virtual tool 28 approaching the virtual surface 25 of a virtual object 26. The surface of the virtual tool 28 is defined by a series of points, S1, S2, S3, S4, S5, S6 in a simplified view of a virtual tool 28 in one embodiment.

Figure 6:
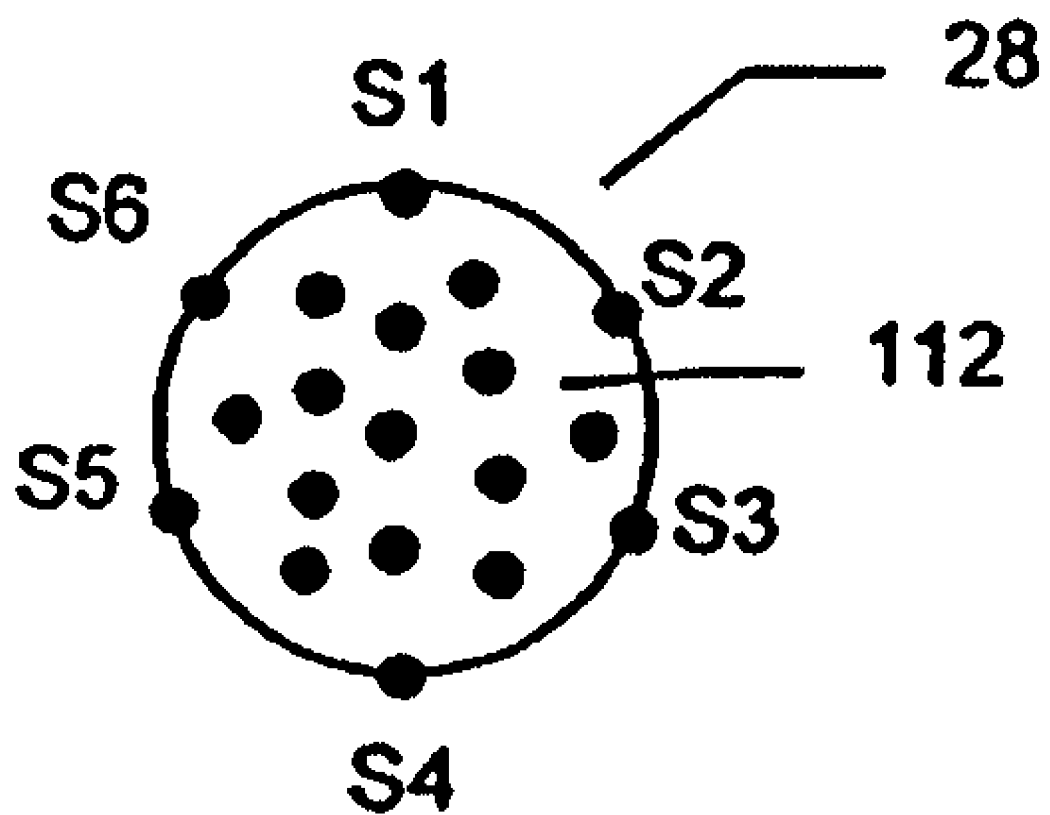
FIG. 6 illustrates a virtual tool with points located throughout the interior of the tool.

In another embodiment of the invention, the points that define the volume of the virtual tool 28 extend throughout the space of the virtual tool 28 (shown as additional interior points 112 within the tool 28 in FIG. 6). In one embodiment, the additional points 112 are spaced evenly throughout the interior 3-D volume of the tool 28. In another embodiment, there is no requirement that the additional points 112 be spaced evenly within the tool 28.

In the example shown in FIG. 5A, the user is moving the haptic interface device 10 so that the virtual tool 28 is moving toward the virtual surface 25 of the virtual object 26. The haptic rendering process 16 attempts to move the origin 27 of the virtual tool 28 to match the haptic interface location 98. In the embodiment shown in FIG. 5A, the location of the virtual tool origin 27 lags behind the haptic interface location 98 as the user moves the virtual tool 28 through the virtual space.

Haptic Rendering and Graphics Rendering

It should be understood that the haptic rendering process 16 is operating at a high rate of speed, such as updating the location of the haptic interface location 98 and virtual tool 28 many times per second, as the user attempts to move the virtual tool 28 through the virtual environment. In one embodiment, the haptic rendering process 16 is updating the locations at about 1000 times per second. In one embodiment, some calculations of the haptic rendering process, such as force reaction calculations, are occurring at about 1000 times per second, while less time critical calculations of the haptic rendering process, such as geometry calculations, are occurring at slower rates, such as 100 times per second. The graphics process 22 updates the image seen by the user on the graphics display 14, but typically at a lower refresh rate than the haptic rendering process 16. In one embodiment, the graphics process 22 updates the graphics display 14 at a rate of about 60 times per second.

Example of Tool Points Penetrating Virtual Object

Figure 5B:
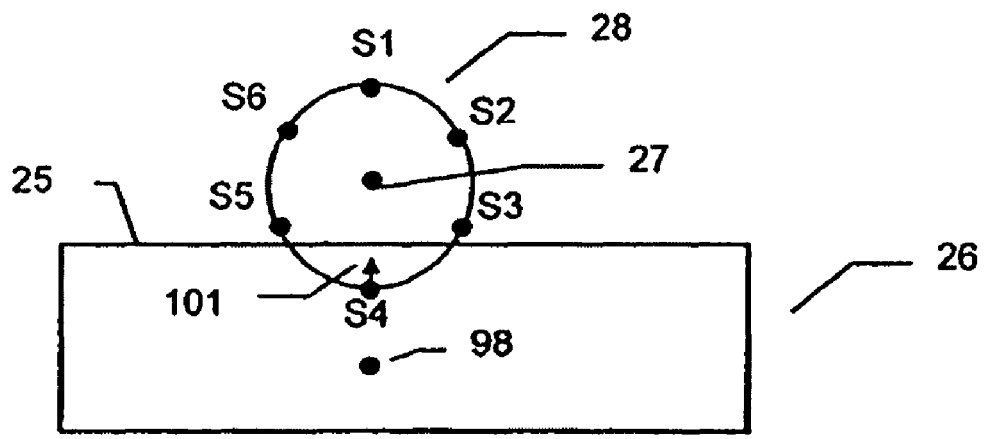
FIG. 5B illustrates a pictorial view of a proposed location for a virtual tool with one point of the virtual tool penetrating the virtual surface of the virtual object, for the embodiment shown in FIG. 5A.

FIG. 5B illustrates one point S4 of a virtual tool 28 encountering the virtual surface 25 of the virtual object 26, for the embodiment shown in FIG. 5A. The haptic rendering process 16 attempts to move the virtual tool origin 27 to match the location of the haptic interface 98, but determines that a point, S4, of the virtual tool 28 would cross the virtual surface 25. The haptic rendering process 16 then determines the approximate minimum distance vector 101 in a direction toward the virtual surface for a point S4. This vector 101, later referred to as the surface direction vector 101, also has the property that it is the approximate normal vector to the virtual surface 25 where it crosses the surface 25. As described in more detail later, the haptic rendering process 16 uses this vector 101 to calculate movement constraints for the virtual tool 28, as the virtual tool origin 27 is progressively moved toward the haptic interface location 98. In general, the haptic rendering process 16 attempts to keep the points of the tool 28 outside of the virtual surface 25 of the virtual object 26; that is, the object 26 is treated as a solid.

Example of More than One Point Encountering the Virtual Object

Figure 5C:
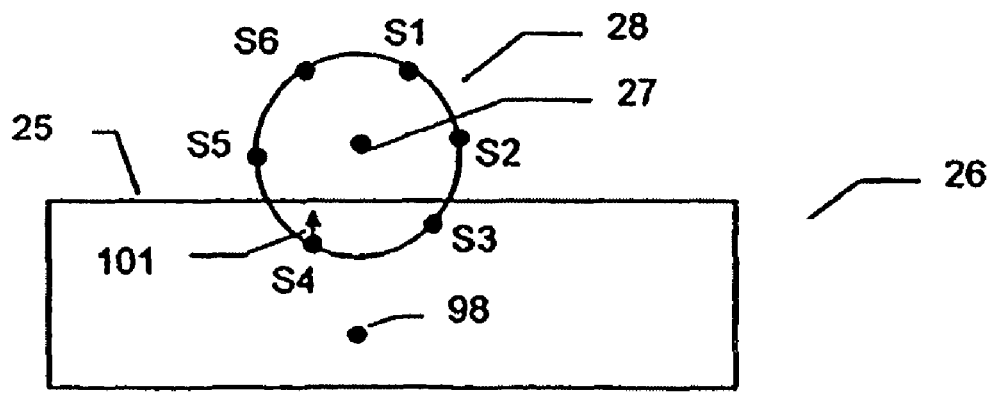
FIG. 5C illustrates a pictorial view of a proposed location for the virtual tool with two points of the virtual tool penetrating the virtual surface of the virtual object, for the embodiment shown in FIG. 5A.

FIG. 5C illustrates two points, S3 and S4, of the virtual tool 28 encountering the virtual surface 25 of a virtual object 26, for the embodiment shown in FIG. 5A. In this case, the virtual tool 28 encounters the virtual surface 25 at a different orientation than the one shown in FIG. 5B. For example, the user has rotated the virtual tool 28 slightly or is moving the virtual tool 28 at a slightly different angle, so that two points, S3 and S4, are encountering the virtual surface 25 rather than the one point, S4, as shown in FIG. 5B. The surface direction vector 101 shown in FIG. 5B is based on point S4. In FIG. 5C, the surface direction vector 101 is based on point S4 as it has penetrated the virtual surface 25 more than point S3. In the embodiment shown, if multiple points penetrate the virtual surface 25, the surface direction vector 101 is calculated for the point of deepest penetration. Other embodiments may use a combination of all points which are penetrating to calculate a resulting minimum surface direction vector 101.

Local Geometry Constrains Motion

Figure 5D:
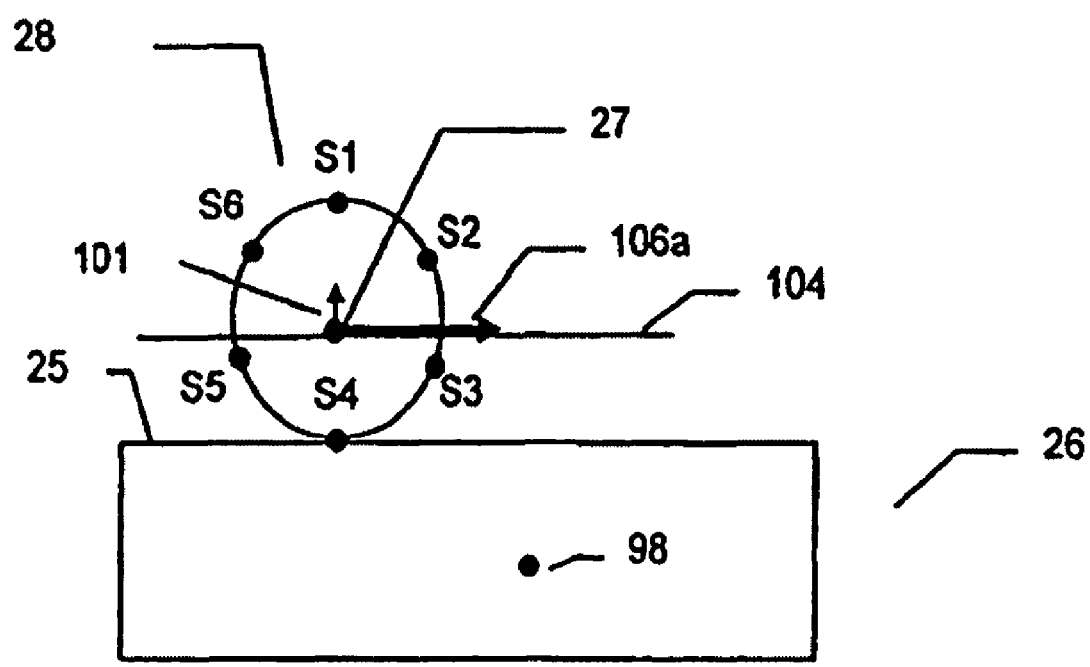
FIG. 5D illustrates a pictorial view of a virtual tool moving along the virtual surface of a virtual object, for the embodiment shown in FIG. 5A.

FIG. 5D illustrates a virtual tool 28 skirting along the virtual surface 25 of a virtual object 26, for the embodiment shown in FIG. 5A. A plane of tangency or constraint plane 104 is formed that is orthogonal to the surface direction vector 101 that was previously calculated. In FIG. 5D, the plane of tangency 104 is shown aligned with the origin 27 of the virtual tool 28. In other embodiments, the plane of tangency 104 may be aligned differently, such as at or near the virtual surface 25 of the virtual object 26, as long as the plane of tangency 104 constrains the movement of the virtual tool 28 substantially parallel to the virtual surface 25. In FIG. 5D, the plane of tangency extends out of the plane of the diagram. The virtual tool 28 is allowed to move along the plane of tangency 104. The movement is shown by the direction of movement or motion vector 106a.

Figure 5E:
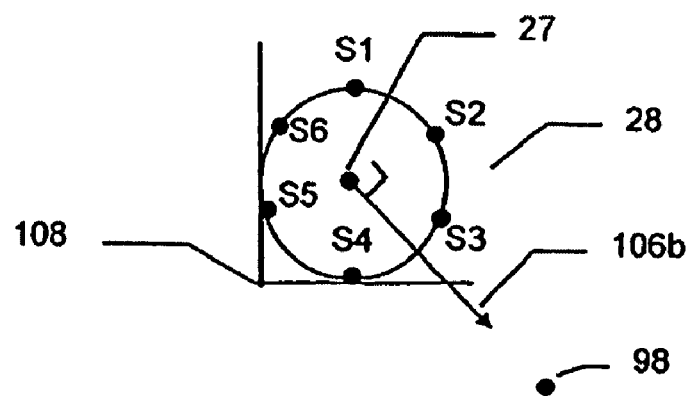
FIG. 5E illustrates a two dimensional pictorial view of a virtual tool moving along a concave edge in the virtual surface of a virtual object for the embodiment shown in FIG. 5A.
Figure 5F:
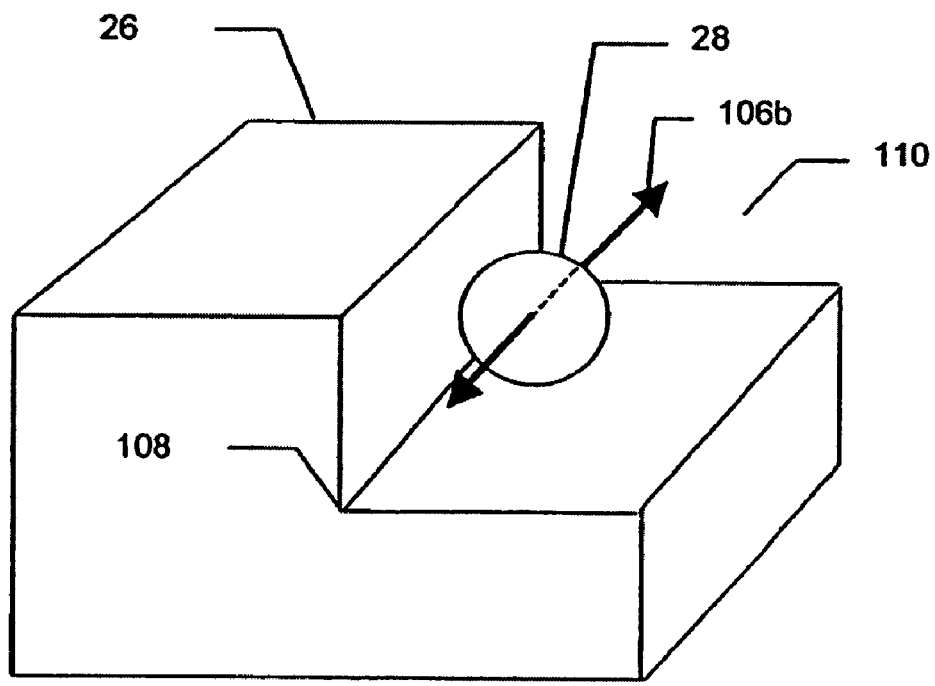
FIG. 5F illustrates a three dimensional pictorial view of a virtual object moving along a concave edge, for the embodiment shown in FIG. 5E.

FIG. 5E provides a two dimensional view of a virtual tool 28 constrained to move along an inside or concave edge 108. FIG. 5F illustrates a 1 three dimensional view of the virtual tool 28 constrained to move along an edge 108 of a trough or valley 110 for the embodiment of the invention shown in FIG. 5E. The virtual tool 28 is constrained to move in the direction of a vector 106b that constrains the tool 28 to move in a direction approximately parallel to the concave edge 108 toward a haptic interface location 98. FIG. 5F provides another pictorial view of a the tool 28 moving along a vector 106b approximately parallel to the concave edge 108 of the virtual object 26.

Modification of the Virtual Object

If the virtual tool 28 is in a removal mode, the modification process 20 may also determine material to be removed from the virtual object 26 in response to the shape of the virtual tool 28. In one embodiment, this removal mode is termed a carving mode. In one embodiment, the user feels a resistive force when attempting to move the virtual tool 28 into the virtual object 26 because forward motion of the virtual tool 28 into the object 26 is not allowed. Forward motion of the tool 28 is only achieved as a result of the modification process 20 changing or deforming the geometry of the virtual object 26 in a manner that simulates carving of the virtual object 26. The haptic rendering process 16 continues to treat the virtual object 26 as a solid object as material is removed or added. For example, the user feels added material as solid, since movement of the virtual tool 28 into the material is not permitted.

Case 1 of Tool in Empty Space

Figure 7A:
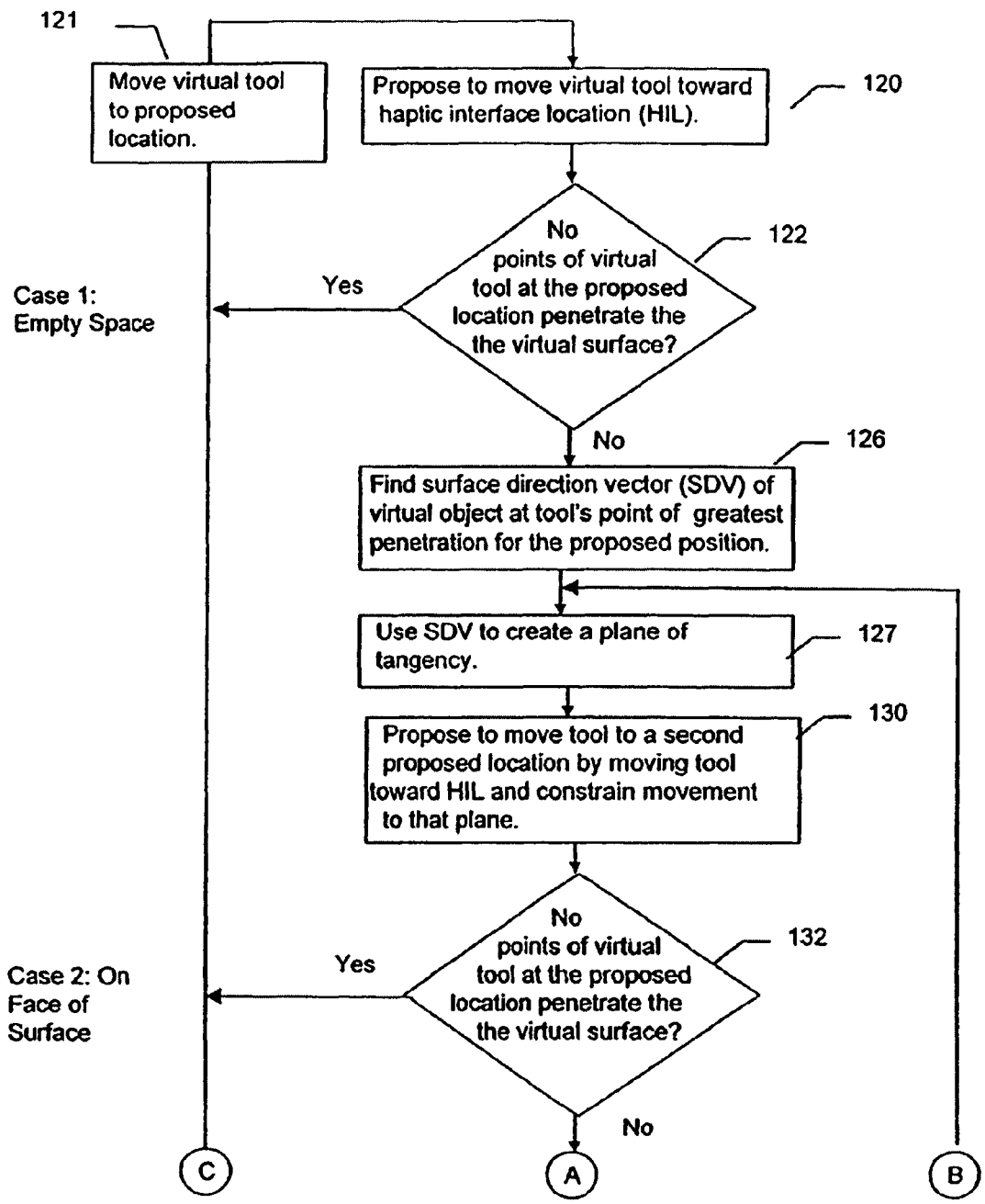
FIGS. 7A-7C depict flowcharts of the haptic rendering process between a virtual object and virtual tool for one embodiment of the invention.
Figure 7B:
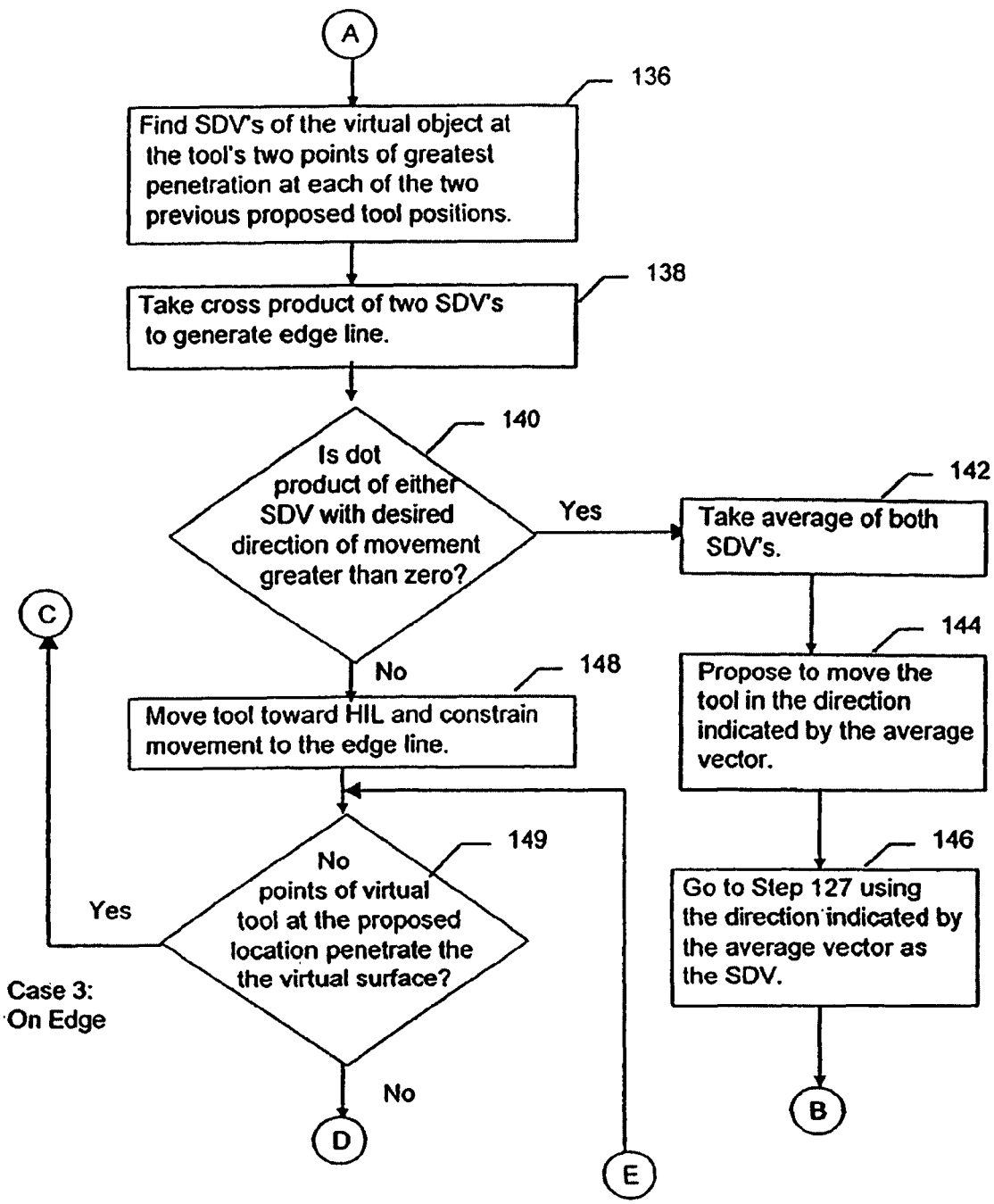
Figure 7C:
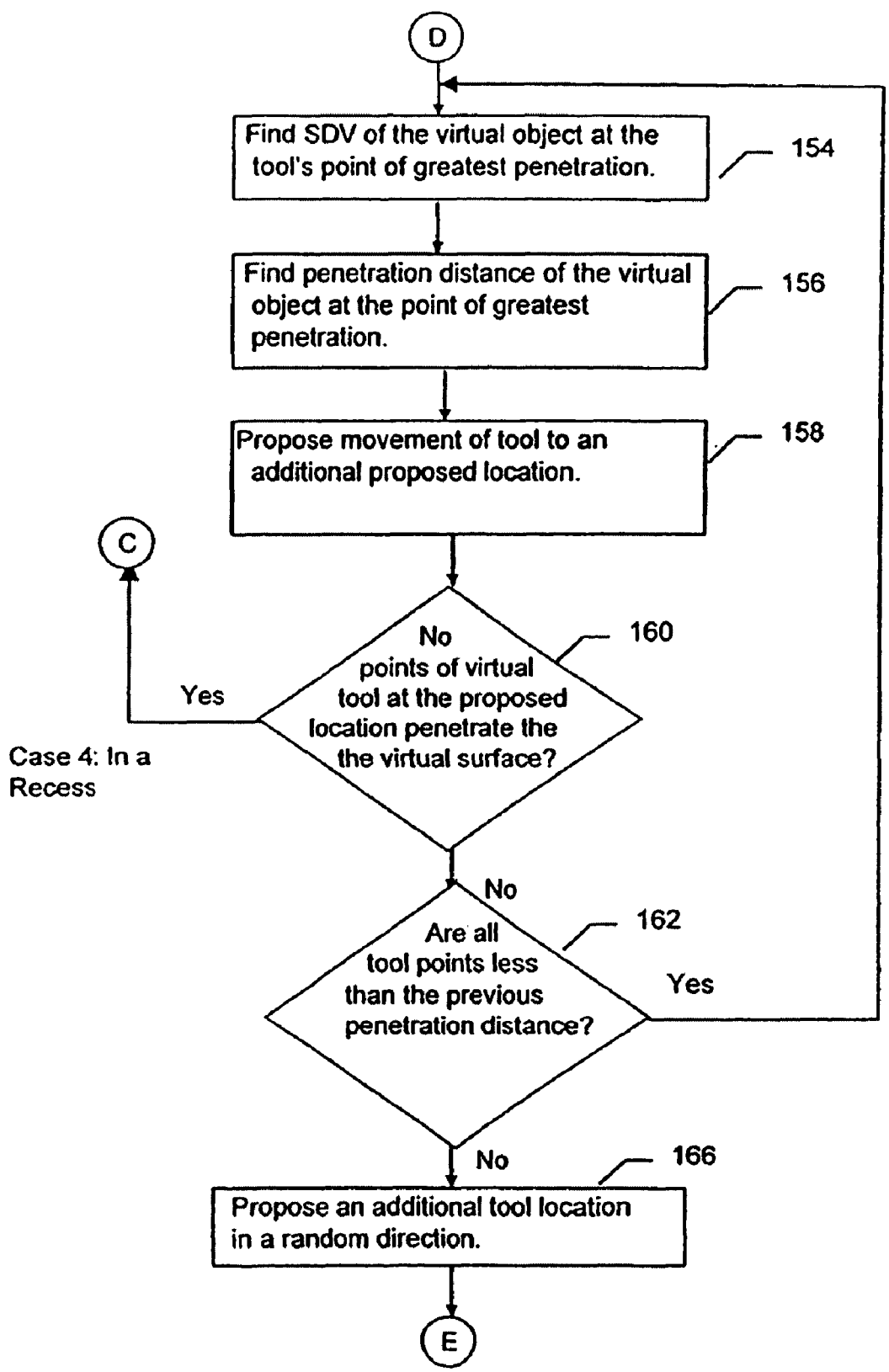

FIGS. 7A-7C depicts flowcharts of the haptic rendering process 16 which calculates interactions between the virtual object 26 and the virtual tool 28 for one embodiment of the invention. These flowcharts represent movement of the virtual tool 28 in steps relative to the virtual surface 25 of a virtual object 26. First, the haptic rendering process 16 proposes to move the virtual tool origin 27 toward the haptic interface location 98 (step 120). Then the haptic rendering process 16 determines if any of the tool 28 points would penetrate the virtual surface 25 (step 122. If none of the tool 28 points would penetrate the virtual surface 25, this represents "Case 1." The virtual tool 28 would encounter only empty space by moving to the proposed new location, so the incremental movement of the virtual tool origin 27 is allowed (step 121) and the haptic rendering process 16 returns to step 120.

Case 2 of Tool Penetrating the Virtual Surface

If at the proposed tool position, some points of the virtual tool 28 would penetrate the virtual surface 25 (step 122), then the haptic rendering process 16 finds the direction of shortest distance to the virtual surface as indicated by surface direction vector 101 for the point of the greatest potential penetration into the virtual object 26 by the virtual tool 28 (step 126, see also FIGS. 5B and 5C). The haptic rendering process 16 then calculates a constraint plane or plane of tangency 104 (see FIG. 5D) based on the surface direction vector 101 (step 127 of FIG. 7A). The plane of tangency 104 is a plane orthogonal to the surface direction vector 101. The haptic rendering process 16 then attempts to move the virtual tool origin 27 toward the haptic interface location 98 but constrains the movement to the plane of tangency 104 (step 130) to arrive at a second proposed virtual tool 28 location.

If none of the tool 28 points would penetrate the virtual surface 25 at this second proposed virtual tool position (step 132), then the haptic rendering process 16 moves the virtual tool origin 27 to the second proposed location (step 121) and returns to step 120. This situation represents "Case 2" and the haptic rendering process 16 has assumed that the virtual tool 28 is intended to be touching the surface 25 of the virtual object 26.

Case 3 of Tool Encountering Edge Condition

Figure 8A:
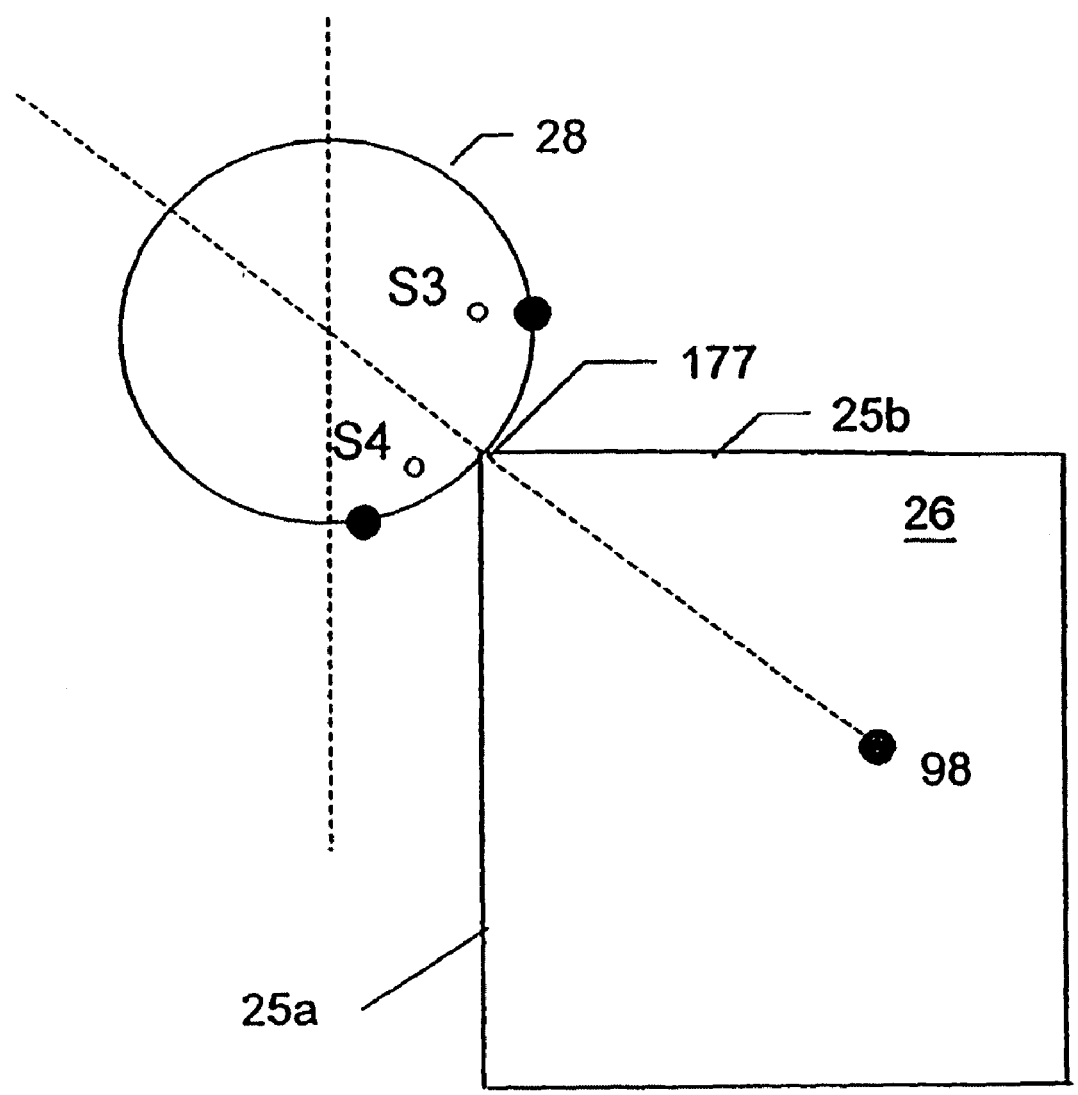
FIG. 8A illustrates a pictorial view of a virtual tool encountering the convex edge of a virtual object for one embodiment of the invention.
Figure 8B:
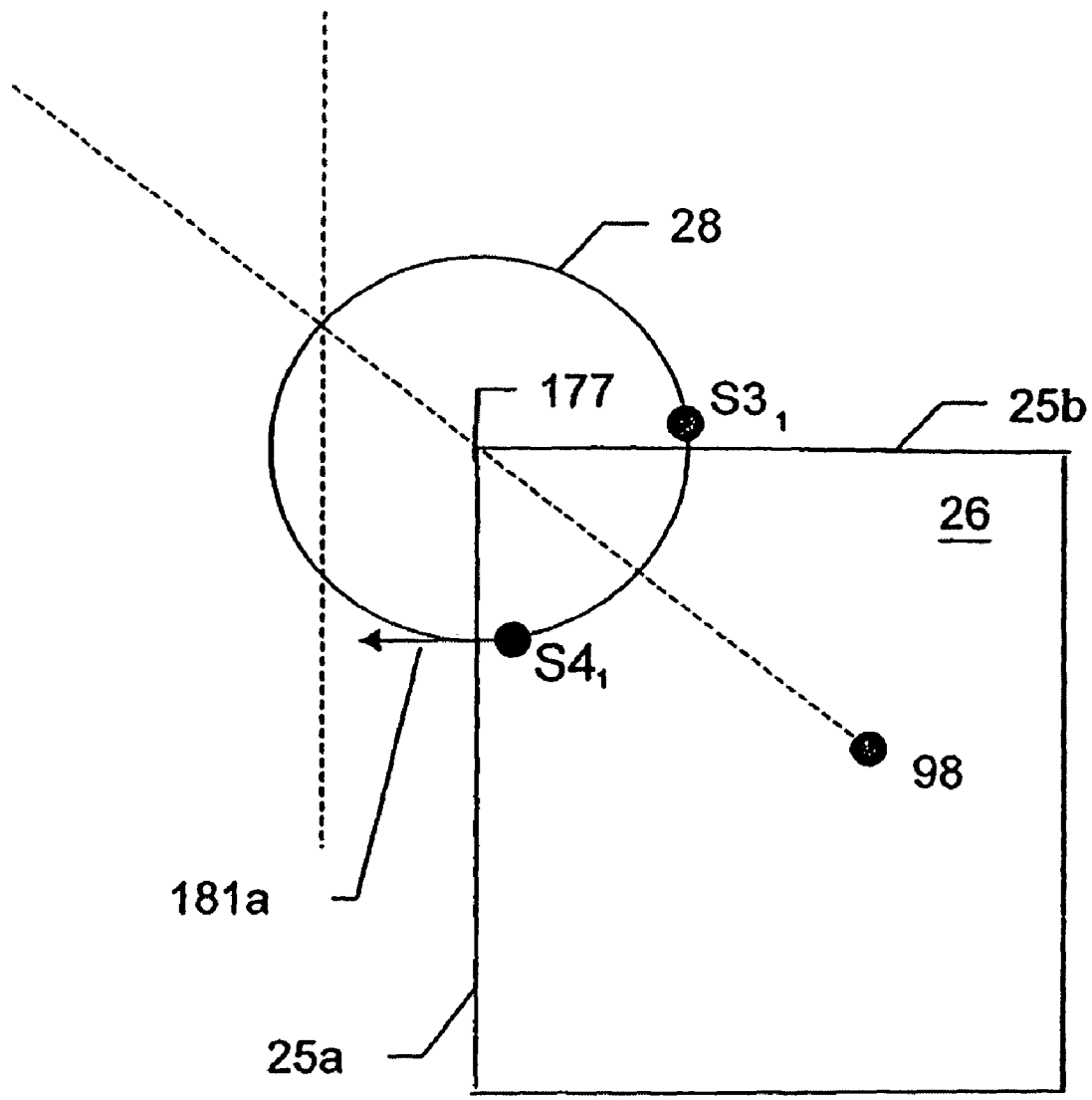
FIG. 8B illustrates a pictorial view of a surface direction vector calculated for one proposed tool position for the embodiment of the invention shown in FIG. 8A.
Figure 8C:
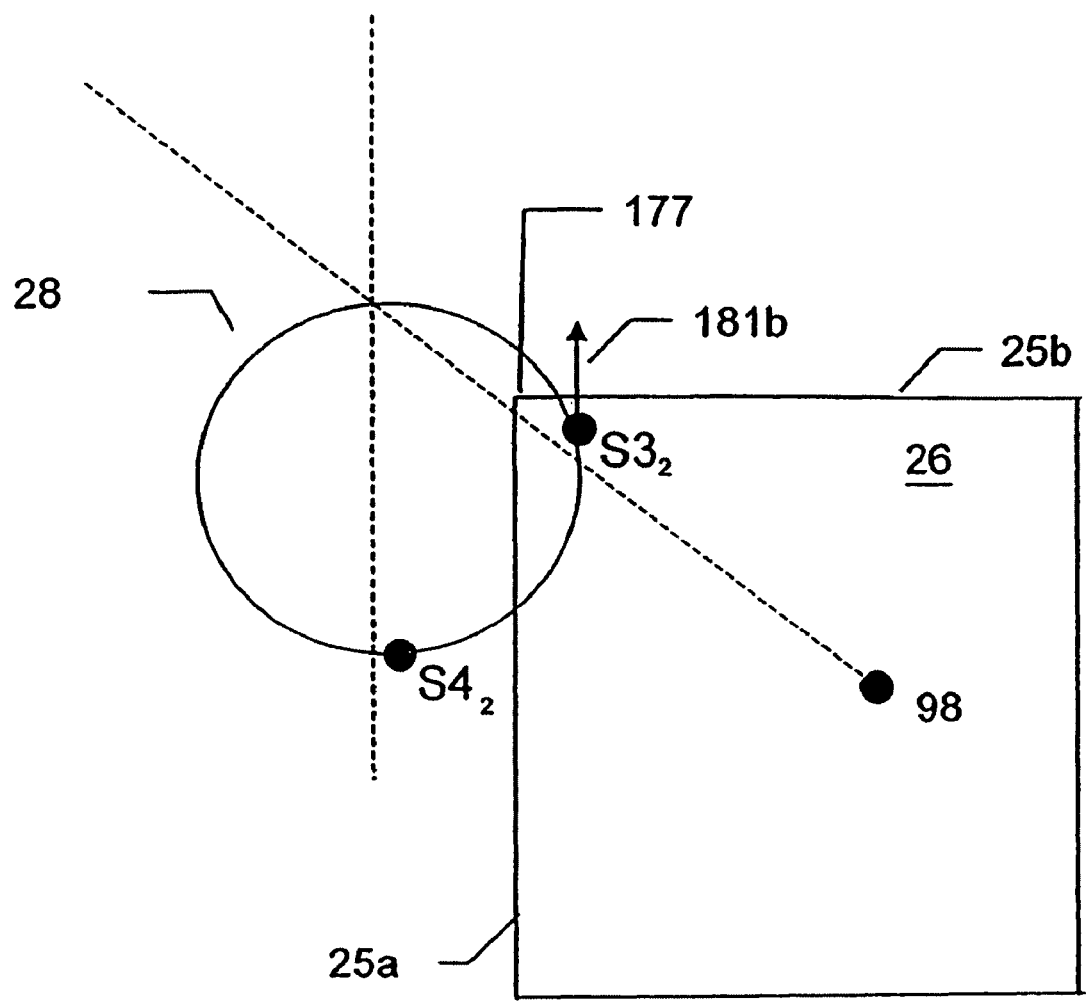
FIG. 8C illustrates a pictorial view of a surface direction vector calculated for a second proposed tool position for the embodiment shown in FIG. 8A.

If at the second proposed tool position, some points of the virtual tool 28 would penetrate the virtual surface 25 (step 132), then the haptic rendering process 16 finds the two surface direction vectors 181$a$ and 181$b$ of the virtual object 26 at the tool's 28 two points of greatest penetration at each of the previous two proposed tool positions (step 136). FIG. 8A illustrates a virtual tool 28 encountering the outside or convex edge 177 of a virtual object 26 in one embodiment of the invention. The virtual object 26 extends out of the plane of the diagram, and has an edge 177 that likewise extends out of the plane of the diagram. In FIG. 8B the proposed tool position penetrates the virtual object 26 at point S4, and the haptic rendering process 16 calculates a surface direction vector 181$a$ relative to virtual surface 25$a$. In FIG. 8C, the haptic rendering process 16 proposes a second proposed tool location based on the surface direction vector 181$a$ relative to virtual surface 25$a$, as shown in FIG. 8C. In this proposed tool location, point $S3_2$ has penetrated the virtual object 26, and the haptic rendering process 16 calculates the surface direction vector 181$b$ relative to virtual surface 25$b$.

Figure 8D:
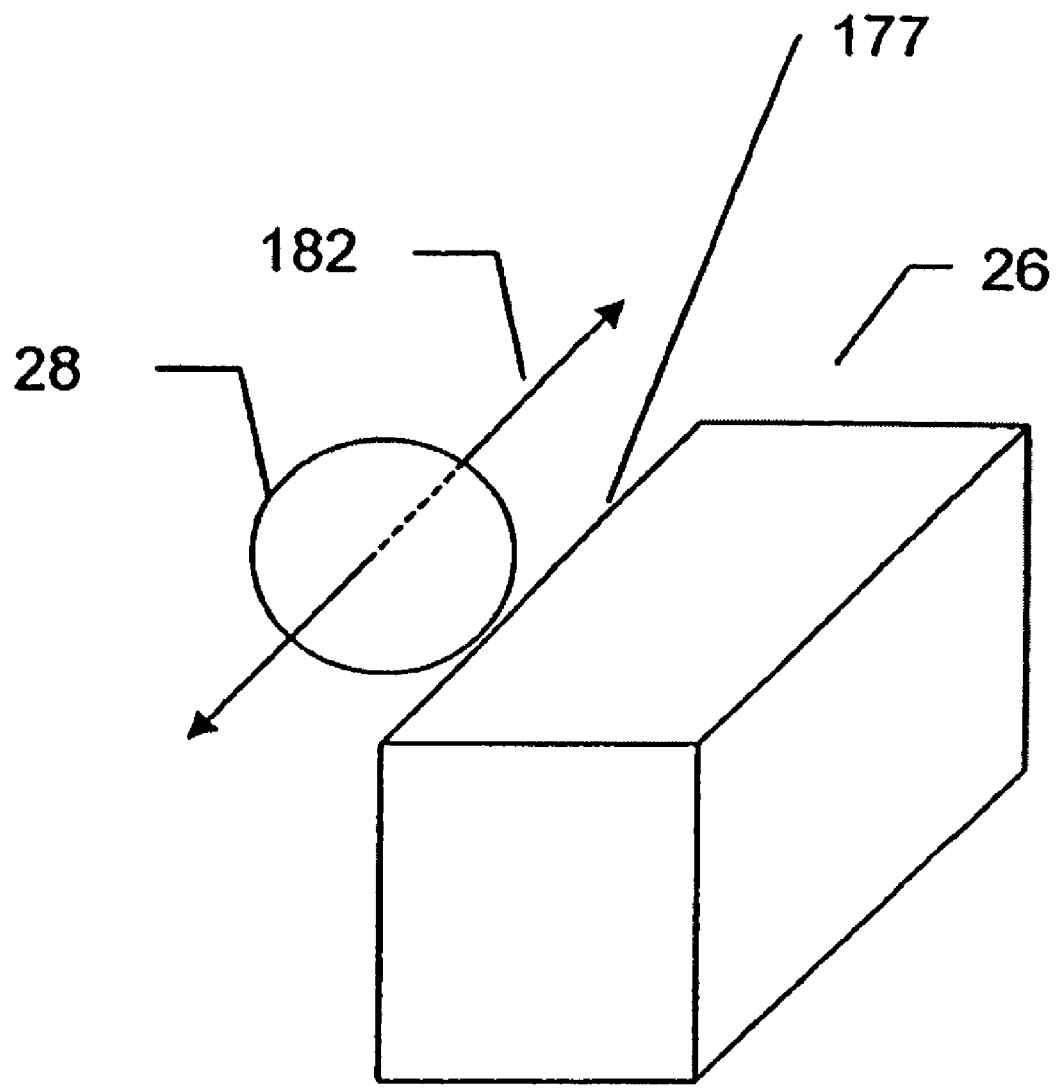
FIG. 8D illustrates a pictorial view of virtual tool constrained to the edge of a virtual object for the embodiment of the invention shown in FIG. 5A.

The haptic rendering process 16 uses the vectors 181$a$ and 181$b$ and the desired direction of movement to determine constraints to the tool motion, as follows. The haptic rendering process 16 calculates the cross product of the vectors 181$a$, 181$b$ found in step 136 to generate an edge line and a direction of movement 182 (step 138 in FIG. 7B), as shown in FIG. 8D. The haptic rendering process 16 then determines the dot product of each minimum distance vector 181$a$, 181$b$ with the direction of movement 182, as indicated by the user (step 140). The haptic rendering process 16 then determines if either dot product is greater than zero (step 140). If one of the dot products is greater than zero, then the haptic rendering process 16 takes the average of both surface direction vectors 181$a$, 181$b$ (step 142). The haptic rendering process 16 then proposes to move the tool 28 in the direction indicated by the average vector (step 144) and then proceeds to Case 2 (step 146). The haptic rendering process 16 then proceeds to step 127 in FIG. 7A to determine a plane of tangency 104 using the average normal.

If neither dot product is greater than zero (step 140), then the haptic rendering process 16 constrains movement to the previously determined edge line (step 148). See FIG. 8D, which shows the virtual tool 28 at the edge 177 of the virtual object 26. In one embodiment, the virtual tool 28 is constrained based on one point of the tool 28, such as the origin 27 of the tool 28. The haptic rendering process 16 then attempts to move the virtual tool origin 27 toward the haptic interface location 98 but constrains the movement to the direction of the edge 108 or 177 (step 148). If none of the tool points would penetrate the virtual surface 25 at this third proposed virtual tool position (checked in step 149), then the haptic rendering process 16 moves the virtual tool origin 27 to this proposed location (step 121) and returns to step 120.

This situation represents "Case 3," and the haptic rendering process 16 assumes that the virtual tool 28 is on an edge 108 or 177 of the virtual object 26. Generally, in Case 3, the haptic rendering process 16 attempts to properly identify an edge 108 or 177 of the virtual object 26 and allow movement of the virtual tool 28 along the edge 108 or 177.

In one embodiment the haptic rendering process 16 identifies an edge 108 or boundary between two portions of the virtual surface 25 of a virtual object 26. The two portions are not required to be planar. For example, the two portions may have curved surfaces. The two portions are not required to be in contact but may represent portions of virtual surfaces 25 of two separate virtual objects 26 located in contact with or near each other.

Case 4 of Tool Encountering a Hole

If one or more points of the virtual tool penetrate the virtual surface 25 (step 149), the haptic rendering process 16 finds the surface direction vector 101 at the point of greatest potential penetration of the virtual object 26 by the virtual tool 28 (step 154): The haptic rendering process 16 then determines the penetration value at the point of greatest potential penetration and saves this value for subsequent use (step 156). The haptic rendering process 16 then attempts to move the virtual tool 28 in the direction of the surface direction vector 101 just determined (step 158). The haptic rendering process 16 then checks to see if no points of the virtual tool 28 at the proposed location penetrate the virtual surface 25 (step 160). If no points penetrate the virtual surface 25 86, then the haptic rendering process 16 moves the tool 28 to the proposed location (step 121) and proceeds to step 120. This situation represents "Case 4," which occurs if the virtual tool 28 is in a corner, recess, or "hole" in the virtual object 26.

If one or more points of the virtual tool 28 penetrate the virtual surface 25, then the haptic rendering process 16 proceeds to step 162 and determines if the penetration values at all the tool points would be less than the previously determined penetration value at the deepest potential penetration, as calculated in step 156. If all the tool points would be less than the previously determined penetration value, then the haptic rendering process 16 returns to step 154.

If all the tool points would not be less than the previously determined penetration value, then the haptic rendering process 16 proposes moving the virtual tool 28 in a random direction (step 166) from its previous potential position and goes to step 149.

Description of a Voxel-Based Approach

Figure 9:
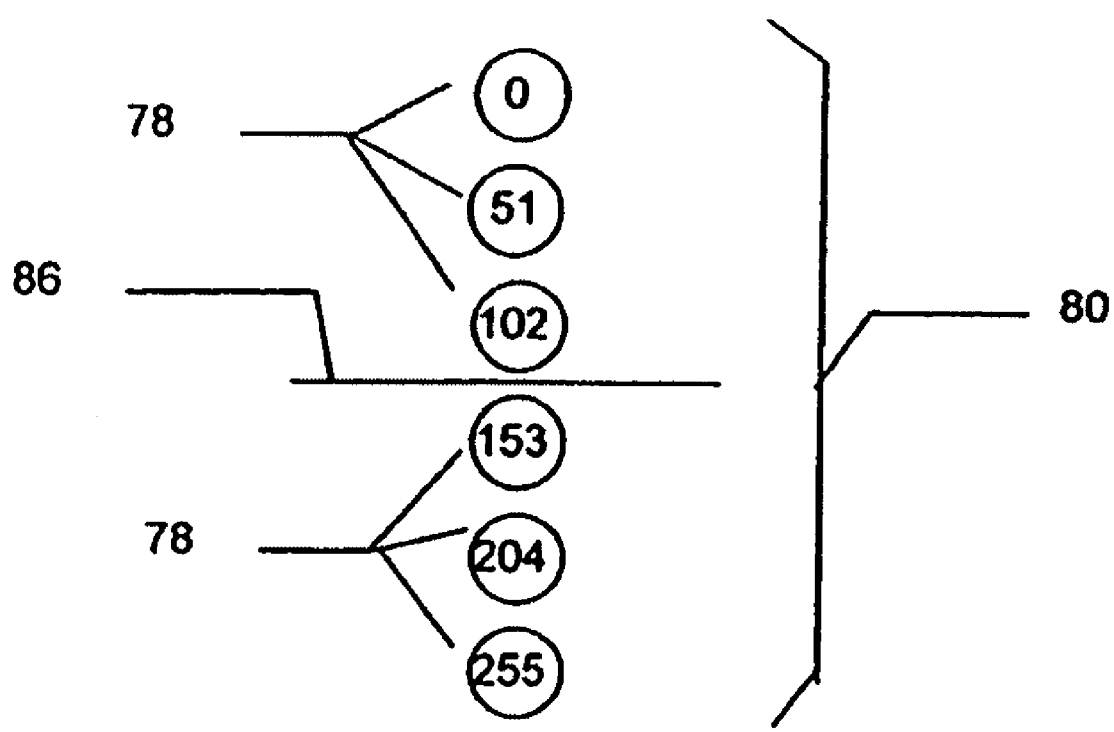
FIG. 9 depicts a set of voxels with different density values and an isosurface.
Figure 10:
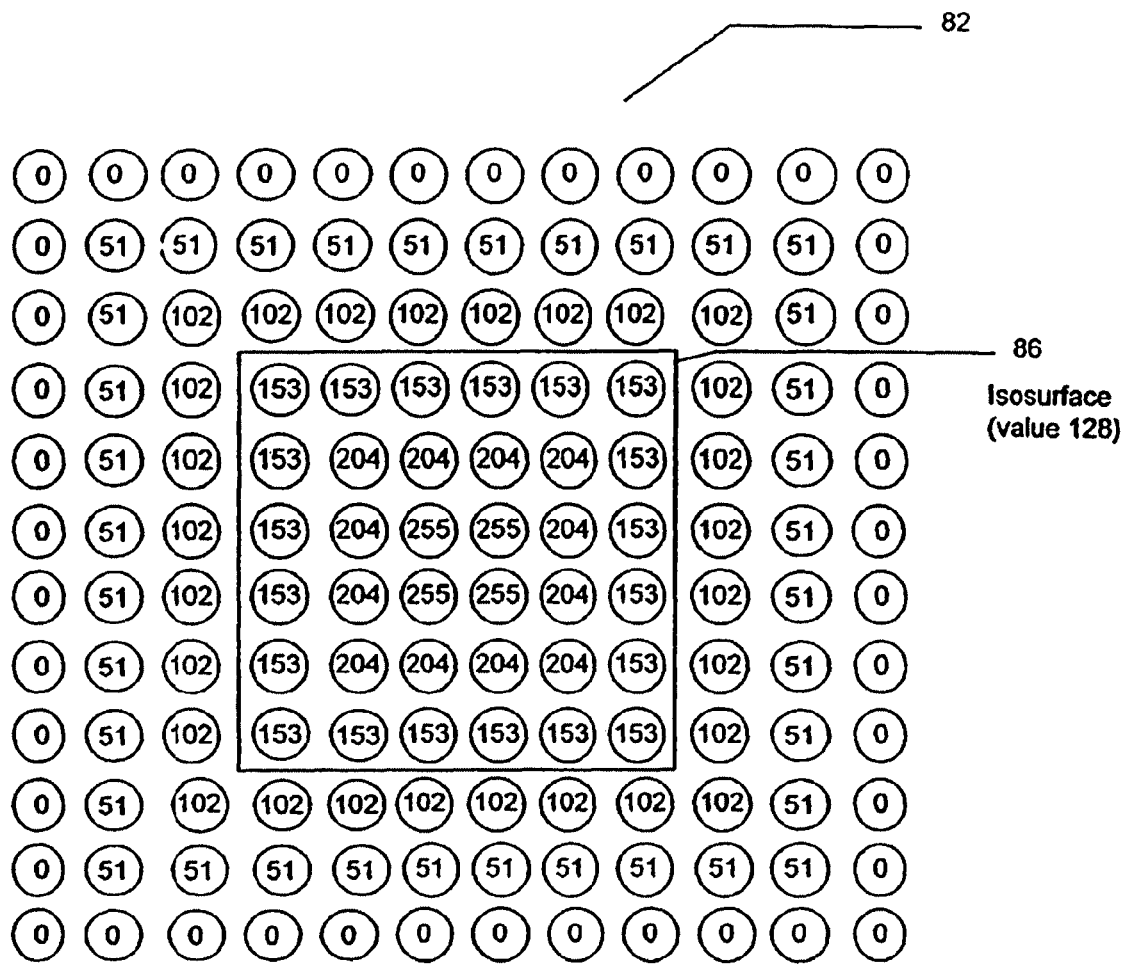
FIG. 10 illustrates a two dimensional representation of a rectangular solid with voxels and an isosurface, for the embodiment shown in FIG. 9.

In one embodiment of the invention, the virtual object 26 is implemented as a volume using concepts of voxels 78, density, and an isosurface 86. FIG. 9 shows several voxels 78 having different density values 0, 51, 102, 153, 204, and 255, a gradient 80 established by these voxel values, and an isosurface 86. As used herein, density is not a physical property of the virtual object 26, but rather an abstract construct used for determining the shape of the virtual object 26. FIG. 10 illustrates a pictorial view in two dimensions of the voxels 78 of a three dimensional rectangular solid 82 with an isosurface 86 at value 128 indicating the solid surface of the rectangular solid 82. As shown in FIG. 10, the volume of the virtual object 26 is modeled using a 3-D array of evenly spaced elements or voxels 78 located at discrete points in the virtual environment 26. In another embodiment, the elements are not required to be arranged with regular spacing. Each voxel 78 stores a density value. Density values for points that lie between the discrete voxel points can also be evaluated using interpolation. The volume also stores a density threshold value. Points having a density value greater than the density threshold are considered to be inside the object. Points having a density value less than the density threshold are considered to be outside the object. As used herein, an "isosurface" 86 refers to a locus of points all having an identical density value. In one embodiment, the isosurface 86 whose density value equals the density threshold represents the virtual surface 25 of the virtual object 26. In one embodiment, as shown in FIG. 10 this density threshold is 128 and the voxel density values can range from 0 to 255. Thus a voxel representation facilitates an easy method for determining whether points on a virtual tool 28 lie inside or outside of a virtual surface 25 of a virtual object 26. All of the voxels 78 shown in FIG. 10 are associated with the rectangular solid 82, but a user moving a virtual tool 28 toward the rectangular solid 82 would not encounter a solid feeling surface until the virtual tool 28 contacts the isosurface 86. The user would not feel any resistance to moving the tool 28 when moving through the voxels 78 with density values, such 0, 51, and 102, which are less than 128.

Implementation of the Haptic Rendering Process

The haptic rendering process 16 between a virtual object 26 and virtual tool 28 is described in more detail below for one embodiment of the invention as implemented by the assignee, SensAble Technologies, Inc. of Cambridge, Mass.

The chosen volumetric representation is integrated with the GHOSSDK (Software Developer's Kit) haptic interaction software developed by SensAble Technologies, which provides much of the necessary haptics functionality and reduces haptic virtual objects into a set of basic methods that are then handled correctly by GHOSIIR SDK. The GHOST SDK uses the cow programming language. The developer can create a high-level object which needs only to handle basic interactions such as determining vectors, without being required to address low-level processes such as generating forces on the haptics device, resolving multiple collisions, and other more complex issues addressed by the GHOST software.

Volume Implementation Using Voiles

Haptic virtual objects are handled by a volume class. One embodiment of the invention is the gs/Volume class. The gstVolume class follows the specifications of the generally provided gstShape GHOST class and follows the behavior of general geometric classes.

As described previously, the volume is represented using a voxel grid, the density values of which define an implicit virtual surface or isosurface 86 for the virtual object 26 as described for FIGS. 9 and 10. A valid volume for this representation is created containing an established gradient 80.

The specific voxel values defining the gradient 80 depend on the shape of virtual object 26 being presented. In one embodiment, the voxel values may vary between 0 and 255, with the value 128 representing the virtual surface. Any modifications to the volume must also preserve the gradient 80 to avoid incorrect calculation of surface direction vectors 101 or penetration distances.

The voxel value at any point gives an indication of the penetration depth and the shortest distance between that voxel 78 and the surface 86 of the volume. The ramp length is the number of voxels 78 over which density values go from their minimum (0) to their maximum (255). Voxel values increase with the penetration depth until the values reach a maximum. All voxels 78 beyond that penetration depth are also set to that maximum value. Likewise, when moving farther from the virtual surface in a direction away from the volume, voxel values decrease until they reach the minimum value. All values in that direction beyond that distance are set to the minimum value.

Figure 11:
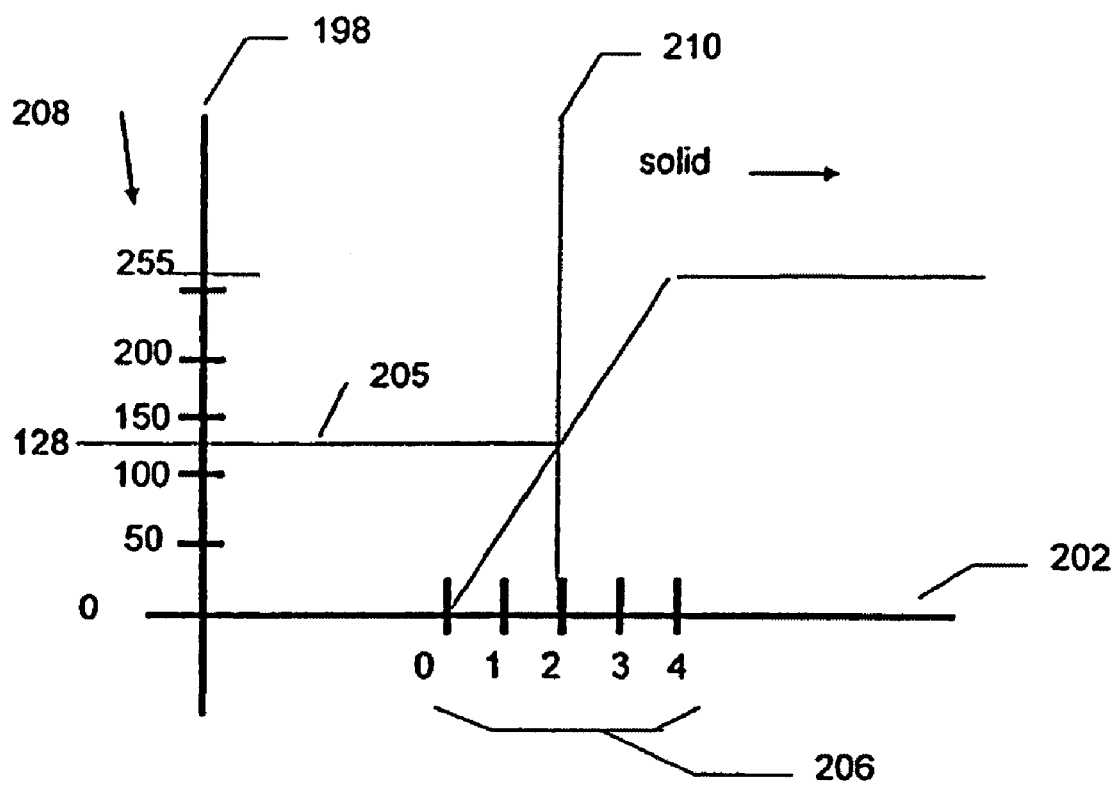
FIG. 11 illustrates a ramp length diagram comparing voxel values to penetration distances for one embodiment of the invention.

The volume class is used to determine approximate surface direction vectors 101 to the surface 86 from any internal point or point along the surface 86 of the volume using the density gradient 80 as explained below. FIG. 11 illustrates a ramp length diagram comparing voxel values to penetration distances for one embodiment of the invention. FIG. 11 depicts a vertical axis 198 for voxel values, a horizontal axis 202 for the penetration distance, an isosurface line 205 representing a density threshold value of 128, a ramp length 206, a maximum voxel value 208 with a value of 255, and a penetration line 210 at the isosurface 86 corresponding to the density threshold value 128. The penetration line 210 indicates that any penetration to the right of the line is into the solid body of the virtual object 26.

Ramp Length

The maximum penetration depth where a gradient 80 exists is defined by the ramp length 206, the density range, and the density threshold value. For example, for a ramp length 206 with a value of 4, a density range of 0 to 255 and a density threshold of 128, any penetration beyond 1.99 voxels [4/255* (255−128)] from the isosurface 86 will not lie within the portion of the volume where the voxel values exhibit a gradient. As such, the amount of penetration beyond this distance cannot be reliably calculated. Beyond that, the voxel values will all be at the maximum value. In one embodiment, the maximum value is 255.

In one embodiment, the direction of the surface direction vector 101 is calculated to be the direction of largest voxel density value gradient at that point For any point that lies within the portion of the volume which exhibits a density gradient 80 a surface direction vector 101 can be calculated which points to the virtual surface and whose magnitude is the distance to the surface 86. In other words, in this region of space, the volume class can return a surface direction vector 101 which, when added to the current location, returns a location that is near the surface 86 of the volume. The vector calculations contain the same limitations as the penetration distance calculations; that is, the surface direction vector 101 can only be calculated reliably within the portion of the volume which exhibits a density gradient 80.

Interpolating Values for Intermediate Points

Although the volume is characterized by a discrete array of voxels 78, it must be able to return a valid value at any point along the continuous range of its space, since the object it represents is continuous. For example, a line is characterized by two discrete points, but itself is continuous and can be evaluated at any point. If a value is requested at a point where a voxel 78 is present, then that particular voxel density value is returned. For spaces between voxels 78, the value may be resolved through tri-linear interpolation, a method of converting a discrete set of points into a continuous field. In another embodiment, the interpolation can be based on other methods, such as a quadric interpolation.

In one embodiment, the evaluation is accomplished in a single step via a mathematical formula that weights the contribution of each voxel 78 by its distance to the point being evaluated.

In one embodiment, voxels 78 are spaced one millimeter (that is, one world coordinate in a coordinate system based on millimeter spacing) apart. In other embodiments, the voxels 78 are spaced other distances apart. In general, there is constant spacing between each of the voxels 78, but there need not be for some embodiments. In further embodiments, memory management techniques may be utilized. A larger number of voxels 78 can be represented, and thus either the resolution or size of the object 26 can be increased.

Calculating Vectors

As stated previously, the required surface direction vector 101 at any point is determined using the direction of maximum density gradient at that point. This maximum density gradient is determined using central differences: the density value at a set distance from the point in the direction of each Cartesian coordinate in turn is determined, and the differences between those values determines the vector direction.

Figure 12:
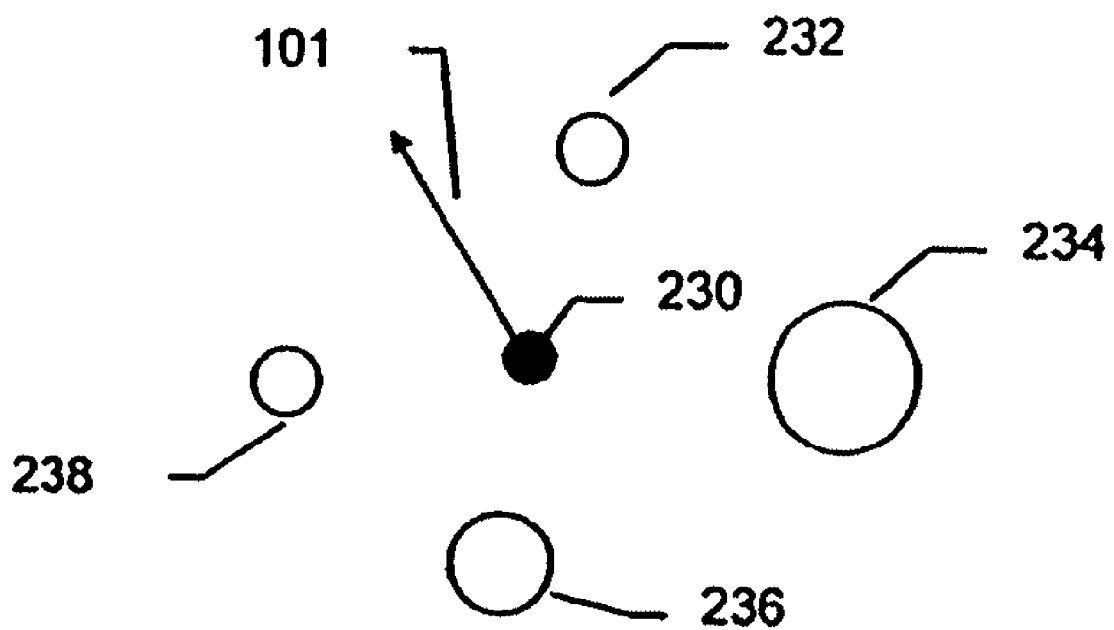
FIG. 12 illustrates a pictorial view of the surface direction vector of a point and surrounding density evaluation points for one embodiment.

FIG. 12 illustrates a method of calculating the surface direction vector 101 of a point based on the density values of surrounding evaluation points. FIG. 12 shows a point 230 for which a direction vector 101 is being calculated. The surrounding evaluation points include a first evaluation point 232 with a value of 40, a second evaluation point 234 with a value of 100, a third evaluation point 236 with a value of 80, and a fourth evaluation point 238 with a value of 40. In one embodiment, each evaluation point is a voxel 78 and the values represent density values.

The vector and density computations are used to project any point within the virtual object 26 to the virtual surface 25 of the virtual object 26. Typically, this projection is used for the purposes of calculating the potential tool surface contact point 226. If a tool point 230 is penetrating deeper than the region in which a gradient exists 206, then no projection can be made directly from that point 230. Instead, the point must be first brought closer to the surface 25 (that is, to a region where a gradient 80 exists).

Figure 13:
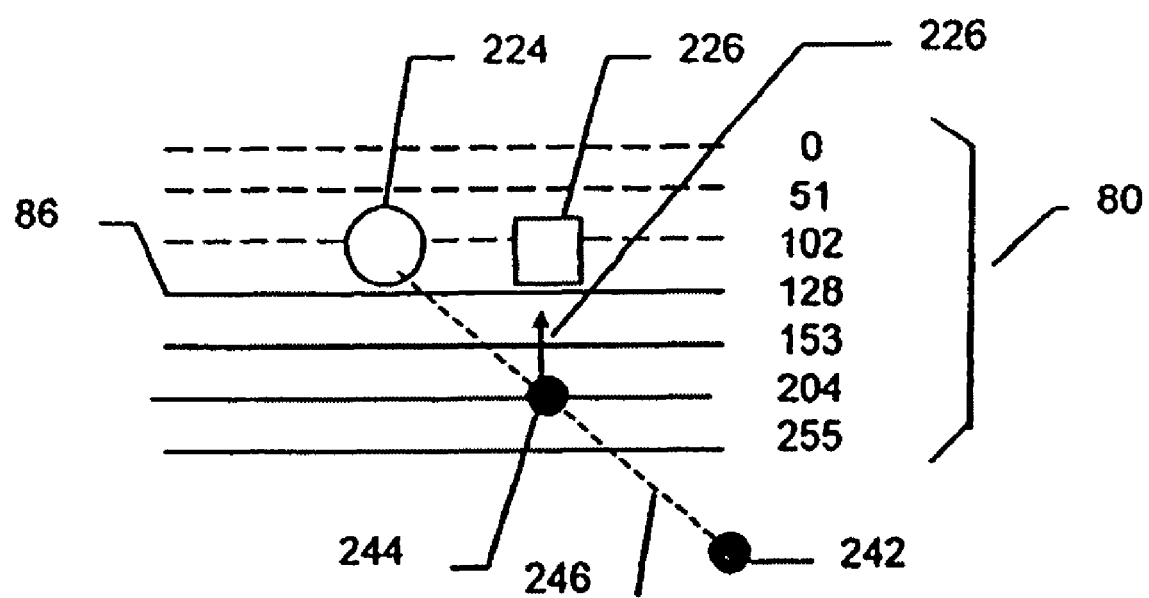
FIG. 13 illustrates a schematic view of a gradient for a virtual object, including a last SCP, a current SCP, an initial point, and a midpoint for one embodiment.

FIG. 13 illustrates a region of a volume where a gradient 80 for a virtual object 26 exists, including a last tool point 224, a final tool surface contact point 226, an initial proposed point 242, and a second proposed point 244 for one embodiment of the invention. In FIG. 13, the haptic rendering process 16 proposes to move the tool location such that a point 224 on the tool 28 would move to the point represented by 242. However, point 242 is not located within the region where a valid gradient can be computed. Because the maximum surface direction vector 101 cannot be calculated for this point, the haptic rendering process 16 calculates a second proposed tool position that would result in the tool point 242 moving to the second proposed point 244. Point 244 is the approximate midpoint of a line 246 between point 242 and the last tool point 224. If the voxel density value at that point 244 is still the maximum value (255 in one embodiment), the haptic rendering process 16 can continue to average the point 244 with the last tool point 224, by using a binary algorithm to bring it progressively closer to the last tool point 224, until the midpoint 244 lies within the gradient 80. Once within the region where a gradient exists, the surface direction vector 101 to the virtual surface from the latest midpoint 244 can be computed for the purposes previously described.

In one embodiment, a binary search method is used to determine the intersection point between the endpoints of the segment. The process is repeated until either the points are within a tolerable error of the desired value, or a maximum number of iterations has been reached.

FIGS. 14A, 14B, and 14C illustrate an example of a binary search for locating the virtual surface 25 for a segment 249 that intersects the virtual surface 25 for one embodiment of the invention. In FIG. 14A, the haptic rendering process determines a midpoint 254 by averaging the locations of the endpoints 248 and 252. In FIG. 14B the haptic rendering process 16 treats the point 254 as an endpoint of a modified segment 253 extending from point 254 to endpoint 248. The haptic rendering process 16 determines a midpoint 256 between points 248 and 254 and how far points 248 and 254 are from the virtual surface 25. The haptic rendering process 16 determines that point 248 is farther from the virtual surface 25 than point 254, and thus sets the upper endpoint 248 to be at a new point 256. The endpoints of the additionally modified segment 257 are thus points 256 and 254. This process is repeated until a point is found that is regarded as the intersection point 258 (within a predetermined distance from the virtual surface 25) of the original segment 249 and the virtual surface 25, as shown in FIG. 14C.

Other Interaction Techniques

The following sections describe in more detail an implementation of virtual object 26 and virtual tool 28 interaction according to an embodiment of the invention implemented by the assignee, SensAble Technologies, Inc. of Cambridge, Mass.

Single Point Methods

In some contexts a single point virtual tool 28 may interact with, the virtual object 26. This may be bandied as the simplest case of multipoint interaction using the methods previously described and described in more detail later. In another embodiment, specialized methods may be used for single point interaction, as described herein.

Collision Detection for Single Point Interaction

The haptic rendering algorithm determines when a collision between a virtual tool 28 and a virtual object 26 has occurred. A collision is detected when the haptic rendering process 16 attempts to move a tool 28 to penetrate a surface. In one embodiment, a collision occurs whenever the haptic interface location crosses through the virtual surface 25. In one embodiment, the virtual surface 25 may be a NURBS surface. In one embodiment, the virtual surface 25 may be the "skin" of a volumetric solid.

A stateless haptic rendering algorithm would consider only the haptic interface location 98 in determining the resulting forces from a collision. It would not consider any history or previous collisions. The resulting forces in a stateless algorithm would use only the current haptic interface location 98 to determine the 1) depth of penetration and 2) direction to the nearest surface 25. The resulting force vector would be a vector toward the nearest surface whose magnitude is proportional to the penetration depth. In the case of a voxel embodiment, the penetration depth of the haptic interface device point is generally proportional to the voxel density at that point.

The direction of the force vector would be a vector that points from the haptic interface location 98 to the closet point on the surface. In the case of the voxel embodiment, this vector is simply the maximum voxel gradient (i.e. direction of greatest voxel density change) at the haptic interface location 98. In conclusion, a stateless haptic rendering algorithm would consider the location of the haptic interface device at each iteration, determine if it has crossed a virtual surface 25 or is embedded in a virtual object 26, then return a force vector whose direction is from the haptic interface device location 98 to the nearest point on the surface, and whose magnitude is proportional to the penetration distance.

A stateless algorithm handles only basic cases of tool 28 interaction and falls short of accurately representing some cases. The most notable case for which the stateless algorithm fails is for the case of thin objects. If a user begins pressing through a thin surface, at some point the nearest surface point to the haptic interface device location 98 will be on the other side of the thin object (i.e. after the user has pressed more than halfway through), and thus the force vector will incorrectly push the user out the other side.

An improved algorithm keeps track of a virtual tool position at each iteration. Maintaining this virtual tool position is an efficient way to contain state information about the history of the user's path or trajectory. If the haptic interface device location 98 moves across a surface, the algorithm will attempt to move the virtual tool 28 toward the haptic interface device location 98, but never through the surface, as if the two points were connected by a spring. The resulting force sent to the haptic interface device 10 is proportional to the distance between the tool 28 and the haptic interface device location. In some embodiments, the force is also proportional to the difference in velocity or acceleration between the virtual tool 28 position and the haptic interface device location 98. The tool position on the virtual surface 25 is referred to herein as the surface contact point or SCP 226.

In one embodiment, the haptic rendering process 16 attempts to minimize the distance between the SCP 226 and the current haptic interface location 98, given that a path of decreasing distance exists between the last SCP 224 and the desired one. The connection between the SCP 226 and the haptic interface location 98 can be viewed as a spring. The haptic rendering process 16 processes the locations of the SCP 226 and haptic interface location 98 in iterative steps. At each iteration, the haptic rendering process 16 attempts to minimize the distance from the SCP 226 to the haptic interface location 98 if possible.

In one embodiment, the haptic rendering process 16 uses an algorithm for determining the SCP 226 based on a stepping method. For a given number of iterations, the algorithm determines a valid direction to move the SCP 226 which would yield a better solution (that is, decrease the distance between the SCP 226 and the current haptic interface location 98) and moves the point from the previous SCP 224 to a current SCP 226 in that direction. In one embodiment, valid directions are those which move along the virtual surface 25 of the virtual object 26. The haptic rendering algorithm should not allow the SCP 226 to penetrate the virtual surface 25 as it steps toward the haptic interface location 98.

FIG. 15 shows one method of determining a final SCP 226 used in one embodiment. FIG. 15 illustrates changing SCP positions 264*a*, 264*b*, 264*c*, tangency planes 260*a*, 260*b*, 260*c*, and resulting SCP 226. The resulting SCP 226 is a stationary position until the user makes a further movement of the virtual tool 28. In one embodiment, the changing SCP 264 is similar to the last or previous SCP 224. In one embodiment, the tangency planes 260*a*, 260*b*, 260*c* are similar to the tangency plane 104 described earlier. Using this process, the haptic rendering process 16 creates a tangency plane 260*a* for an existing SCP 264*a* using the surface direction vector 101*a* for the SCP 264*a*. The haptic rendering process 16 then moves the SCP 264*a* a fixed step (predetermined distance) on the virtual surface 25 to new SCP 264*b*, constraining the movement of the changing SCP 264*b* to the tangency plane 260*b*. The haptic rendering process 16 then determines a new tangency plane 262*b* and repeats the stepping process to move the SCP 264*b* to a changed SCP 264*c*. The haptic rendering process 16 then creates a new tangency plane 262*c* and repeats the process until the SCP 264*c* reaches a final position at SCP 226 above, or at the shortest distance from, the haptic interface location 98, as shown in FIG. 15. This method of movement is also termed a march by the SCP 264 across the virtual surface 25.

In one embodiment, the SCP 264 is constrained to move in the plane 260, which passes through the current SCP 264 and whose vector is the approximate direction of the normal to the virtual surface 25 at that point. In other words, the SCP 264 is allowed to move in any direction perpendicular to the surface direction vector 101 at that point. In one embodiment, the haptic rendering process 16 determines which direction along that plane 260 which would yield the optimum solution (that is, the solution that decreases the distance between the SCP 264 and the haptic interface location 98 by the largest amount) and moves the SCP 264 in that direction. Since the shape of the surface 25 at the SCP 264 position may be curved, moving linearly in some direction may either cause the SCP 264 to penetrate the virtual surface 25 (if convex) or leave the virtual surface 25 (if concave) causing an error in the SCP 264 position. Therefore, the SCP 264 may be projected onto the surface at each step. In one embodiment, this error is minimal if the step size is small, so the haptic rendering process 16 only needs to project the SCP 264 onto the virtual surface 25 after the final position (final surface contact point 226) has been determined from the march. Another potential problem involves local minimums and maximums. Because the SCP 264 only moves in directions which draw it progressively closer to the haptic interface location 98, the SCP 264 may not be able to traverse local maximums (that is, small humps in the virtual surface 25) and may settle in local minimums (small dips in the virtual surface 25). In one embodiment, the solution is to allow the spring (a spring calculation connecting the SCP 264 and haptic interface location 98) to stretch a small and finite distance so that the SCP 264 march can overcome these local discrepancies. In one embodiment this problem of local maximums and minimums rarely becomes a serious problem, so the spring stretching approach need not be implemented.

In another embodiment, the haptic rendering process 16 implements an iterative stepping algorithm as follows: The haptic rendering algorithm creates a plane 260 passing through the current or changing SCP 264, whose surface direction vector 101 is the calculated approximate normal to the virtual surface at the SCP 264. The haptic rendering algorithm projects the current haptic interface location 98 onto the nearest point on that plane 260*a*, 260*b*, 260*c* and creates a vector 262*a*, 262*b*, 262*c* from the SCP 264*a*, 264*b*, 264*c* to that point. This vector then becomes the desired direction for the march. The haptic rendering algorithm moves the SCP 264*a*, 264*b*, 264*c* a fixed step in the direction indicated by the vector 262*a*, 262*b*, 262*c*. The haptic rendering algorithm repeats these steps. Finally, the haptic rendering algorithm projects the SCP 264*a*, 264*b*, 264*c* onto the virtual surface 25 using the intersection technique described above. In an alternate embodiment, the haptic rendering algorithm uses the faster but less robust technique of projecting based on the surface direction vector 101 and density value at that point. For example, see FIGS. 17A-17E.

Collision Detection with Three-Dimensional Tools

Collision with a point interface is sufficient for many interactions, but in one embodiment a more complete method of three-dimensional tool interaction is used. The virtual tool 28 is represented by a series of points along its surface, as discussed previously. At each iteration, the haptic rendering process 16 tests each of these points on the surface of the tool 28 to test for penetration of the tool 28 into the virtual surface 25 of the virtual object 26.

Improved Stepping Method

One embodiment of the haptic rendering process 16 maintains a tool position and iteratively moves it toward the current haptic interface location 98. The haptic rendering process 16 operates in a repeated loop of iterative processing steps. For each loop, the haptic rendering algorithm attempts to minimize its distance to the haptic interface location 98 without violating the virtual surface 25. In other words, at each iteration, the spring connection between the tool 28 and the haptic interface location 98 attempts to contract, but stops if that action would cause any of points of the virtual tool 28 to penetrate the virtual surface 25.

During each iteration, the haptic rendering process 16 attempts to march the tool 28 toward the haptic interface location 98, checks for violations against the virtual object 26, and repeats this process a number of times. Since the haptic rendering process 16 evaluates for collision at a potential tool location which is a distance equivalent to the step size away from the previous tool location at each step, the step size is bound to a relatively small value so that the haptic rendering process 16 does not jump the tool 28 over any features such as a concave "hole" in the surface 25 of the virtual object 26. The step size should also be large enough so that the movement of the tool 28 can reasonably keep up with the movement of the haptic interface location 98 as the user moves the haptic interface device 10. If the haptic interface device 10 moves a considerable distance but the step size of the tool 28 is small, the user feels a drag as the haptic rendering process 16 attempts to move the tool 28 to the haptic interface location 98. In one embodiment, the step size for each iteration should be less than the minimum feature size that the user will want to feel. In one voxel embodiment, the step size is one half of the voxel grid spacing.

Moving Along a Face of a Surface

If the movement method is to always move directly toward the haptic interface location 98, the tool 28 would get "stuck" on the virtual surface 25 once it touched the virtual surface 25. Therefore, the haptic rendering process 16 attempts to move the tool 28 along the surface 25 in a manner that minimizes its spring distance (between the tool 28 and the haptic interface location 98) instead of simply backing up to the previous position whenever the tool 28 violates the surface 25. The methods for achieving this are similar to those for determining the SCP 226 for a single point.

Figure 17A:
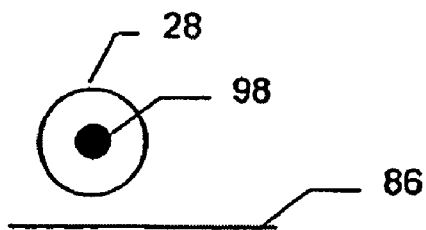
Figure 17B:
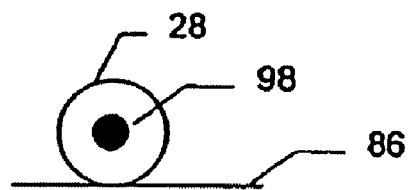
Figure 17C:
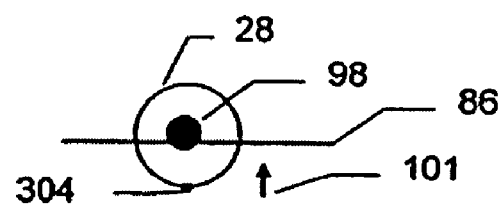
Figure 17D:
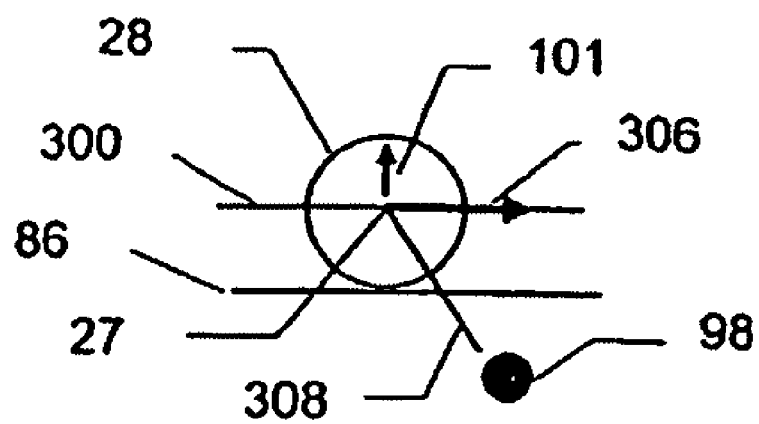
Figure 17E:
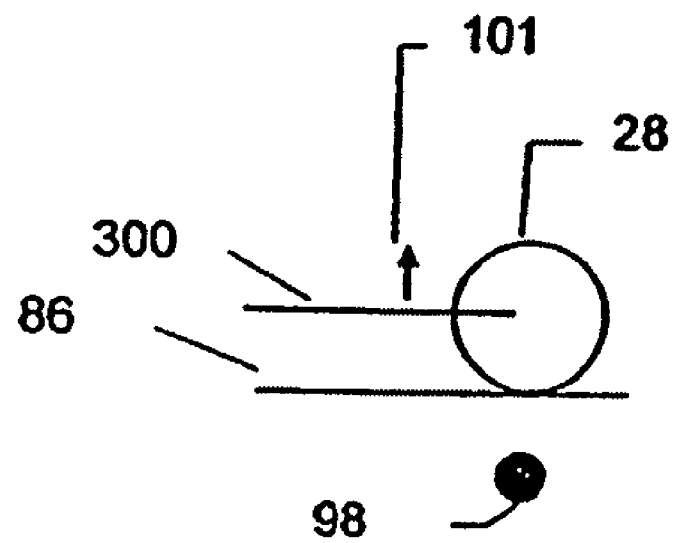

FIGS. 17A-17E show a virtual tool 28 encountering a virtual surface 25 and moving along the virtual surface 25 constrained by a plane 300. In FIGS. 17A and 17B, the tool 28 is not penetrating the virtual surface 25, so the haptic rendering process moves the tool 28 to follow the location of the haptic interface location 98. In FIG. 17C the potential tool position would result in penetration of the virtual surface 25 and thus violate the interaction constraints. The haptic rendering process 16 determines the surface direction vector 101 at the point of greatest potential penetration 304. In FIG. 17D the haptic rendering process 16 determines a plane 300 perpendicular to the surface direction vector 101 and passing through the last legitimate tool position in FIG. 17B. The haptic rendering process 16 constrains the virtual tool 28 to move only within the plane 300. The desired direction of motion 306 is determined by taking a vector 308 from a tool origin 27 to the haptic interface location 98 and projecting that vector 308 onto the plane 300. In FIG. 17E, the tool 28 moves a fixed distance in the direction determined in FIG. 17D. This manner of movement effectively allows the tool 28 to move along the virtual surface 25 without getting "stuck." Once the haptic rendering process 16 determines that the tool 28 is near the virtual surface 25 (that is, after finding a potential penetration), this method may be used for all further calculations until the tool 28 leaves the virtual surface 25 (that is, the potential tool points cease to penetrate the virtual surface 25, causing the tool 28 to no longer be in a touching state).

Thus, the haptic rendering process 16 can detect when the tool 28 is on a face of a virtual surface 25, and attempts to move it along the surface 25 instead of directly toward the haptic interface location 98 when this condition is detected.

Moving Along or Across an Edge

More complicated situations may occur where the haptic rendering process 16 is moving the virtual tool 28 along an edge 108 or 177 instead of a face of a virtual object 26. In this situation, the haptic rendering process 16 constrains the tool 28 to a line (the edge) instead of a plane (the face). When multiple potential penetration points on the surface of the tool 28 have differing surface direction vectors 101, then the haptic rendering process 16 assumes that the tool 28 is at an intersection of the two faces with differing surface direction vectors 101, and constrains the tool 28 to that virtual edge 108 accordingly. The virtual edge 108 is the cross product of the surface direction vectors 101; the haptic rendering process 16 then constrains the tool 28 to moving only in that direction or its negative. (See the discussion of edge constraints associated with FIGS. 7A-7C.)

In one embodiment, it is not always the case that the haptic rendering process 16 constrains a virtual tool 28 to moving along an edge 108 or 177 when one is detected. Otherwise, when attempting to slide across edges 177 that are convex (that is, mountains or "sharp" edges 177 in the virtual surface 25 of the virtual object 26), the tool 28 may get stuck. Thus, the haptic rendering process 16 should distinguish between when the tool 28 is attempting to slide along a concave edge 108 versus when it is attempting to cross a convex edge 177. This is determined by taking the dot product of the desired direction (that is, a vector from the tool origin 27 to the haptic interface location 98) with the surface direction vectors 101 of each face that forms the virtual edge 108 or 177. See FIG. 7B. A positive dot product indicates that the tool 28 is attempting to move away from one of the virtual surfaces 25 instead of sliding along the edge 108 or 177. If either dot product is positive, the haptic rendering process 16 assumes that the tool 28 is moving across a convex edge 177 and does not constrain itself to the convex edge 177. When this case is detected, the haptic rendering process 16 "pushes the tool 28 away" slightly, moving in the direction of the vector which is the average of the two surface direction vectors 101.

The methods described above are sufficient in most cases; however, scenarios exist where the movement of the tool 28 may get "stuck" and the haptic rendering process 16 is unable to move the tool 28 along the virtual surface 25 effectively. To compensate for this, the haptic rendering process 16 tries moving the tool 28 tries away from the surface 25 (that is, in the direction of the surface direction vector 101) at small increments if it has been stuck for a considerable time (that is, the haptic rendering process 16 has unsuccessfully attempted to move the tool 28 for the past several iterations).

Progressive Extraction

Finally, there are situations in which the tool 28 somehow becomes stuck inside the virtual surface 25. In other words, the current tool position is penetrating the surface 25. For example, if the user touches a surface 25 with the flat face of a cube, then rotates the cube such that one of the edges is now penetrating the surface 25. Unless the haptic device limits this rotation via a torque feedback, the haptic rendering process 16 can put the virtual tool 28 in a position of penetration, which violates the desired behavior. In one embodiment, the haptic interface device 10 would have six degrees of freedom of force feedback and thus not allow invalid rotations. In other embodiments, the haptic interface device 10 has more than six degrees of freedom. An embedded tool position may also occur if the user uses a modification mode to add material on top of the tool 28, or the virtual object 26 is rotated such that the tool 28 suddenly becomes embedded.

If the tool 28 is forced to an invalid position, the haptic rendering process 16 needs some way of extracting the tool 28 to a valid position. In these cases, the haptic rendering process 16 should attempt to move the tool 28 in a direction away from the virtual surface 25 to escape the surface 25. Therefore, if the tool 28 is stuck such that moving directly toward the haptic interface location 98, moving along the constraint plane 300, moving to its previous position, and moving in the direction in the normal of that plane 300 all would result in penetration of the virtual object 26, then the haptic rendering process 16 attempts to "jump" the tool 28 a significant distance in the direction of the surface direction vector 101. (See FIG. 7C.) If this jump still does not free the tool 28 (that is, one of its points would remain embedded in the surface 25), but the proposed position results in lesser penetration of the virtual object 26, then it is considered a superior position (that is, if the point of greatest penetration yields a lower density evaluation value than the previous evaluation for the previous point of greatest penetration). This condition allows the haptic rendering process 16 to have a notion of "progress;" that is, even though moving in some direction does not fully release the tool 28 from the surface 25, the movement is still an improvement over the previous position if moving in this direction causes the penetration distance to decrease.

Random Extraction

The above methods handle most cases. However, some scenarios exist where the tool 28 is "stuck" but moving in the direction of the normal to the plane does not yield any improvement. This is a rare condition since the surface direction vector 101 points toward the surface 25 of the virtual object 26, moving in that direction should decrease the penetration distance. But although moving in that direction decreases the penetration distance of that point which is used to determine the surface direction vector 101, this movement may increase the penetration of another point (usually one of the opposite side) such that the tool's 28 overall penetration distance increases. In circumstances where none of the above techniques yields acceptable results, the haptic rendering process 16 may conclude that the tool 28 is truly stuck and should not legally move (for example, as in FIGS. 16A and 16B).

For example, suppose a spherical tool 28 ends up in a situation where it is in a gap or channel 270 between two virtual objects 272 and 274, whose width is less than that of the tool 28. A similar situation occurs if the tool 28 is in a tunnel or conduit in a virtual object 26. FIGS. 16A and 16B show a spherical virtual tool 28 in a channel 270 formed between two virtual objects 272 and 274. The diameter of the channel 270 is less than the diameter of the virtual tool 28. FIG. 16A shows a point of greatest penetration 276 and a vector 278 to the surface 280 of virtual object 274. FIG. 16B shows a new point with greatest penetration 282 and its computed vector 284. The point 288 represents the tool surface contact point for the previous penetration of virtual object 274. The haptic rendering process 16 may determine that the point 276 with the greatest X value has the greatest penetration (based on a horizontal X axis for FIGS. 16A and 16B). It will then push the sphere 28 toward the minus X direction by some distance. During the next iteration, the point of greatest penetration will probably be the point 282 with the least X value. This will then cause the sphere 28 to move back in the X direction by some distance, etc. In this example, the haptic rendering process 16 could cause the tool 28 to oscillate indefinitely between the positions depicted in FIGS. 16A and 16B.

Thus, as a final method, the haptic rendering process 16 may attempt to move the tool 28 in a random direction as a way of arriving at a better solution (that is, one that decreases the greatest penetration distance). (See FIG. 7C.) However, in one embodiment, instead of moving in a purely random direction, the haptic rendering process 16 determines which of the points of the tool 28 have computed surface direction vectors 101 (that is are either embedded in the surface 25 or within the field of decreasing non-zero values surrounding the surface 25) and chooses one of those surface direction vectors 101 randomly as the direction to move in. The movement of the tool 28 obeys the same rules as described for other cases in FIGS. 7A-7C. If the maximum penetration distance does not decrease as a result of the attempted move, then the haptic rendering process 16 does not move the tool 28 but instead tries a different direction.

Note that this final method is fairly expensive computationally. Thus, when the tool 28 reaches this state, the haptic rendering process 16 may determine all the current tool penetration points only once, by creating a list of indices of points whose penetration values are within the virtual surface 25. In one embodiment using voxels 78, the points include those points with densities greater than the density of the threshold value (isosurface 86). For all successive iterations, the haptic rendering process 16 randomly chooses one of the points and moves the tool 28 in the direction of that point's surface direction vector 101.

Variable Step Size and Other Optimizations

Adaptive Step Size

In one embodiment, the user may feel a drag force if the haptic rendering process 16 is not able to maintain the movement of the tool 28 with the movement of the haptic interface device 10. For example, if the step size or number of iterations is small, then the haptic rendering process 16 may take a considerable amount of time to move the tool 28 to its final position if the haptic interface device 10 has moved a significant distance. Thus, it is desirable to have an adaptive algorithm that interactively sets the step size depending on the movement of the haptic interface device 10. If the haptic interface device 10 is moving quickly, then the step size increases to compensate. If the haptic interface device 10 is not moving quickly, the step size is decreased so that the tool 28 can be placed with greater accuracy. A smaller step size also helps prevent undesired buzzing or vibration of the haptic interface device 10. Buzzing can occur when the haptic rendering process 16 cycles the tool 28 between multiple positions, attempting to settle but never finding rest. See FIGS. 16A and 16B. However, if the step size is decreased, these oscillations become very small and barely noticeable or do not occur at all. On the other hand, if the user is moving a large distance, then oscillations and "buzzing" do not occur because the haptic rendering process 16 is attempting to maintain the position of the tool 28 with the haptic interface location 98 of the haptic interface device 10 instead of having the tool 28 stay in one position. Thus, if during a given loop, the haptic interface device 10 is not moving rapidly, the step size of the tool 28 is decreased.

Adaptive Number of Iterations

If the computer processor is not performing any other process-consuming tasks, then the number of iterations per second can be increased safely. The most intensive operations occur if the user is not only interacting with the virtual object 26 but is modifying it in some manner. For example, if the haptic rendering process 16 is using the tool 28 to remove or add material, the calculations can consume much of the processing time. If the virtual object 26 is not being modified, the haptic rendering process 16 assumes it can use a greater portion of the processing time and thus increases its number of iterations. In one embodiment, the number of iterations is increased by a factor of two. In other embodiments, other factors are used to determine the number of iterations.

Tool Point Collision Detection Optimization

The processing requirement per step can also be decreased if not all points along the tool 28 are evaluated at each loop. Evaluating a large number of points to check for penetration of the virtual surface 25 by the virtual tool 28 consumes a large amount of processing time. In one embodiment, a faster method attempts to optimize this by choosing only a set number of points to evaluate during each iteration, depending on which points are closest to the surface 25. In a voxel embodiment, during the first step in each loop, the haptic rendering process 16 evaluates the density values for the voxels 78 at all tool points and remembers the five points that evaluated to the greatest densities. For subsequent steps during that loop, it characterizes the tool 28 by those five points and thus does not perform any collision detection with any of the other tool points. This gives a significant performance increase. In one embodiment, the average tool 28 may have around 80 tool points, so evaluating the only 5 of 80 provides a large advantage. When this optimization is used, the number of iterations per loop is doubled to four, so that the haptic rendering process 16 only performs collision detection against every tool point every fourth step.

This can lead to situations where one of the tool points would violate the virtual surface 26, if that point was not one of the original five chosen during the first step. The haptic rendering process 16 however, does not usually place the tool 28 in situations where a valid position cannot be found following an evaluation of a potentially illegal series of steps.

Adaptive Stepping Behavior

In one embodiment if the haptic rendering process 16 has been moving the tool 28 toward the haptic interface location 98 without encountering intersections with virtual objects 26) for several iterations, then the haptic rendering-process 16 assumes that the tool 28 is in empty space. For future iterations, instead of stepping toward the haptic interface location 98, the tool origin 27 is set to be coincident with the haptic interface location 98 at each step. Thus, the user does not feel any unwanted force effects. This continues until the tool 28 intersects with a virtual object 26, in which case the haptic rendering process 16 uses the previously discussed stepping algorithms to increment the tool position to a valid location. The number of legal steps needed before the tool 28 is set to the haptic interface location 98 may be defined to be one hundred iterations. In other embodiments, the number of legal steps may be less than or greater than one hundred iterations.

Optimize Transform Computations

For each collision detection evaluation between a tool point and the virtual surface 25, the point is transformed from the local coordinates of the tool 28 to the local coordinates of the virtual object 26. The greatest process consumption involves multiplying the point by the appropriate transformation matrix to account for the rotation of the tool 28 and virtual object 26. In one embodiment, instead of calculating this transformation for each loop, the points are only updated to the current orientation every one hundred iterations. When the points are updated, they are stored in a separate point array of local points, which is used to represent the tool 28 until it is again updated. Note that only the rotation of the points is updated every one hundred iterations; the translation of the points is accurately updated every loop to accurately reflect the potential position of the tool 28.

Additional Conditions Handling

Normally, the haptic rendering process 16 places the tool 28 to remain on the outside of any virtual object 26 with which it is interacting. If some small portion of the tool 28 becomes buried in the virtual object 26, the tool 28 can usually be extracted to the surface 86 using one or more of the techniques described above. However, situations exist where the tool 28 may instantaneously become completely buried inside a virtual object 26. For example, if the user adds a large amount of material over the current tool position, or the user begins the program with the tool position inside a virtual object 26, then the tool 28 is buried. If the tool 28 is ever inside a virtual object 26, the desired behavior is for the haptic rendering process 16 to gradually push the tool 28 away from the virtual object 26 in the direction of the nearest surface 86. In another embodiment, the tool 28 reaches a state where it is completely or nearly buried in a virtual object 26, then no forces are generated until the haptic rendering process 16 moves the tool 28 to exit completely the virtual object 26. It sets its position to the haptic interface location 98 for subsequent iterations and generates no collisions until the tool 28 reaches a position where every tool point is outside of the virtual object 26. In a voxel embodiment, the tool 28 is considered buried if its center evaluates to a density value approximate to the maximum density value (which is a value of 255 in one embodiment).

Tool Behavior Under Object Transformations

The tool position is stored in the local coordinates of the virtual object 26. Thus, if the virtual object 26 instantaneously changes scale, translation, or rotation, the tool position may jump, and the user feels a sudden "kick back" in the haptic interface device 10. To prevent this in one embodiment, a check is made during the first potential step of the tool 28 to determine if the transform of the object 26 has changed significantly since the previous loop. If this is true, then the tool position is set to the haptic interface location 98, and therefore no force generated. For example, if an object 28 were scaled upward, the haptic rendering process 16 would bury the tool 28 in the virtual object 26 instead of kicking the tool 28 to the surface 86.

Tool Position Error

The tool 28 is most often not directly on the virtual surface 25. As discussed previously, the haptic rendering process 16 only moves the tool 28 in discrete steps and its movement is constrained from violating the surface 25. Thus, the tool 28 rarely settles directly on the surface 25. This difference in position is not particularly noticeable when the user is feeling the surface 25 with the virtual tool 28. Realistic feel does not depend on having the tool 28 always directly on the virtual surface 25. In one voxel embodiment, step sizes are generally around 0.1 grid space unit; thus, the user at most experiences an error of 0.1 grid space units from the surface 86. This is below the threshold where it would make a difference in the force felt by the user. In other embodiments, the step size may have other values than the 0.1 grid space unit.

Modification Techniques

FIG. 18 illustrates a flowchart of the modification process occurring between a virtual tool 28 and virtual object 26. First, a virtual tool 28 is determined or generated in virtual space that represents the haptic interface device 10 that the user is manipulating in real space (step 400). In one embodiment, the haptic rendering process 16 generates the virtual tool 28. The virtual tool 28 includes a plurality of discrete points. The user then selects a modification mode that determines what kind of modification occurs to the virtual object 26 as a result of interaction between the virtual object 26 and the virtual tool 28 (step 402). The modification modes can include material removal, material addition, and other material modification modes. The material removal modes can include a remove, erase, and sandpaper modes. Material addition can include addition and push and pull modifications. The material modification mode can include smoothing, mirroring, and other material modification modes.

In step 404, sensors determine the location of a user in real space. In one embodiment the user is manipulating a haptic interface device 10 and sensors determine the position of the haptic interface device 10 in real space.

The modeling application 12 then determines the location of the discrete points of the virtual tool 28 relative to the location of the virtual object 26 (step 406). In one embodiment the haptic rendering process 16 determines these locations. The haptic rendering process 16 then calculates an interaction force between the virtual tool 28 and the virtual object 26 based on the locations of the points of the virtual tool 28 and the location of the virtual object 26 (step 408). The user feels the interaction force through the haptic interface device 10, which thus provides feed back to the user on the interaction of the virtual tool 28 with the virtual object 26. In one embodiment, the haptic rendering processor 16 provides the interaction force to the haptic interface device 10. In one embodiment, the virtual object 26 includes a virtual surface 25 and the position and orientation of the virtual tool 28 is determined relative to the virtual surface 25 based on the locations of the points of the viral tool 28 compared to the virtual surface 25. In one embodiment using voxels the virtual surface is a virtual isosurface 86.

The modeling application 12 then produces a modified virtual object 26 by modifying the virtual object 26 based on the modification mode, the position of the virtual tool 28, and the location of the virtual object 26 (step 410). In one embodiment, the modification processor 20 produces the modified virtual object 26. For example, if the virtual tool 28 is in a removal mode and the user is attempting to penetrate the virtual object 26 with the virtual tool 28, then the modification processor 20 removes material from the virtual object 26 that is in the path of the tool 28 as the user pushes the tool 28 into the object 26. If the modification mode is a sandpaper mode, and the user is rubbing the virtual object 26 with the virtual tool 28 (as though rubbing wood with sandpaper), then the modification processor 20 removes a limited amount of material from the virtual object 26 that corresponds to the area being rubbed and the force and amount of rubbing that the user is applying to the virtual object 26.

The modified virtual object 26 is then output from the system. In one embodiment, the output is a modified visual image of the virtual object 26 that is output to a graphics display 14 by the modeling application 12 or graphics processor 22. In one embodiment, the output also includes a new or modified shape, which the user feels through the haptic device. The user then decides whether to continue with the modification process (step 414). If the user decides to continue in the same modification mode, the user makes an additional movement of the virtual tool 28, and the haptic rendering process 16 determines the new position of the virtual tool 28 (step 406). The user may decide to select a different modification mode (step 416) and returns to step 402 to select the new modification mode. If the user does not decide to make any further modifications, then the virtual object 26 may be displayed, output, or saved to a disk, tape, or other data storage device (step 418). Output may include output or export to on an alternate file format or a printing device or a device that provides a physical, real world model of the virtual object 26.

Basic Modification Techniques

The modification process between a virtual object 26 and virtual tool 28 is described in more detail below for one embodiment of the invention as implemented by the assignee, SensAble Technologies, Inc. of Cambridge, Mass.

Voxel-Based Removal

As described previously, one embodiment uses a voxel model to define the isosurface 86. Modifications to the isosurface 86 are made indirectly, by modification of the voxel density values, based on the virtual tool 28 location relative to the isosurface 86.

In one embodiment, the tool 28 itself stores voxel density values for various locations throughout its volume. In another embodiment, the density values are calculated only when needed and are not stored. For a given location of the tool 28 in the haptic virtual environment, the "tool density values" are then compared to the density values of the virtual object 26 at those locations. The density values of the virtual object 26 are then modified based on the comparison with the tool density values and the modification mode. For example, if the modification mode was set to removal, when the virtual object density values were found to be greater than those of the tool 28 at the identical location, the virtual object density values would be set to match those of the tool 28. This has the effect of lowering the density value of the virtual object 26 at that location, resulting in a modification to the isosurface 86 that appears as removal of material.

How the modification mode is set affects how voxel densities are defined inside the virtual tool 28. For the case where modification mode is set to removal, the voxel densities are set in the tool 28 such that they are at the minimum value on the most interior portions of the tool 28 and set at a maximum value beyond the virtual isosurface of the tool 28. The direction of density value increase is reversed when modification mode is set to addition. That is, the voxel density values are greatest within the tool 28 and go to their minimum beyond the virtual isosurface of the tool 28.

Example Tools

Many different tool shapes are possible. In one embodiment, the voxel densities assigned within the virtual tool 28 are made based on distance from a tool "center". For example, in the case of a sphere tool and a modification mode of removal, voxel densities at the center of the sphere would be their lowest value. On any line emanating radially from this center, the voxel density values would increase, depending on the ramp length, until they reached the isosurface value at the apparent surface of the virtual tool 28. On this same radial line, beyond the virtual tool surface, voxel densities would continue to increase until their maximum value was reached. The tool, then, in this embodiment, is a "field" of voxel density values, which when moved around by the user transfers its values, when appropriate, to the virtual object 26, resulting in modification of the object 26.

Note that it is possible to define virtually any arbitrarily shaped field, using this approach, and thus have an unlimited number of virtual tools 28. In one embodiment, the user can draw arbitrary 2-dimensional shapes which are then populated with voxel density values, much like the more complicated 3-dimensional example above. In one embodiment, the actual shape of the tool is created by carving the virtual object 26, and then defining the shape of the tool 28 to be that of the object 26. These interactively carved tool shapes can be saved to a file and used later or shared through the Internet.

Pillboxing

Although the user is conceptually moving in a continuous motion, tool locations are only sampled discretely. As the user can move the virtual tool 28 quite quickly through space, it is necessary to be able to reliably remove or add material on the path between sampled tool positions. FIG. 19A provides a pictorial view of a removal based on a removal line 454 between two such points P21, P22. FIG. 19A is a 2-D representation of a 3-D removal process. Conceptually, planes 456 and 458 are formed at each endpoint and extend vertically out of the plane of the FIG. 19A. The removed area may be termed a "pillbox" or swept area 452 between the two points P21, P22. In one embodiment, this type of removal may occur automatically when the user holds down a switch button on the haptic interface device 10 such as a stylus having a button on it, and the user moves the stylus to drag the haptic interface location 98 through a region to form the swept area 452. In another embodiment, the haptic rendering process 16 may receive a request that is equivalent to sweeping a sphere 34 across an area, in effect creating a cylinder with spherical ends.

FIG. 19B provides a pictorial view of endpoints P21, P22, a point P23 where the appropriate voxel density value must be computed, a projected point P24, and conceptual endpoint planes 456, 458. In FIG. 19B a virtual tool 28 is represented by sphere 462a representing the starting position of the tool 28 and sphere 462b representing the ending position of the same tool 28. Two planes, 456, 458 exist conceptually, one at each endpoint of the segment 454. If the point of interest, P23, lies between the planes 456, 458, then the point P23 is projected the shortest distance to the line segment 454. The resulting density value at point P23 is based on the distance from point P23 to the line, as if the tool 28 was centered at the point P24.

Optimizing Removal and Addition

When the user requests a removal by moving the virtual tool 28 in a removal mode, the haptic rendering process 16 determines the number of voxels the tool 26 currently occupies, the desired settings for each of these voxels, and then changes these voxel values if needed. If the haptic rendering process 16 determines that the current voxel value at some point is less than the desired voxel value, then the haptic rendering process 16 does not need to modify that point. For removal, only voxels that need to be decreased (that is, voxels whose densities are greater than the desired target density) are modified.

In one embodiment, the feel of the object 26 must be updated at a very high rate. As such, removals are made at a slower rate than the feel of the object 26 is updated. Whenever a removal request is read, a box enclosing the extent of the removal operation is determined, and the number of voxels in that box is calculated. The removal is then spread over several iterations. Because the removal extends over multiple cycles but touch is performed each cycle, the virtual object 26 may not feel "correct" to the user during an intermediate stage of the removal. However, in practice, this difference is small and offset by the benefit of allowing large-scale removal.

Ensuring Accurate Modification & Feel

Although the tool 28 is frequently intended to be "just touching" the virtual surface 25, in practice it is usually only approximately touching. As such, the first step in modification is to accurately position the tool 28 as just touching the virtual surface 25. In one embodiment, this step is accomplished by doing a binary search along the approximate surface normal at the point of greatest potential tool penetration. Using the binary search, a more exact location for the surface 25 at the potential penetration point is computed, and the tool origin 27 is then moved such that the point in question is coincident with the computed surface location.

Since the point locations used for sensing penetration may have space between them, it is possible for the sample points to not penetrate the virtual surface 25, but still have potential embedding of the virtual tool 28. FIGS. 20 and 21 illustrate two cases of this. FIG. 20 depicts a cube 466 near a virtual surface 25 which has a protruding feature 490 of the virtual surface 25 penetrating between two points, P31, P32 of the cube 466. In FIG. 20, the features are more detailed than the point distribution on the cube 466, so the feature 490 is able to penetrate undetected between the points P31, P32. FIG. 21 depicts a sphere 34 penetrating a virtual surface 25 between two points S3, S4 of the sphere 34. The sphere 34 is a convex object, so penetration may occur even when the virtual surface 25 is completely flat.

In the case of a tool 28 that is a sphere 34, the haptic rendering process 16 can reliably determine how much penetration has occurred between points of the sphere 34 when contacting a reasonably flat virtual surface 25. For example, FIG. 22 depicts a sphere 34 represented by multiple points S11, S12, S13, S14 none of which penetrate a virtual surface 25. FIG. 22 also shows a surface direction vector 101 at point S12, a vector 494 from S12 to the origin 496 of the sphere 34, and calculated distance 498 from the origin 496 to the virtual surface 25. At the current contacting point S12, the haptic rendering process 16 first finds the surface direction vector (v1) 101 of the virtual object 26 at that point. The haptic rendering process 16 then takes the dot product between the normalized surface direction vector (v1) 101 and the vector (v2) 494 from the point S12 to the origin 496 of the sphere 34. The resulting distance 498 indicates how much of the sphere 34 is not penetrating the virtual surface 25. This distance is then used in correcting the position of the sphere 34 to be tangent to the virtual surface 25. Note that this position correction is only performed to calculate the tool position for modification. When the user is simply feeling the virtual surface 25, no correction to the tool position needs to be made because the feel of the tool 28 does not have to be exceptionally accurate to create a compelling feel to the user.

The second step in modification is to then tentatively embed the tool 28 by a specified penetration distance based on the removal metaphor or mode. The embedded tool 28 is then superimposed against the virtual object 26 and, in one embodiment, the voxel densities of the virtual object 26 updated based on the voxel densities of the tool 28 at the superposition locations. The penetration rate can be at a constant rate or it can be at a variable rate based on equations, functions, or other rules. For example, a rule or equation could state that no modification occurs until a certain force threshold is met or that the amount of penetration is dependent in a non-linear way on the amount of force applied or the velocity of the movement.

As the virtual object 26 is updated, both the graphical display and the haptic feedback or touch sensation are updated at very high rates. By properly limiting tool motion, using concepts such as softness, friction, and many other physical simulations, virtually any effect can be simulated for the user, including the effect of feeling the surface 25 while carving.

Modification with Alternate Feel

Although it is frequently desirable to give the user the feeling that he is carving a surface 25, it is also possible to give the user other touch sensations when performing modifications. For example, a non-directional viscous force can give the sensation of pushing the tool 28 through a thick liquid. In one embodiment, when the user activates the stylus switch on the haptic interface device 10 to begin removal, a point constraint is generated at the haptic interface location 98. This point follows and matches with the haptic interface location 98 unless it is removing material. (In other words, if the haptic interface location 98 is surrounded by empty space, the user does not feel any force effects). When modification occurs, this point constraint moves; more slowly toward the haptic interface location 98 and thus produces a drag effect. The force the user feels is modeled as a spring effect between the point constraint and the actual haptic interface location 98.

To determine if any material needs to be removed, the haptic rendering process 16 performs the removal method and notes the number of voxels that have been affected. If this number is greater than zero, then the haptic rendering process 16 determines that the tool 28 is removing material and applies a drag force to the tool 28. The distance the tool 28 is allowed to move during removal is dependent upon the user-defined removal rate.

In one embodiment, using the voxel approach for more accuracy, this removal rate can be dependent upon the number of voxels changed, so that the tool movement is further constrained if a larger number of voxels have been affected. Conversely, if the haptic rendering process 16 determines that the movement of the tool 28 only removes an insignificant number of voxels, then it can be permitted to move further. In one embodiment, the approach is to count those voxels that have been changed from above to below the isosurface value 86. In another embodiment, a force threshold is imposed; such that the haptic rendering process 16 would only remove material if the threshold exceeds a certain user-defined force.

Addition

As mentioned previously, addition is the opposite of subtraction: the same methods are used except for some minor changes to reverse the subtraction process. In one embodiment based on the voxel approach, the gradient within the tool 28 is inverted. That is, the higher voxel values are found in the most interior region of the tool 28 and the lowest values outside of the virtual surface of the tool 28.

Existing voxels are only changed to the desired voxel values when the latter exceeds the current values. Force effects are also different. As voxels are being added, the user feels only a 3-D-friction force similar to that experienced in non-contact removal mode. In other words, a point constraint is activated, and this constraint is permitted to move toward the haptic interface location 98 at a set but slow rate. Thus, the user experiences a drag while adding material.

Sandpaper

In one embodiment, one removal mode is the sandpaper removal metaphor. When sanding, the objective is to remove small amounts of material at a consistent depth. One way to accomplish this is using outriggers, to be discussed later, which would constrain the tool 28 to the virtual surface 25 of the virtual object 26 outside the area currently being sanded. Other embodiments utilize other methods. Regardless of mode, the sander (a virtual tool 28 in sandpaper removal move) only removes material when the haptic interface location 98 velocity tangent to the virtual surface 25 has exceeded a certain threshold.

A frictional effect is introduced while the virtual tool 28 is contacting the virtual surface 25, regardless of whether removal is being currently performed or not, thus representing the real-world feel of a sander. When the sander is not removing, the frictional effect is constant. When the sander is removing, the frictional effect oscillates. This oscillation makes the virtual surface 25 feel somewhat "rough" to the user, as is expected for a sanding tool.

In one embodiment, the actual area that is sanded is determined by taking the tool 28, shrinking it, and then penetrating it into the virtual surface 25 of the virtual object 26 at a set distance. For example, in the case of a cube 466 the actual sanding element is a smaller cube protruding from the cube 466 that the user touches the virtual surface 25 with. In another embodiment, the sander is implemented as a 2-D blade that protrudes from the surface of the tool 28.

In one embodiment, the current sandpaper metaphor attempts to smooth the virtual surface 25 while avoiding gouging. The sandpaper method keeps the tool 28 on the virtual surface 25 and only allows the tool 28 to move laterally along the plane of the virtual surface 25. As discussed previously for normal modification, the tool 28 is first placed directly on the virtual surface 25, then embedded a certain distance toward the haptic interface location 98 depending on the removal rate. The sandpaper method places the tool 28 directly on the virtual surface 25, then restricts the tool 28 to moving along a plane defined by the normal at the virtual surface 25.

Thus, the desired direction (that is, a vector from the tool 28 to the haptic interface location 98) is projected onto the plane, and the tool 28 is moved in that direction. Then the removal is performed based on the movement of the tool 28.

Pull Mode

Pull mode is an interaction mode that reverses the virtual surface 25 and binds the user inside the virtual object 26.

In one embodiment, using a voxel approach where the maximum density is represented by 255 and the minimum density is represented by 0, all density evaluations become invented to 255 minus the pre-inverted value. Thus, empty space (0) becomes maximum density space (255), and vice versa. The effect is that the haptic rendering process 16 calculates the tool 28 interaction with the inside of the virtual object 26 instead of the outside.

All removal and addition methods work effectively in pull mode. However, adding material in this mode feels to the user as if she is pulling the virtual surface 25 outward. Likewise, the feel for removing material is the opposite. Thus, when in pull mode, all methods are reversed. The force effects for removal become those that the user would otherwise feel when normally adding. Likewise, the force effects that the user feels while normally adding would be used for pull removal. In one embodiment, the user feels a 3-D friction force while adding. Thus, in pull mode, the user feels this friction force while removing.

Non-Cutting Tool Geometries

Portions of a tool may be declared to be non-cutting. This means that they may be used to feel the object or limit the tool motion, but they do not actively modify the virtual object. For example, consider a sphere tool with a plane through its center, with the sphere declared as cutting and the plane declared as non-cutting. In this example, the user could only embed the sphere in the material until the plane touched the material, limiting the cut. Another example of this is "outriggers," where the non-cutting portion flanks the cutting portion of the tool.

Figure 23A:
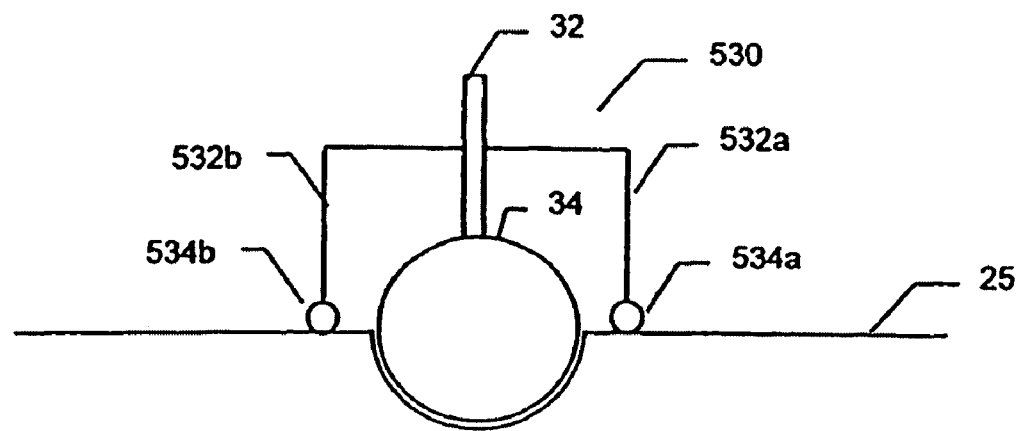

FIG. 23A shows an outrigger construct 530 including arms, shown generally as 532, and outriggers, shown generally as 534, connected to the handle 32 of the sphere 34 of a virtual tool 28. When used in a modification mode, such as sandpaper, the user may use the virtual tool 28 to remove material from an object 26 at a prescribed depth only. The depth of material removed is determined by the position of the outriggers 534a, 534b where they touch the virtual surface 25 of the virtual object 26. That is, the sphere 34 is allowed to penetrate the virtual surface 25 and remove material from the virtual object 26, but the outriggers 534a, 534b are not allowed to penetrate the virtual surface 25. The outriggers 534a, 534b are attached to the handle 32 of the virtual tool 28 by rigid arms 532a, 532b. The rigid arms 532a, 532b thus limit how far the sphere 34 of the virtual tool 28 penetrates the virtual object 26 and how much material the modification process 20 removes. The user can adjust the length of the rigid arms 532a, 532b to adjust the depth of penetration of the sphere 34 into the virtual object 26. In one embodiment, the outrigger approach is implemented using one rigid arm 532 and one outrigger 534 (not shown in FIG. 23A). In further embodiments, more than two arms and outriggers are used (not shown in FIG. 23A). The outrigger approach is not limited to a virtual tool 28 having a handle 32 and sphere 34, but may also be applied to a virtual tool 28 having other geometric shapes.

Figure 23B:
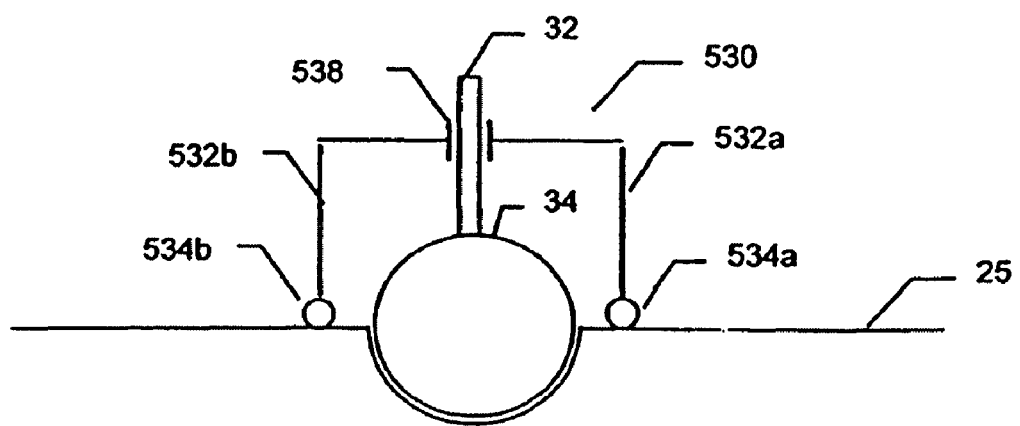

FIG. 23B depicts an outrigger construct 530 showing the rigid arms 532a, 532b connected to the handle 32 of the tool 28 by a slip ring 538, for one embodiment of the invention. The slip ring 538 provides for some slippage, by a predetermined factor, of the outrigger construct 530 as the sphere 34 penetrates the virtual surface 25 of the virtual object 26. The user feels resistance as the slip ring 538 slides along the handle 32, as the sphere 34 is allowed to penetrate further into the virtual object 26. Typically, the resistance provided by the slip ring 538 is a constant resistance force as the sphere 34 moves into the virtual object 26.

Figure 23C:
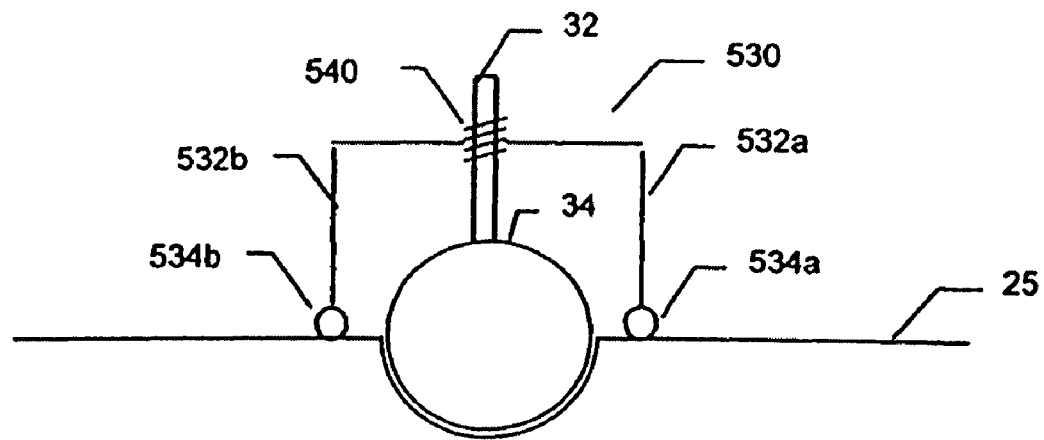

FIG. 23C depicts an outrigger construct 530 connected to the handle 32 by a spring 540, for one embodiment of the invention. The user feels a spring-based feedback force from the spring 540 that indicates how far the sphere 34 is penetrating into the virtual object 26. In other words, as the tool 28 penetrates farther into the virtual object 26, the user feels an increasing resistance to movement into the virtual object 26 due to the feedback from the spring 540.

Figure 23D:
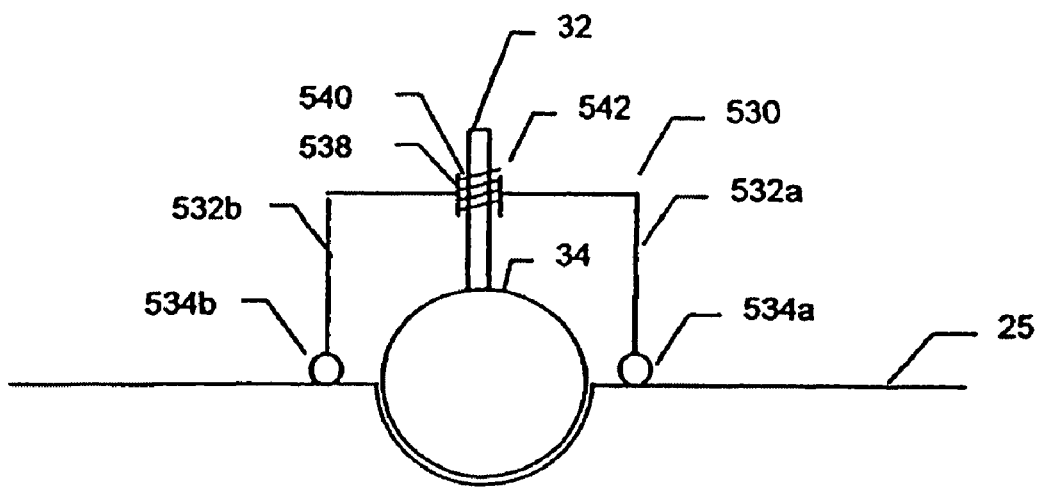

FIG. 23D depicts an outrigger construct 530, showing a combination connector 542 of a spring 540 and slip ring 538, for one embodiment of the invention. In this embodiment, the combination connector 542 provides a springlike feedback force of increasing resistance to penetration of the virtual object 26 until a predetermined limit is reached, and then the combination connector 542 slips along the handle 32 in a slip ring 538 effect. In one embodiment, after the predetermined limit is reached, the user feels a steady resistance to further penetration into the virtual object 26, as the slip ring 538 effect continues. In another embodiment, this slippage is for a predetermined distance, and then the combination connector 542 restores a springlike effect.

Smoothing

Smoothing blurs large features and eliminates some smaller features on a virtual object 26. The resulting appearance of the virtual surface 25 of the virtual object 26 is similar to the appearance of a wax model that has been partially heated. Smoothing is important for removing bumps and small undesired detail.

Smoothing can be applied to portions of the virtual object 26, or the virtual object 26 in its entirety. The user selects a region of the virtual object 26, which is indicated by the region being highlighted (that is, drawn) in a different color.

In one embodiment the user paints the virtual surface 25 of the virtual object 26 with the virtual tool 28 as a way of selecting the region of the object 26 to be smoothed.

In one embodiment using the voxel approach, selection smoothing works by allowing the user to paint an area on the virtual object 26 to be smoothed. FIG. 24 illustrates a two dimensional view of a grid 489 of voxels 78, showing a painted area 493 of the surface 86, corresponding voxels 495 that correspond to the painted area 493, and a selection volume 497 of voxels 78 including ramp. The selected area 493 is then smoothed at the voxel level and an isosurface 86 is recomputed from the new voxel values. The set of voxels spanning the isosurface 86 and voxel ramp corresponding to the area selected become the selection volume 497. The selection volume 497 is then filtered through an N×N×N kernel in three separate, one dimensional passes. Each successive pass uses the results from the previous pass to accumulate the final resulting voxel values. Each source voxel in the selection volume 497 is filtered using a kernel of size N, where each element of the kernel can vary according to the smoothing result desired. A kernel of size N results in the source voxel being filtered against N/2 (rounded to the nearest integer) voxels 78 in each dimension, X, Y, & Z.

The resulting filtered selection volume 497 is then copied back into the source volume and a new isosurface 86 is computed using the new voxel values. The number of voxels 78 remains constant in the volume, but the distribution of voxel values may change, resulting in either more or fewer surface triangles in the resulting isosurface 86.

Higher smoothing levels correspond to an overall smoother shape and a loss of detail in finer features, whereas lower smoothing levels correspond to less loss of detail and a more localized smoothing effect.

Geometric Constraints

The haptic rendering process 16 may constrain or limit the motion of a tool 28 along one or more degrees of freedom using a force feedback approach. Constraints may take the form of geometric entities, equations, rules, or other methods of defining a restriction to tool motion. For example, a rule might state that the tool may only remove a certain amount of material per cut invocation. Another example of limiting tool motion is a rule or equation which states that the motion of the virtual tool is to emulate the motion of the haptic device in physical space, but as a reduced "gain" for example, reducing the amount of motion by a factor ten. Tool constraints may limit the ability of the tool 28 to move, translate, and or rotate in virtual space. In addition, geometric constraints may be associated with point, line, curve, surface, or space representation. For example, FIG. 25 illustrates a virtual tool 28 moving through a virtual object 26, but constrained by a geometric constraint, which in this case is a curved line 550 to move in a direction indicated by vector 552. For example, the user may be using the tool 28 to remove material from the virtual object 26, but wishes to remove the material in only a certain manner. Therefore, she sets a geometric constraint, such as the curve 550 shown in FIG. 25, that limits how the tool 28 moves, thus affecting what material is removed.

Geometric constraints can either restrict the user's movements by "holding" her on the geometry or by blocking her from the geometry. For an example of a blocking constraint, consider a person who moves her fingertips along a tabletop, with the result that the fingertips are constrained only to move along the plane of the table. The fingertips may be lifted off of the table, but they cannot be go through the table. For a virtual tool 28 limited by a blocking constraint by a plane, the haptic rendering process 16 allows the tool 28 to touch the plane and move away from it, but does not allow the tool 28 to penetrate the plane.

An example of a hold constraint is one that keeps the fingertips on the table top, but would not allow the fingertips to move off of the tabletops. For a virtual tool 28 limited by a hold constraint to a plane, the haptic rendering process 16 allows the tool 28 to touch the plane, but does not allow the tool 28 to penetrate it or move away from it depending on whether the constraint is permeable or not, as discussed below. In one embodiment, the user receives a force feedback impression that the tool 28 is "stuck" to the geometric constraint, in this example, the plane. Referring to FIG. 25, if there is a hold constraint to the curve 550, the user is given the feeling that the tool 28 is stuck to the curve 550.

Geometric constraints may also optionally have a forcefield surrounding them. For example, a hold constraint might "pull" a user onto it when they are near it. Or a block constraint might push the user away as they approach it.

Geometric constraints are permeable or nonpermeable. For a permeable constraint, the user may make the tool 28 break through or break away from the constraint by applying a force beyond a threshold. That is, if permeable, the user can set the geometric constraint to be penetrated by the virtual tool 28, for example, with a sufficient exertion of force by the user. A nonpermeable constraint does not allow any departure from the limitations that they impose on the position or orientation of the tool 28.

Constraints can also be placed interactively by using the haptic interactive device 10, with the user feeling a force feedback effect when doing so. Thus the user can place a geometric constraint at or within a virtual object 26 using the haptic interactive device 10. The user then uses the haptic interactive device 10 to control a virtual tool 28 to modify the virtual object 26, with the movement of the virtual tool 28 limited by the geometric constraint. In another embodiment, the user makes a constraint, such as by using the virtual tool 28 to inscribe a slight groove in the virtual surface 25 of a virtual object 26. The user then uses this groove as a geometric constraint, when using the virtual tool 28 to enlarge the groove to make a larger indentation in the virtual surface 25 based on the shape of the groove.

In one embodiment, the tool 28 is constrained based on the constraint geometry, the position of the virtual object 26, the position of the virtual tool 28, and the haptic interface location 98. In another embodiment the tool 28 is also constrained by the virtual surface 25. For example, if a user is removing material from a virtual object 26, the user feels a force feedback or drag when moving into the object 26 and removing material. In addition, if the virtual object 26 is constrained by an impermeable hold constraint, as in FIG. 25 to a curve 550, then the user also feels a force feedback that makes the user feel that the virtual tool 28 is stuck to moving only along the curve 550. The user is allowed to remove material in the virtual object 26 when moving along the curve 550, but is not allowed to move away from the curve 550 and to remove material elsewhere in the virtual object 26 in an area where the virtual tool 28 is not touching the curve 550.

FIG. 26 is a flowchart illustrating the process of using a geometric constraint to constrain the virtual tool, for one embodiment of the invention. First, the user generates an initial or starting virtual object 26 having a virtual surface 25 in a haptic virtual environment (step 600). The user then selects a geometric constraint that determines how a virtual tool 28 will be constrained when it moves in the haptic virtual environment (step 602). A virtual tool 28 is determined or generated in virtual space that represents the haptic interface device 10 that the user is manipulating in real space (step 604). In one embodiment, the haptic rendering process 16 generates the virtual tool 28. In step 606, sensors determine the location of a user or designer in real space. In one embodiment the user is manipulating a haptic interface device 10 and sensors determine the location of the haptic interface device 10 in real space.

The modeling application 12 then determines a haptic interface position 98 in the haptic virtual environment that represents the location of the haptic interface device 10 in real space (step 608). The modeling application 12 then determines a proposed position of the virtual tool 28 in the haptic interaction space in comparison to the haptic interface location 98 and the location of the virtual surface 25 (step 610). Next the modeling application 12 determines if the proposed position of the virtual tool 28 penetrates the virtual surface 25 (step 612). The modeling application 12 constrains the action of the tool 28 based on the constraint geometry, the virtual surface 25, the position of the virtual tool 28, and the haptic interface location 98 (step 614). In one embodiment, the modeling application 12 constrains the translation or rotation of the tool 28. In another embodiment, the haptic rendering processor 16 constrains the action of the tool 28. If the tool 28 does not penetrate the virtual surface 25, the process checks the location of the user in real space (step 606) to determine if the user has moved the haptic interface device 10, thus causing a change in the haptic interface location 98 (step 608). If so, steps 610 and 612 are repeated.

Virtual Object Orientation

The user can interactively change the position and orientation of virtual objects 26 during evaluation and modification operations. In one embodiment, the user uses a 1DOF (degree of freedom) or greater input device such as a mouse or trackball to directly affect the position and orientation of the virtual object about an arbitrary point. In one embodiment the user uses the input device using the non-dominant hand. In another embodiment, the user uses a 1-DOF or greater haptic device, such as a haptic interface device 10, to directly affect the position and orientation of the virtual object about an arbitrary point. In a further embodiment, the user uses, keyboard commands to directly affect the position and orientation of the virtual object 26 about an arbitrary point. While manipulating the virtual object with the non-dominant hand, the user has the option of making modifications with the virtual tool. That is, while the virtual object is in motion, whether through active manipulation or some other means such as an inertia effect, modification may be effected with the virtual tool either in motion, or in a stationary position.

Virtual Control Wheels

In one embodiment, the user also uses one or more virtual control wheels 586 to control the orientation of the virtual object 26. FIG. 27 shows a virtual object 26 controlled by a control wheel 586 and a virtual lathing tool 588. The user uses any virtual tool 28 to touch and move the control wheels. In one embodiment, the user uses a virtual lathing tool 588 to modify the virtual object 26. The user uses the virtual lathing tool 588 to remove material, in a manner similar to a cutting wood on a physical lathe, as shown in FIG. 27. The user can also add material to a virtual object 26. In addition, the user can start the rotation of the control wheel 586 and add material from a virtual tool 26 when acting in an extrusion, addition, or "toothpaste" mode. In this case, the added material may form a circular or spiral shape as extruded from the virtual tool 26 into the rotating space controlled by the control wheel 586.

The control wheels 586 control the orientation of the virtual object 26 about an arbitrary axis. FIG. 27 shows the control wheel 586 controlling the rotation of a virtual object 26 about a vertical or z axis. In one embodiment, the user can use control wheels 586 to control the rotation of a virtual object 26 about the x axis and the y axis also. In one embodiment, the user can use control wheels to control the rotation of the virtual object 26 about two or more axes at the same time. For example, the user uses two control wheels to cause the virtual object 26 to rotate about the x axis and z axis simultaneously and use a virtual lathing tool 588 or other virtual tool 28 to modify the virtual object 26 while it is rotating about two or more axes.

The control wheels 586 may have properties associated with mass, damping, surface compliance, and friction.

In one embodiment, the control wheels 586 are programmed to stop as soon as the user stops interacting with them or to continue rotating, (that is, much like a physical lathe) until they are explicitly stopped.

In one embodiment, the user rotates the control wheels 586 without constraint. In another embodiment, the user constrains the rotation to an angular extent.

In one embodiment, the control wheels 586 have haptically sensible "indentations" associated with their rotations, much like some real world, physical rotary knobs.

GLOSSARY

Constraint
An imposed limitation on the motion of the virtual tool 28.

Density
A scalar property of each single voxel 78, used for defining the shape of a virtual object 26 in one embodiment.

Density Threshold Value
In one embodiment, the density value which defines the isosurface 86 which represents the virtual surface 25. Voxels 78 with densities above this value represent interior points on the virtual object 26. Voxels 78 with densities below this value represent points outside the virtual object 26.

Edge
A temporary geometric construct representing a potentially viable move direction when the virtual tool 28 is contacting the virtual object 26 in more than one place.

Gradient
The rate of change of the density values of the voxels 78 along a given vector in one embodiment.

Haptic Interface Location
The location in the virtual environment which corresponds to the key position of the haptic interface device 10 in the real-world space.

Haptic Rendering Process
The process responsible for generating objects 26 in the haptic virtual environment and producing high-fidelity force-feedback to the user in real world space.

Haptic Virtual Environment
A computer representation of a space where a user can interact with virtual objects 26 through the sense of touch.

Interaction Modes
Settings which alter the interaction between the virtual tool 28 and the virtual object 26.

Isosurface
A theoretical surface 86 defined by the locus of identical voxel density values.

Panic Escape
A method of extracting the virtual tool 28 from a trapped condition.

Ramp Length
In one embodiment, the number of voxels 78 over which density values go from their minimum (0) to their maximum (255).

Real World Space
The true three-dimensional physical world in which people live and interact.

Surface Direction Vector
A vector 101 evaluated at a point in relation to a virtual surface 25. If the point is at the virtual surface 25, this vector 101 is the normal to the surface 25 at that point. If the point is not on the surface 25, the vector 101 represents the approximate shortest distance to the surface 25 and is also the approximate surface normal at the point where the vector 101 would intersect the surface 25.

Tool Surface Contact Point
A location on the virtual surface 25 where the virtual tool 28 is in contact with the virtual surface 25.

Trilinear Interpolation
In one embodiment, a technique for interpolating the densities of nearby voxels 78 to derive the density at a location that lies between the discrete voxel locations.

Virtual Object Modification Process
The process responsible for making changes to the virtual object 26.

Virtual Object
A computer representation of an object.

Virtual Surface
A computer representation of the "skin" of a virtual object 26.

Virtual Tool
A computer representation of a tool which the user uses to interact with the virtual environment.

Virtual Tool Origin
The location on the virtual tool 28 which strives to be coincident with the haptic interface location 98.

Voxels

A set of locations in the virtual environment, each storing information used in defining the shape of a virtual object 26 in one embodiment.

Having described the preferred embodiments of the invention, it will now become apparent to one of skill in the art that other embodiments incorporating the concepts may be used. It is felt, therefore, that the invention should not be limited to disclosed embodiments, but rather should be limited only by the spirit and scope of the following claims.

What is claimed is:

1. A system for modifying a virtual object in a virtual environment, the system comprising:
   a haptic interface device;
   a memory for storing code that defines a set of instructions; and
   a processor for executing the set of instructions to:
   (a) generate a virtual object in a virtual environment;
   (b) determine a position of a virtual tool in the virtual environment in response to a location of the haptic interface device in real space, wherein the virtual tool comprises a plurality of discrete point locations for sensing penetration into the virtual object; and
   (c) reposition the virtual tool substantially tangent to a surface of the virtual object substantially at the start of a modification of the virtual object.

2. The system of claim 1, wherein the code comprises instructions to determine a force feedback according to the position of the virtual tool in relation to the virtual object.

3. The system of claim 2, wherein the code comprises instructions to send the force feedback to a user through the haptic interface device.

4. The system of claim 1, wherein the haptic interface device comprises at least three degrees of freedom of force feedback.

5. The system of claim 1, wherein the haptic interface device comprises at least six degrees of freedom of force feedback.

6. The system of claim 1, wherein the haptic interface device senses six degrees of freedom.

* * * * *